United States Patent [19]

Wada

[11] Patent Number: 5,896,489
[45] Date of Patent: Apr. 20, 1999

[54] ELECTROPHOTOGRAPHIC PRINTER

[75] Inventor: Koji Wada, Tokyo, Japan

[73] Assignee: NEC Corporation, Tokyo, Japan

[21] Appl. No.: 08/856,010

[22] Filed: May 14, 1997

[30] Foreign Application Priority Data

May 15, 1996 [JP] Japan .................... 8-145099

[51] Int. Cl.⁶ .................. G06K 9/40; G06K 9/44; G06K 15/14; H04N 1/409
[52] U.S. Cl. .................. 395/102; 395/109; 282/269; 282/264; 282/261; 282/260; 282/209; 282/210; 282/218; 282/288; 282/299
[58] Field of Search .................. 395/109, 102; 382/269, 266, 264, 260, 254, 299, 298, 275, 209, 210, 217, 218, 288; 358/447, 451, 463

[56] References Cited

U.S. PATENT DOCUMENTS

| 4,847,641 | 7/1989 | Tung . | |
|---|---|---|---|
| 5,029,108 | 7/1991 | Lung . | |
| 5,109,283 | 4/1992 | Carley | 358/298 |
| 5,742,703 | 4/1998 | Lin et al. | 382/209 |

FOREIGN PATENT DOCUMENTS

| 3-33769 | 2/1991 | Japan . |
|---|---|---|
| 4-268867 | 9/1992 | Japan . |
| 4-304070 | 10/1992 | Japan . |
| 4-341060 | 11/1992 | Japan . |
| 6-992 | 1/1994 | Japan . |

*Primary Examiner*—Scott Rogers
*Attorney, Agent, or Firm*—Foley & Lardner

[57] ABSTRACT

An electrophotographic printer including feature extraction means 12 for judging on the basis of pattern matching whether a reference area generated by area generating means 11 is an image which should be subjected to smoothing processing, and detecting the gradient of a contour portion of the image when the image is judged to be subjected to the smoothing processing, resolution enhancing means 13 for subdividing each pixel in the reference area generated by the area generating means 11 into small areas in accordance with the extraction result of the feature extraction means 12 to thereby perform resolution enhancing correction processing, density calculation means 15 for calculating the density of an overall selected area of the corrected pixels generated by the resolution-enhancing means 13 on the basis of the respective pixel values of the selected area, center-of-gravity calculation means 16 for calculating the center of gravity of an overall selected area of the corrected pixels generated by the resolution-enhancing means 13 on the basis of the respective pixel values of the selected area, and characteristic correction means 17 for correcting the density and the center of gravity calculated by the density calculation means 15 and the center-of-gravity calculation means 16 in accordance with preset input/output characteristic information of the engine.

25 Claims, 92 Drawing Sheets

(SMOOTHING CIRCUIT 1)

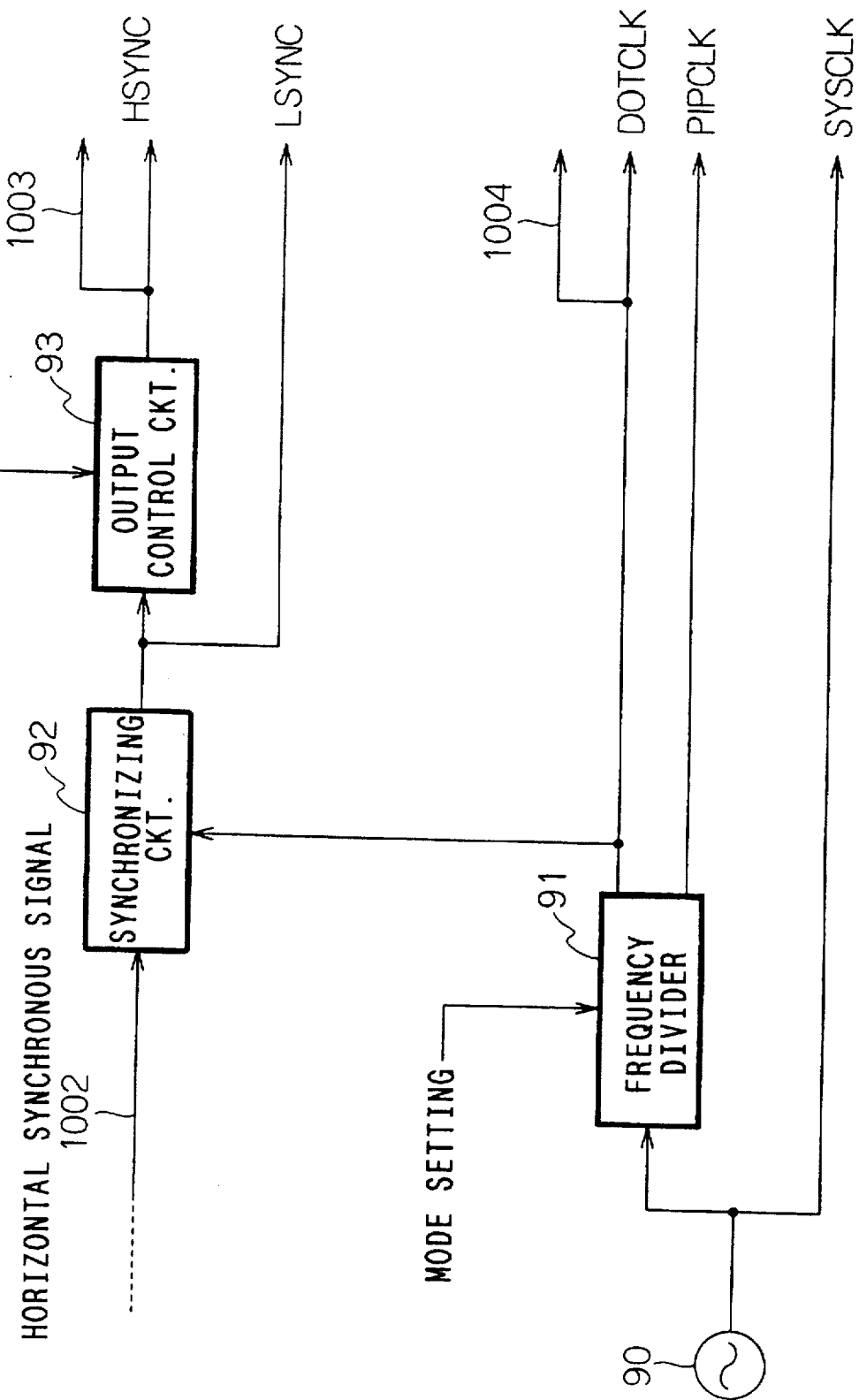

FIG. 21(a)
P1

| 0 | 0 | 1 |
|---|---|---|
| 0 | 1 | 0 |
| 1 | 0 | 0 |

FIG. 21(b)
P2

| 0 | 0 | 1 |
|---|---|---|
| 0 | 1 | 1 |
| 1 | 1 | 0 |

FIG. 21(c)
P3

| 0 | 0 | 1 |
|---|---|---|
| 0 | 1 | 1 |
| 1 | 1 | 1 |

FIG. 21(d)
P4

| 0 | 1 | 1 |
|---|---|---|
| 1 | 1 | 0 |
| 1 | 0 | 0 |

FIG. 21(e)
P5

| 1 | 1 | 1 |
|---|---|---|
| 1 | 1 | 0 |
| 1 | 0 | 0 |

GRADIENT=+1   NOTED PIXEL=1

FIG. 22(a)
P6

| 0 | 0 | 0 |
|---|---|---|
| 0 | 0 | 1 |
| 0 | 1 | 0 |

FIG. 22(b)
P7

| 0 | 0 | 0 |
|---|---|---|
| 0 | 0 | 1 |
| 0 | 1 | 1 |

FIG. 22(c)
P8

| 0 | 1 | 0 |
|---|---|---|
| 1 | 0 | 0 |
| 0 | 0 | 0 |

FIG. 22(d)
P9

| 1 | 1 | 0 |
|---|---|---|
| 1 | 0 | 0 |
| 0 | 0 | 0 |

GRADIENT=+1   NOTED PIXEL=0

FIG. 23(a)
P10

| 1 | 0 | 0 |
|---|---|---|
| 0 | 1 | 0 |
| 0 | 0 | 1 |

FIG. 23(b)
P11

| 1 | 0 | 0 |
|---|---|---|
| 1 | 1 | 0 |
| 0 | 1 | 1 |

FIG. 23(c)
P12

| 1 | 0 | 0 |
|---|---|---|
| 1 | 1 | 0 |
| 1 | 1 | 1 |

FIG. 23(d)
P13

| 1 | 1 | 0 |
|---|---|---|
| 0 | 1 | 1 |
| 0 | 0 | 1 |

FIG. 23(e)
P14

| 1 | 1 | 1 |
|---|---|---|
| 0 | 1 | 1 |
| 0 | 0 | 1 |

GRADIENT=−1    NOTED PIXEL=1

FIG. 24(a)
P15

| 0 | 0 | 0 |
|---|---|---|
| 1 | 0 | 0 |
| 0 | 1 | 0 |

FIG. 24(b)
P16

| 0 | 0 | 0 |
|---|---|---|
| 1 | 0 | 0 |
| 1 | 1 | 0 |

FIG. 24(c)
P17

| 0 | 1 | 0 |
|---|---|---|
| 0 | 0 | 1 |
| 0 | 0 | 0 |

FIG. 24(d)
P18

| 0 | 1 | 1 |
|---|---|---|
| 0 | 0 | 1 |
| 0 | 0 | 0 |

GRADIENT=−1    NOTED PIXEL=0

FIG. 25(a)
P19

| 0 | 0 | 0 |
|---|---|---|
| 0 | 1 | 1 |
| 1 | 0 | 0 |

FIG. 25(b)
P20

| 0 | 0 | 0 |
|---|---|---|
| 0 | 1 | 1 |
| 1 | 1 | 0 |

FIG. 25(c)
P21

| 0 | 0 | 0 |
|---|---|---|
| 0 | 1 | 1 |
| 1 | 1 | 1 |

FIG. 25(d)
P22

| 0 | 0 | 1 |
|---|---|---|
| 1 | 1 | 0 |
| 0 | 0 | 0 |

FIG. 25(e)
P23

| 0 | 1 | 1 |
|---|---|---|
| 1 | 1 | 0 |
| 0 | 0 | 0 |

FIG. 25(f)
P24

| 1 | 1 | 1 |
|---|---|---|
| 1 | 1 | 0 |
| 0 | 0 | 0 |

GRADIENT=+1/2   NOTED PIXEL=1

FIG. 26(a)
P25

| 0 | 0 | 0 |
|---|---|---|
| 0 | 0 | 1 |
| 1 | 1 | 0 |

FIG. 26(b)
P26

| 0 | 0 | 0 |
|---|---|---|
| 0 | 0 | 1 |
| 1 | 1 | 1 |

FIG. 26(c)
P27

| 0 | 1 | 1 |
|---|---|---|
| 1 | 0 | 0 |
| 0 | 0 | 0 |

FIG. 26(d)
P28

| 1 | 1 | 1 |
|---|---|---|
| 1 | 0 | 0 |
| 0 | 0 | 0 |

GRADIENT=+1/2   NOTED PIXEL=0

FIG. 27(a)
P29

| 0 | 0 | 0 |
|---|---|---|
| 1 | 1 | 0 |
| 0 | 0 | 1 |

FIG. 27(b)
P30

| 0 | 0 | 0 |
|---|---|---|
| 1 | 1 | 0 |
| 0 | 1 | 1 |

FIG. 27(c)
P31

| 0 | 0 | 0 |
|---|---|---|
| 1 | 1 | 0 |
| 1 | 1 | 1 |

FIG. 27(d)
P32

| 1 | 0 | 0 |
|---|---|---|
| 0 | 1 | 1 |
| 0 | 0 | 0 |

FIG. 27(e)
P33

| 1 | 1 | 0 |
|---|---|---|
| 0 | 1 | 1 |
| 0 | 0 | 0 |

FIG. 27(f)
P34

| 1 | 1 | 1 |
|---|---|---|
| 0 | 1 | 1 |
| 0 | 0 | 0 |

GRADIENT=−1/2   NOTED PIXEL=1

FIG. 28(a)
P35

| 0 | 0 | 0 |
|---|---|---|
| 1 | 0 | 0 |
| 0 | 1 | 1 |

FIG. 28(b)
P36

| 0 | 0 | 0 |
|---|---|---|
| 1 | 0 | 0 |
| 1 | 1 | 1 |

FIG. 28(c)
P37

| 1 | 1 | 0 |
|---|---|---|
| 0 | 0 | 1 |
| 0 | 0 | 0 |

FIG. 28(d)
P38

| 1 | 1 | 1 |
|---|---|---|
| 0 | 0 | 1 |
| 0 | 0 | 0 |

GRADIENT=−1/2   NOTED PIXEL=0

FIG. 29(a) P39

| 0 | 0 | 1 |
|---|---|---|
| 0 | 1 | 0 |
| 0 | 1 | 0 |

FIG. 29(b) P40

| 0 | 0 | 1 |
|---|---|---|
| 0 | 1 | 1 |
| 0 | 1 | 0 |

FIG. 29(c) P41

| 0 | 0 | 1 |
|---|---|---|
| 0 | 1 | 1 |
| 0 | 1 | 1 |

FIG. 29(d) P42

| 0 | 1 | 0 |
|---|---|---|
| 0 | 1 | 0 |
| 1 | 0 | 0 |

FIG. 29(e) P43

| 0 | 1 | 0 |
|---|---|---|
| 1 | 1 | 0 |
| 1 | 0 | 0 |

FIG. 29(f) P44

| 1 | 1 | 0 |
|---|---|---|
| 1 | 1 | 0 |
| 1 | 0 | 0 |

GRADIENT=+2   NOTED PIXEL=1

FIG. 30(a) P45

| 0 | 0 | 1 |
|---|---|---|
| 0 | 0 | 1 |
| 0 | 1 | 0 |

FIG. 30(b) P46

| 0 | 0 | 1 |
|---|---|---|
| 0 | 0 | 1 |
| 0 | 1 | 1 |

FIG. 30(c) P47

| 0 | 1 | 0 |
|---|---|---|
| 1 | 0 | 0 |
| 1 | 0 | 0 |

FIG. 30(d) P48

| 1 | 1 | 0 |
|---|---|---|
| 1 | 0 | 0 |
| 1 | 0 | 0 |

GRADIENT=+2   NOTED PIXEL=0

FIG. 31(a)  FIG. 31(b)  FIG. 31(c)
P49         P50         P51

| 1 | 0 | 0 |
|---|---|---|
| 0 | 1 | 0 |
| 0 | 1 | 0 |

| 1 | 0 | 0 |
|---|---|---|
| 1 | 1 | 0 |
| 0 | 1 | 0 |

| 1 | 0 | 0 |
|---|---|---|
| 1 | 1 | 0 |
| 1 | 1 | 0 |

FIG. 31(d)  FIG. 31(e)  FIG. 31(f)
P52         P53         P54

| 0 | 1 | 0 |
|---|---|---|
| 0 | 1 | 0 |
| 0 | 0 | 1 |

| 0 | 1 | 0 |
|---|---|---|
| 0 | 1 | 1 |
| 0 | 0 | 1 |

| 0 | 1 | 1 |
|---|---|---|
| 0 | 1 | 1 |
| 0 | 0 | 1 |

GRADIENT=−2    NOTED PIXEL=1

FIG. 32(a)  FIG. 32(b)  FIG. 32(c)  FIG. 32(d)
P55         P56         P57         P58

| 1 | 0 | 0 |
|---|---|---|
| 1 | 0 | 0 |
| 0 | 1 | 0 |

| 1 | 0 | 0 |
|---|---|---|
| 1 | 0 | 0 |
| 1 | 1 | 0 |

| 0 | 1 | 0 |
|---|---|---|
| 0 | 0 | 1 |
| 0 | 0 | 1 |

| 0 | 1 | 1 |
|---|---|---|
| 0 | 0 | 1 |
| 0 | 0 | 1 |

GRADIENT=−2    NOTED PIXEL=0

(DETECTION OPERATOR: P1)

(DETECTION OPERATOR: P2)

(DETECTION OPERATOR: P3)

(DETECTION OPERATOR: P4)

(DETECTION OPERATOR: P5)

(DETECTION OPERATOR: P6)

(DETECTION OPERATOR: P7)

(DETECTION OPERATOR: P8)

(DETECTION OPERATOR: P9)

(DETECTION OPERATOR: P10)

(DETECTION OPERATOR: P11)

(DETECTION OPERATOR: P12)

(DETECTION OPERATOR: P13)

(DETECTION OPERATOR: P14)

(DETECTION OPERATOR: P15)

(DETECTION OPERATOR: P16)

(DETECTION OPERATOR: P17)

(DETECTION OPERATOR: P18)

(DETECTION OPERATOR: P19)

(DETECTION OPERATOR: P20)

(DETECTION OPERATOR: P21)

(DETECTION OPERATOR: P22)

(DETECTION OPERATOR: P23)

(DETECTION OPERATOR: P24)

(DETECTION OPERATOR: P25)

(DETECTION OPERATOR: P26)

(DETECTION OPERATOR: P27)

(DETECTION OPERATOR: P28)

(DETECTION OPERATOR: P29)

(DETECTION OPERATOR: P30)

(DETECTION OPERATOR: P31)

(DETECTION OPERATOR: P32)

(DETECTION OPERATOR: P33)

(DETECTION OPERATOR: P34)

(DETECTION OPERATOR: P35)

(DETECTION OPERATOR: P36)

(DETECTION OPERATOR: P37)

(DETECTION OPERATOR: P38)

(DETECTION OPERATOR : P39)

(DETECTION OPERATOR : P40)

(DETECTION OPERATOR : P41)

(DETECTION OPERATOR : P42)

(DETECTION OPERATOR : P43)

(DETECTION OPERATOR : P44)

(DETECTION OPERATOR: P45)

(DETECTION OPERATOR: P46)

(DETECTION OPERATOR: P47)

(DETECTION OPERATOR: P48)

(DETECTION OPERATOR: P49)

(DETECTION OPERATOR: P50)

(DETECTION OPERATOR: P51)

(DETECTION OPERATOR: P52)

(DETECTION OPERATOR: P53)

(DETECTION OPERATOR: P54)

(DETECTION OPERATOR: P55)

(DETECTION OPERATOR: P56)

(DETECTION OPERATOR: P57)

(DETECTION OPERATOR: P58)

(DETECTION OPERATOR : P1)

(DETECTION OPERATOR : P2)

(DETECTION OPERATOR : P3)

(DETECTION OPERATOR : P4)

(DETECTION OPERATOR : P5)

(DETECTION OPERATOR : P6)

(DETECTION OPERATOR : P7)

(DETECTION OPERATOR : P8)

(DETECTION OPERATOR : P9)

(DETECTION OPERATOR : P10)

(DETECTION OPERATOR : P11)

(DETECTION OPERATOR : P12)

(DETECTION OPERATOR : P13)

(DETECTION OPERATOR : P14)

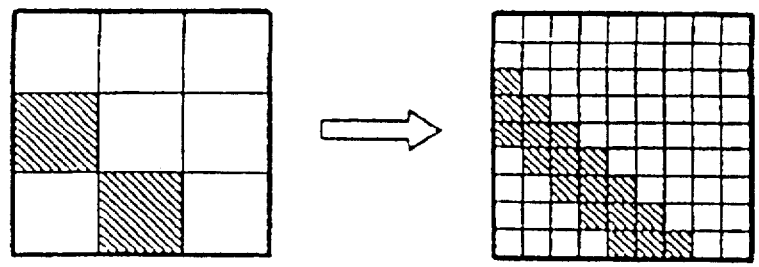
FIG. 49(a) (DETECTION OPERATOR : P15)
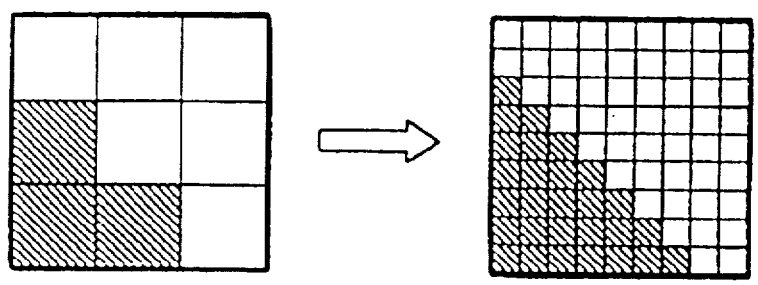
FIG. 49(b) (DETECTION OPERATOR : P16)
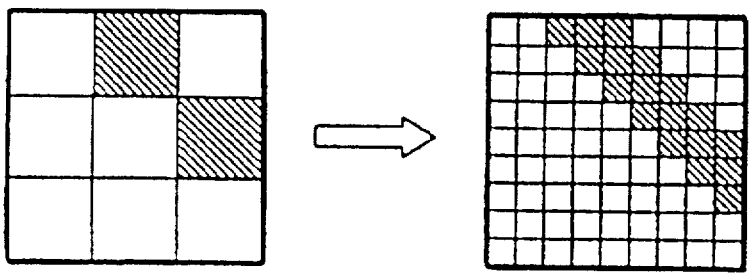
FIG. 49(c) (DETECTION OPERATOR : P17)
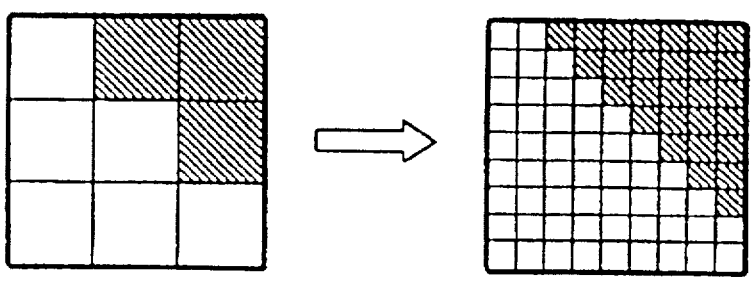
FIG. 49(d) (DETECTION OPERATOR : P18)

(DETECTION OPERATOR: P19)

(DETECTION OPERATOR: P20)

(DETECTION OPERATOR: P21)

(DETECTION OPERATOR: P22)

(DETECTION OPERATOR: P23)

(DETECTION OPERATOR: P24)

(DETECTION OPERATOR : P25)

(DETECTION OPERATOR : P26)

(DETECTION OPERATOR : P27)

(DETECTION OPERATOR : P28)

(DETECTION OPERATOR : P29)

(DETECTION OPERATOR : P30)

(DETECTION OPERATOR : P31)

(DETECTION OPERATOR : P32)

(DETECTION OPERATOR : P33)

(DETECTION OPERATOR : P34)

(DETECTION OPERATOR : P35)

(DETECTION OPERATOR : P36)

(DETECTION OPERATOR : P37)

(DETECTION OPERATOR : P38)

(DETECTION OPERATOR: P39)

(DETECTION OPERATOR: P40)

(DETECTION OPERATOR: P41)

(DETECTION OPERATOR: P42)

(DETECTION OPERATOR: P43)

(DETECTION OPERATOR: P44)

(DETECTION OPERATOR : P45)

(DETECTION OPERATOR : P46)

(DETECTION OPERATOR : P47)

(DETECTION OPERATOR : P48)

(DETECTION OPERATOR P49)

(DETECTION OPERATOR : P50)

(DETECTION OPERATOR : P51)

(DETECTION OPERATOR : P52)

(DETECTION OPERATOR : P53)

(DETECTION OPERATOR : P54)

(DETECTION OPERATOR: P55)

(DETECTION OPERATOR: P56)

(DETECTION OPERATOR: P57)

(DETECTION OPERATOR: P58)

FIG. 58
(RESOLUTION RATIO 1:1)

| DETECTION OPERATOR | CORRECTED PIXEL | DETECTION OPERATOR | CORRECTED PIXEL | DETECTION OPERATOR | CORRECTED PIXEL |
|---|---|---|---|---|---|
| P1, P2 | Q1 | P19, P20, P21, P29, P30, P31 | Q11 | P39, P40, P41, P49, P50, P51 | Q15 |
| P2, P3 | Q2 | | | P42, P43, P44, P52, P53, P54 | Q16 |
| P4, P5 | Q3 | P22, P23, P24, P32, P33, P34 | Q12 | | |
| P6, P7 | Q4 | | | P45, P46, P55, P56 | Q17 |
| P8, P9 | Q5 | | | | |
| P10 | Q6 | P25, P26, P35, P36 | Q13 | P47, P48, P57, P58 | Q18 |
| P11, P12 | Q7 | | | | |
| P13, P14 | Q8 | | | | |
| P15, P16 | Q9 | P27, P28, P37, P38 | Q14 | P59 | Q19 |
| P17, P18 | Q10 | | | P60 | Q20 |

FIG.59
(RESOLUTION RATIO 1:2)
| DETECTION OPERATOR | CORRECTED PIXEL | DETECTION OPERATOR | CORRECTED PIXEL | DETECTION OPERATOR | CORRECTED PIXEL |
|---|---|---|---|---|---|
| P1, P2 | R1 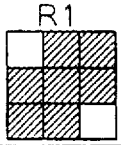 | P19, P20, P21 | R11 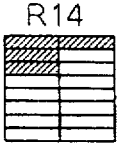 | P39, P40, P41 | R19 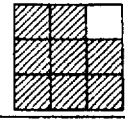 |
| P2, P3 | R2 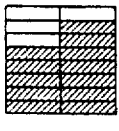 | P22, P23, P24 | R12 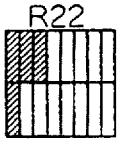 | P42, P43, P44 | R20 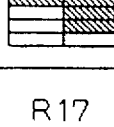 |
| P4, P5 | R3 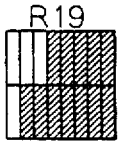 | P25, P26 | R13 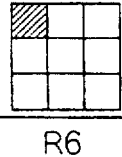 | P45, P46 | R21 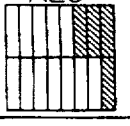 |
| P6, P7 | R4 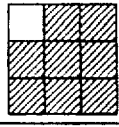 | P27, P28 | R14 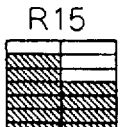 | P47, P48 | R22 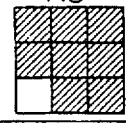 |
| P8, P9 | R5  | P29, P30, P31 | R15 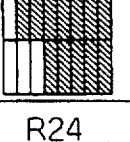 | P49, P50, P51 | R23 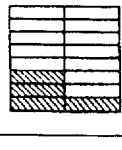 |
| P10 | R6 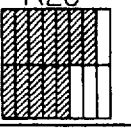 | P32, P33, P34 | R16 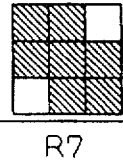 | P52, P53, P54 | R24 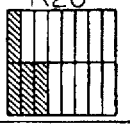 |
| P11, P12 | R7 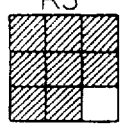 | P35, P36 | R17 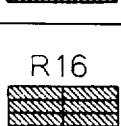 | P55, P56 | R25 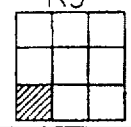 |
| P13, P14 | R8 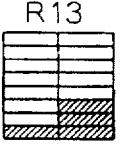 | P37, P38 | R18 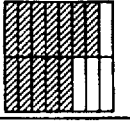 | P57, P58 | R26 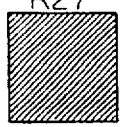 |
| P15, P16 | R9 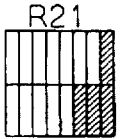 | | | P59 | R27 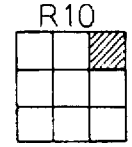 |
| P17, P18 | R10 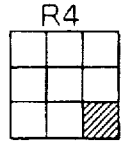 | | | P60 | R28 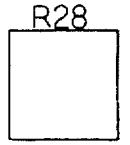 |

FIG.60
(SELECTED AREA)
(S1) 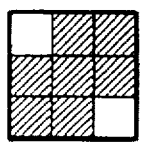
(S6) 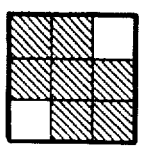
(S11) 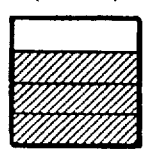
(S16) 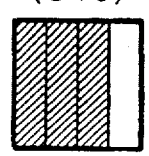
(S2) 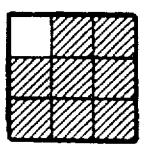
(S7) 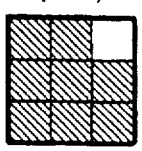
(S12) 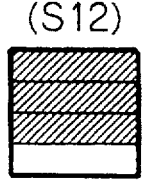
(S17) 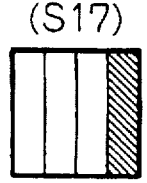
(S3) 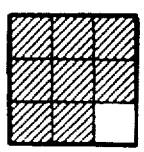
(S8) 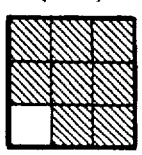
(S13) 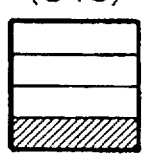
(S18) 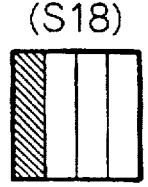
(S4) 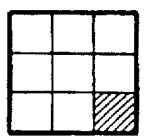
(S9) 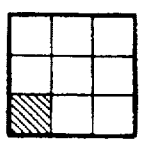
(S14) 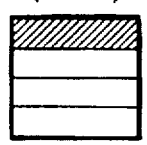
(S19) 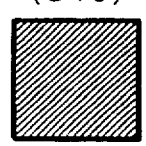
(S5) 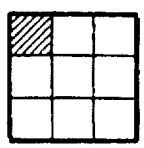
(S10) 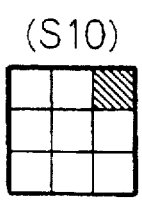
(S15) 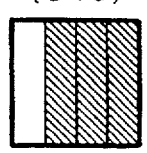
(S20) 

CORRECTED PIXEL R1

1 COLUMN  2 COLUMN

CORRECTED PIXEL R26

1 COLUMN  2 COLUMN

FIG.62
(SELECTED AREA)
(T1) 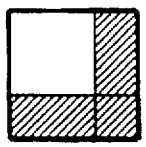
(T6) 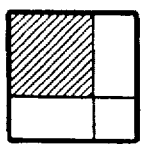
(T9) 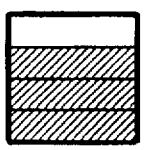
(T14) 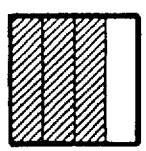
(T2) 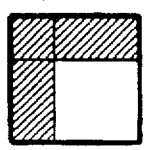
(T7) 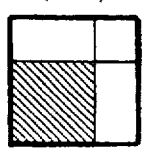
(T10) 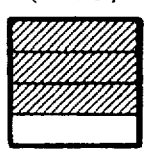
(T15) 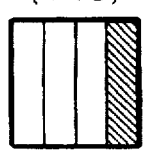
(T3) 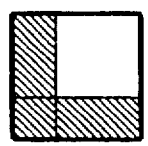
(T8) 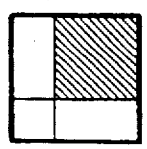
(T11) 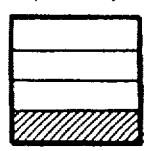
(T16) 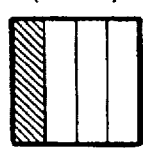
(T4) 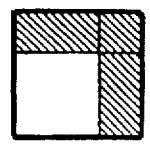
(T12) 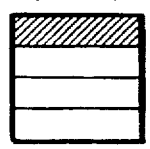
(T17) 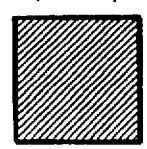
(T5) 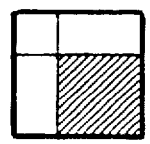
(T13) 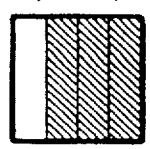
(T18) 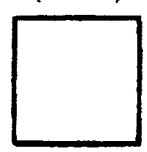

FIG.63

| SELECTED AREA | DENSITY | SELECTED AREA | DENSITY | SELECTED AREA | DENSITY |
|---|---|---|---|---|---|
| S20<br>T18 | 0 | T5<br>T6<br>T7<br>T8 | 4/9 | S1<br>S6 | 7/9 |
| S4<br>S5<br>S9<br>S10 | 1/9 | T1<br>T2<br>T3<br>T4 | 5/9 | S2<br>S3<br>S7<br>S8 | 8/9 |
| S13<br>S14<br>S17<br>S18<br>T11<br>T12<br>T15<br>T16 | 1/4 | S11<br>S12<br>S15<br>S16<br>T9<br>T10<br>T11<br>T12 | 3/4 | S19<br>T17 | 1 |

FIG.64

| SELECTED AREA | CENTER OF GRAVITY | SELECTED AREA | CENTER OF GRAVITY | SELECTED AREA | CENTER OF GRAVITY |
|---|---|---|---|---|---|
| S18, T16 | 1/8 | S1, S6 | | S2, S8 | 13/24 |
| S5, S9 | 1/6 | S11, S12 | | S15, T11 | 5/8 |
| T6, T7 | 1/3 | S13, S14 | | T1, T4 | 19/30 |
| T2, T3 | 11/30 | S19, S20 | 1/2 | T5, T8 | 2/3 |
| S16, T12 | 3/8 | T9, T10 | | S4, S10 | 5/6 |
| S3, S7 | 11/24 | T11, T12, T17, T18 | | S17, T15 | 7/8 |

FIG. 65

| SELECTED AREA | DENSITY | CENTER OF GRAVITY | WAVEFORM |
|---|---|---|---|
| S20, T18 | 0 | 1/2 | 0 at 1/2 |
| S4, S10 | 1/9 | 5/6 | 1/9 wide at 5/6 |
| S5, S9 | 1/9 | 1/6 | 1/9 wide at 1/6 |
| S13, S14, T11, T12 | 1/4 | 1/2 | 1/4 wide at 1/2 |
| S17, T15 | 1/4 | 7/8 | 1/4 wide at 7/8 |
| S18, T16 | 1/4 | 1/8 | 1/4 wide at 1/8 |
| T5, T8 | 4/9 | 2/3 | 4/9 wide at 2/3 |
| T6, T7 | 4/9 | 1/3 | 4/9 wide at 1/3 |
| T1, T4 | 5/9 | 19/30 | 5/9 wide at 19/30 |

FIG. 66
| SELECTED AREA | DENSITY | CENTER OF GRAVITY | WAVEFORM |
|---|---|---|---|
| T2<br>T3 | 5/9 | 11/30 | 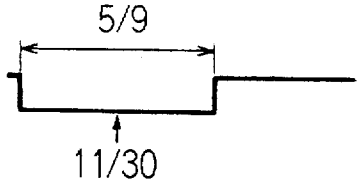 |
| S11<br>S12<br>T9<br>T10 | 3/4 | 1/2 | 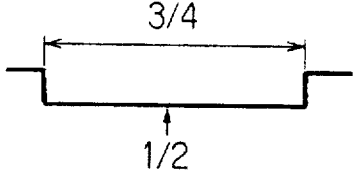 |
| S15<br>T11 | 3/4 | 5/8 | 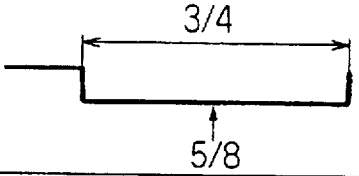 |
| S16<br>T12 | 3/4 | 3/8 | 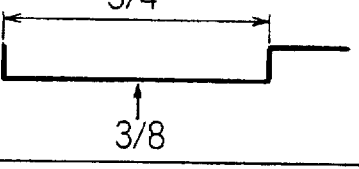 |
| S1<br>S6 | 7/9 | 1/2 | 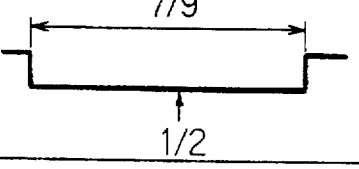 |
| S2<br>S8 | 8/9 | 13/24 | 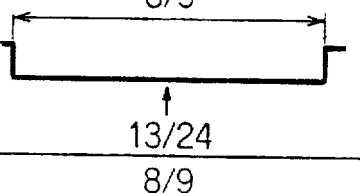 |
| S3<br>S7 | 8/9 | 11/24 | 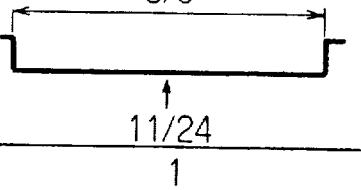 |
| S19<br>T17 | 1 | 1/2 | 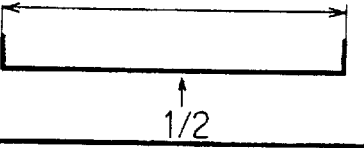 |

FIG. 69

| SELECTED AREA | DENSITY | CENTER OF GRAVITY | EDGE DATA |
|---|---|---|---|
| S20<br>T18 | 0/64 | 32/64 | BLACK EDGE: 32<br>WHITE EDGE: 32 |
| S4<br>S10 | 16/64 | 53/64 | BLACK EDGE: 45<br>WHITE EDGE: 61 |
| S5<br>S9 | 16/64 | 11/64 | BLACK EDGE: 3<br>WHITE EDGE: 19 |
| S13<br>S14<br>T11<br>T12 | 22/64 | 32/64 | BLACK EDGE: 21<br>WHITE EDGE: 43 |
| S17<br>T15 | 22/64 | 56/64<br>↓<br>53/64 | BLACK EDGE: 42<br>WHITE EDGE: 64 |
| S18<br>T16 | 22/64 | 8/64<br>↓<br>11/64 | BLACK EDGE: 0<br>WHITE EDGE: 22 |
| T5<br>T8 | 28/64 | 43/64 | BLACK EDGE: 29<br>WHITE EDGE: 57 |
| T6<br>T7 | 28/64 | 21/64 | BLACK EDGE: 7<br>WHITE EDGE: 35 |
| T1<br>T4 | 32/64 | 41/64 | BLACK EDGE: 25<br>WHITE EDGE: 57 |
| T2<br>T3 | 32/64 | 23/64 | BLACK EDGE: 7<br>WHITE EDGE: 39 |
| S11<br>S12<br>T9<br>T10 | 36/64 | 32/64 | BLACK EDGE: 14<br>WHITE EDGE: 50 |
| S15<br>T11 | 36/64 | 40/64 | BLACK EDGE: 22<br>WHITE EDGE: 58 |
| S16<br>T12 | 36/64 | 24/64 | BLACK EDGE: 6<br>WHITE EDGE: 42 |
| S1<br>S6 | 38/64 | 32/64 | BLACK EDGE: 13<br>WHITE EDGE: 51 |
| S2<br>S8 | 44/64 | 35/64 | BLACK EDGE: 13<br>WHITE EDGE: 57 |
| S3<br>S7 | 44/64 | 29/64 | BLACK EDGE: 7<br>WHITE EDGE: 51 |
| S19<br>T17 | 56/64 | 32/64 | BLACK EDGE: 4<br>WHITE EDGE: 60 |

(SECOND SIGNAL DELAY MEANS 322)

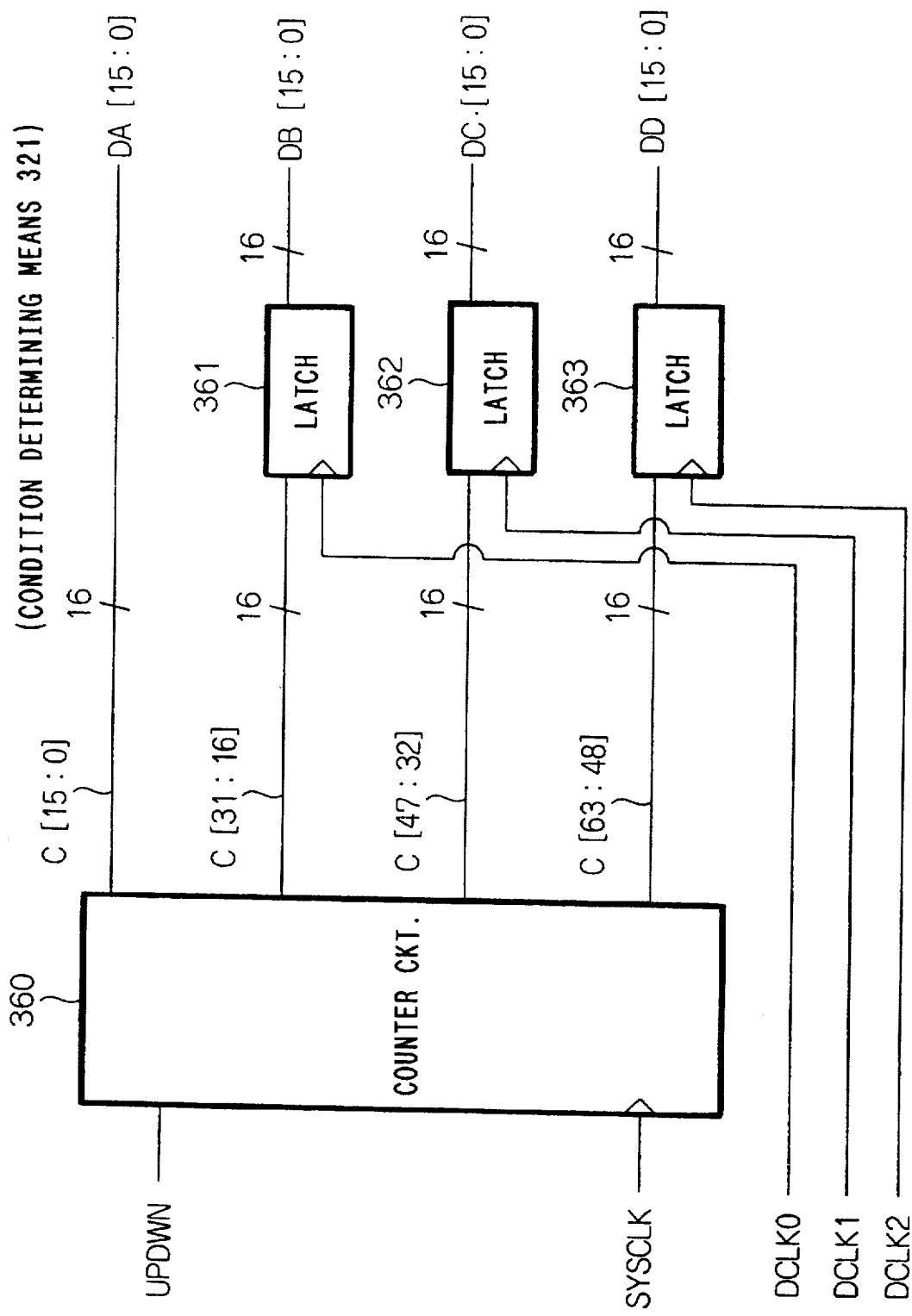
FIG. 77 (CONDITION DETERMINING MEANS 321)

FIG.78

| C[63:48] | C[47:32] | C[31:16] | C[15:0] |
|---|---|---|---|
| 0000 | 0000 | 0000 | 0000 |
| 0000 | 0000 | 0000 | 0001 |
| 0000 | 0000 | 0001 | 0001 |
| 0000 | 0001 | 0001 | 0001 |
| 0001 | 0001 | 0001 | 0001 |
| 0001 | 0001 | 0001 | 0003 |
| 0001 | 0001 | 0003 | 0003 |
| 0001 | 0003 | 0003 | 0003 |
| 0003 | 0003 | 0003 | 0003 |
| 0003 | 0003 | 0003 | 0007 |
| 0003 | 0003 | 0007 | 0007 |
| 0003 | 0007 | 0007 | 0007 |
| 0007 | 0007 | 0007 | 0007 |
| 0007 | 0007 | 0007 | 000F |
| 0007 | 0007 | 000F | 000F |
| 0007 | 000F | 000F | 000F |
| 000F | 000F | 000F | 000F |
| 000F | 000F | 000F | 001F |
| 000F | 000F | 001F | 001F |
| 000F | 001F | 001F | 001F |
| 001F | 001F | 001F | 001F |
| 001F | 001F | 001F | 003F |
| 001F | 001F | 003F | 003F |
| 001F | 003F | 003F | 003F |
| 003F | 003F | 003F | 003F |
| 003F | 003F | 003F | 007F |
| 003F | 003F | 007F | 007F |
| 003F | 007F | 007F | 007F |
| 007F | 007F | 007F | 007F |
| 007F | 007F | 007F | 00FF |
| 007F | 007F | 00FF | 00FF |
| 007F | 00FF | 00FF | 00FF |
| 00FF | 00FF | 00FF | 00FF |
| 00FF | 00FF | 00FF | 01FF |
| 00FF | 00FF | 01FF | 01FF |
| 00FF | 01FF | 01FF | 01FF |
| 01FF | 01FF | 01FF | 01FF |
| 01FF | 01FF | 01FF | 03FF |
| 01FF | 01FF | 03FF | 03FF |
| 01FF | 03FF | 03FF | 03FF |
| 03FF | 03FF | 03FF | 03FF |
| 03FF | 03FF | 03FF | 07FF |
| 03FF | 03FF | 07FF | 07FF |
| 03FF | 07FF | 07FF | 07FF |
| 07FF | 07FF | 07FF | 07FF |
| 07FF | 07FF | 07FF | 0FFF |
| 07FF | 07FF | 0FFF | 0FFF |
| 07FF | 0FFF | 0FFF | 0FFF |
| 0FFF | 0FFF | 0FFF | 0FFF |
| 0FFF | 0FFF | 0FFF | 1FFF |
| 0FFF | 0FFF | 1FFF | 1FFF |
| 0FFF | 1FFF | 1FFF | 1FFF |
| 1FFF | 1FFF | 1FFF | 1FFF |
| 1FFF | 1FFF | 1FFF | 3FFF |
| 1FFF | 1FFF | 3FFF | 3FFF |
| 1FFF | 3FFF | 3FFF | 3FFF |
| 3FFF | 3FFF | 3FFF | 3FFF |
| 3FFF | 3FFF | 3FFF | 7FFF |
| 3FFF | 3FFF | 7FFF | 7FFF |
| 3FFF | 7FFF | 7FFF | 7FFF |
| 7FFF | 7FFF | 7FFF | 7FFF |
| 7FFF | 7FFF | 7FFF | FFFF |
| 7FFF | 7FFF | FFFF | FFFF |
| 7FFF | FFFF | FFFF | FFFF |
| FFFF | FFFF | FFFF | FFFF |

DIRECTION OF COUNT UP (UPDWN=1)

DIRECTION OF COUNT DOWN (UPDWN=0)

(SECOND SIGNAL DELAY MEANS 322)

(FIRST SIGNAL DELAY MEANS 330 TO 333)

F I G. 82
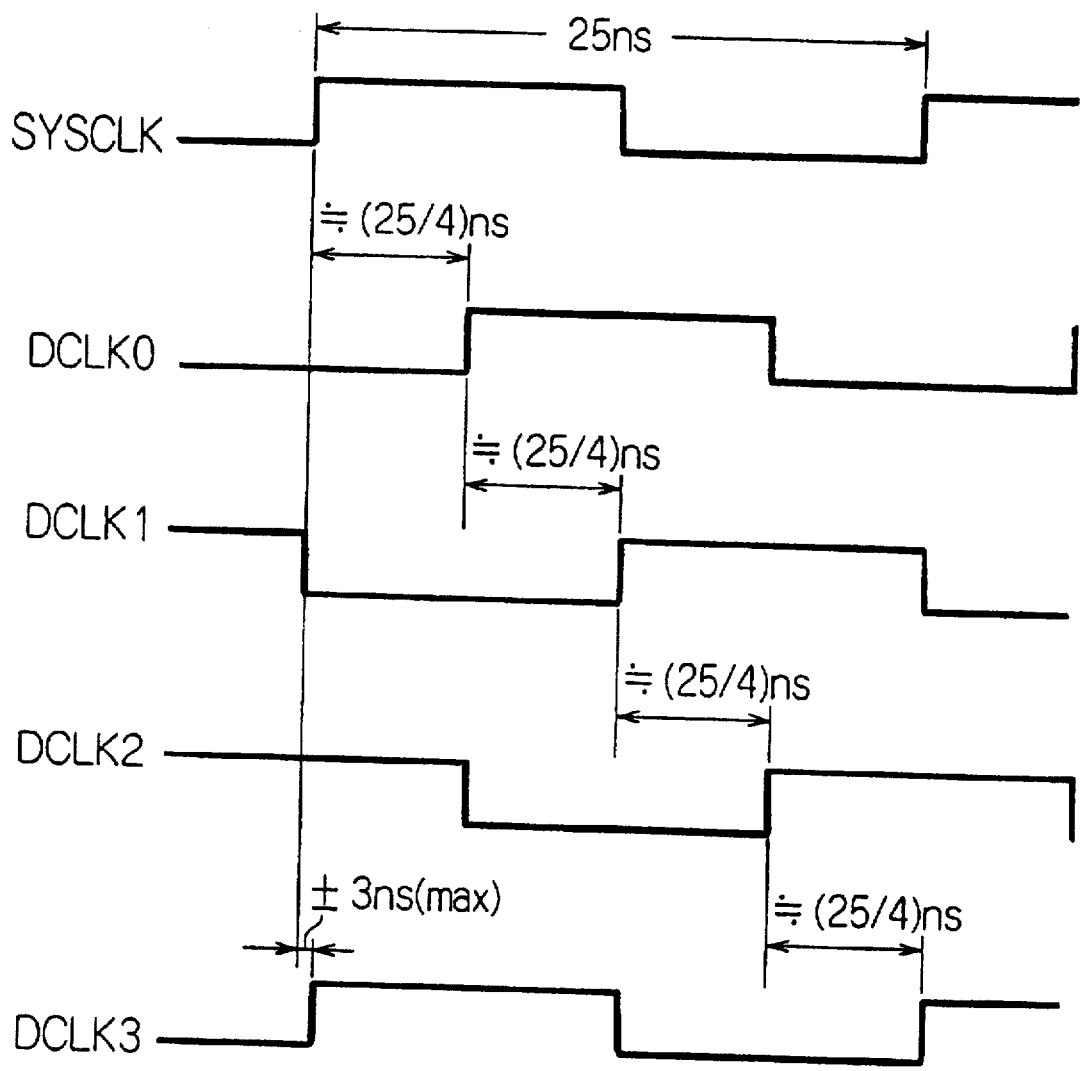

F I G. 83
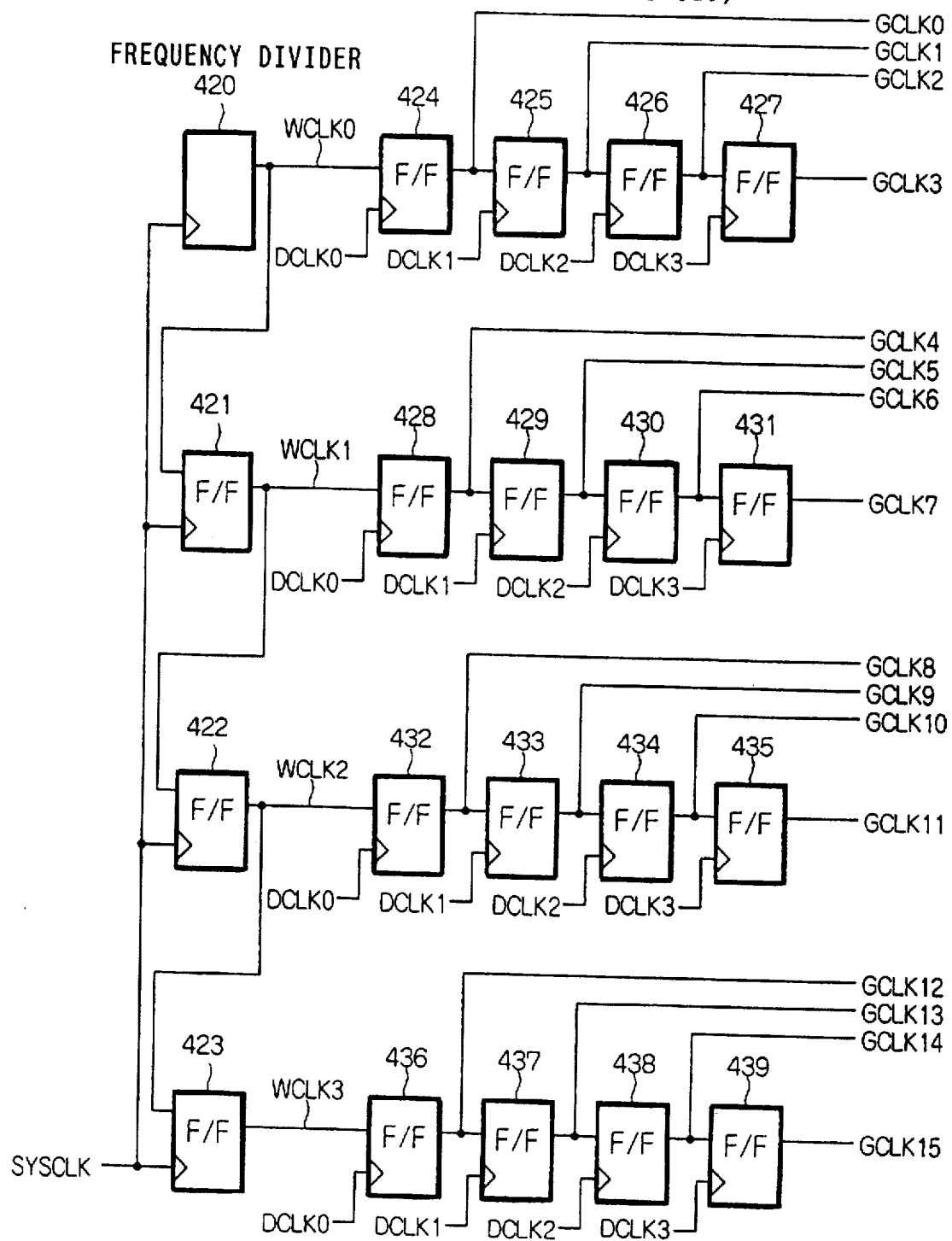

FIG.86

| INPUT DATA | | | | | | | | | | | | | | | | DETECTION RESULT PENC[3:0] |
|---|---|---|---|---|---|---|---|---|---|---|---|---|---|---|---|---|
| A0 | A1 | A2 | A3 | A4 | A5 | A6 | A7 | A8 | A9 | A10 | A11 | A12 | A13 | A14 | A15 | |
| 0 | 0 | 0 | 0 | 0 | 0 | 0 | 0 | 1 | 1 | 1 | 1 | 1 | 1 | 1 | 1 | 0 |
| 1 | 0 | 0 | 0 | 0 | 0 | 0 | 0 | 0 | 1 | 1 | 1 | 1 | 1 | 1 | 1 | 1 |
| 1 | 1 | 0 | 0 | 0 | 0 | 0 | 0 | 0 | 0 | 1 | 1 | 1 | 1 | 1 | 1 | 2 |
| 1 | 1 | 1 | 0 | 0 | 0 | 0 | 0 | 0 | 0 | 0 | 1 | 1 | 1 | 1 | 1 | 3 |
| 1 | 1 | 1 | 1 | 0 | 0 | 0 | 0 | 0 | 0 | 0 | 0 | 1 | 1 | 1 | 1 | 4 |
| 1 | 1 | 1 | 1 | 1 | 0 | 0 | 0 | 0 | 0 | 0 | 0 | 0 | 1 | 1 | 1 | 5 |
| 1 | 1 | 1 | 1 | 1 | 1 | 0 | 0 | 0 | 0 | 0 | 0 | 0 | 0 | 1 | 1 | 6 |
| 1 | 1 | 1 | 1 | 1 | 1 | 1 | 0 | 0 | 0 | 0 | 0 | 0 | 0 | 0 | 1 | 7 |
| 1 | 1 | 1 | 1 | 1 | 1 | 1 | 1 | 0 | 0 | 0 | 0 | 0 | 0 | 0 | 0 | 8 |
| 0 | 1 | 1 | 1 | 1 | 1 | 1 | 1 | 1 | 0 | 0 | 0 | 0 | 0 | 0 | 0 | 9 |
| 0 | 0 | 1 | 1 | 1 | 1 | 1 | 1 | 1 | 1 | 0 | 0 | 0 | 0 | 0 | 0 | 10 |
| 0 | 0 | 0 | 1 | 1 | 1 | 1 | 1 | 1 | 1 | 1 | 0 | 0 | 0 | 0 | 0 | 11 |
| 0 | 0 | 0 | 0 | 1 | 1 | 1 | 1 | 1 | 1 | 1 | 1 | 0 | 0 | 0 | 0 | 12 |
| 0 | 0 | 0 | 0 | 0 | 1 | 1 | 1 | 1 | 1 | 1 | 1 | 1 | 0 | 0 | 0 | 13 |
| 0 | 0 | 0 | 0 | 0 | 0 | 1 | 1 | 1 | 1 | 1 | 1 | 1 | 1 | 0 | 0 | 14 |
| 0 | 0 | 0 | 0 | 0 | 0 | 0 | 1 | 1 | 1 | 1 | 1 | 1 | 1 | 1 | 0 | 15 |

(THIRD SIGNAL DELAY MEANS 325)

FIG. 98(a)
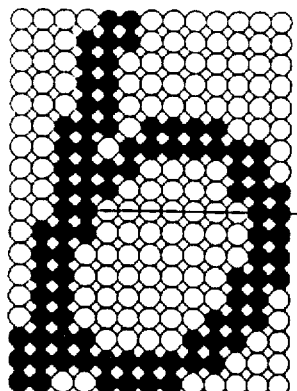
550a
BIT MAP IMAGE
FIG. 98(b)
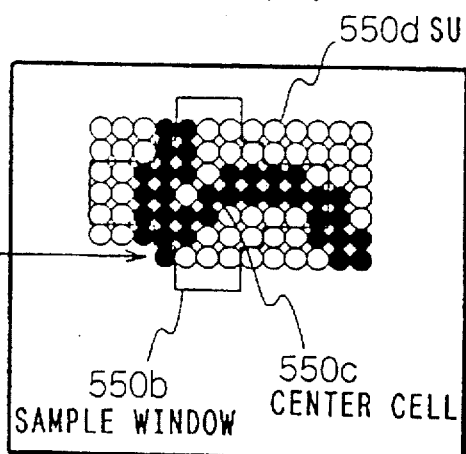
550d SUB SET
550b SAMPLE WINDOW    550c CENTER CELL
550 FIFO BUFFER
FIG. 98(c)
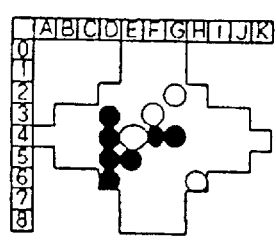
FIG. 98(d)
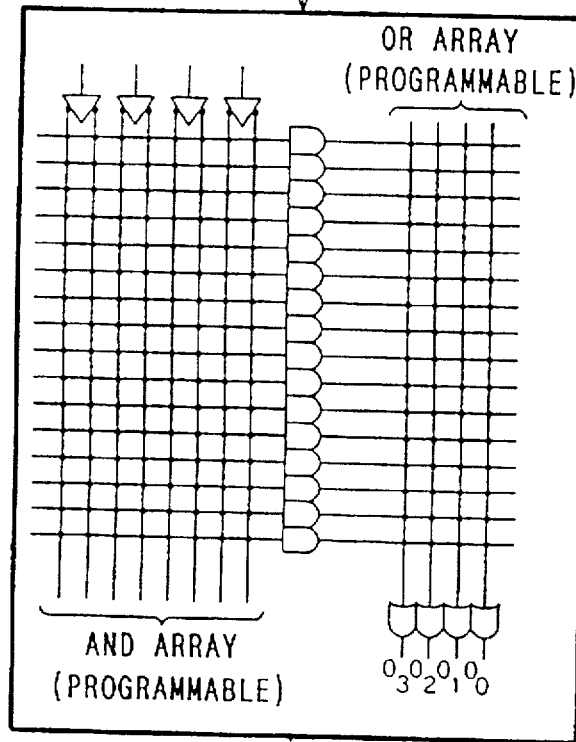
OR ARRAY (PROGRAMMABLE)
AND ARRAY (PROGRAMMABLE)
$O_3 O_2 O_1 O_0$
551 PIECEWISE NETWORK
552 COMPENSATION SUB CELL GENERATOR
EQUIVALENT IMAGE
552a
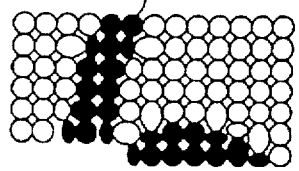
FIG. 98(e)

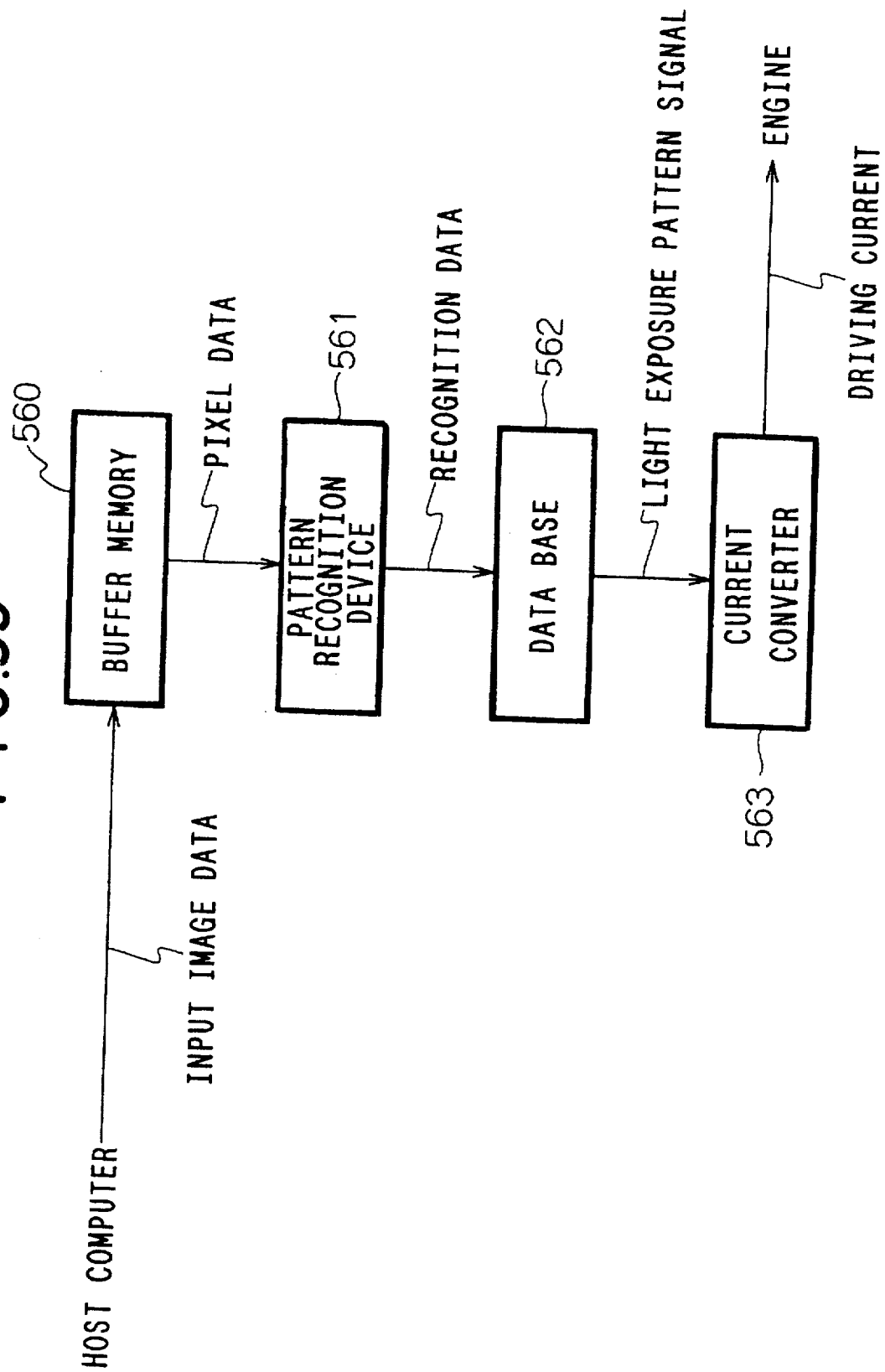

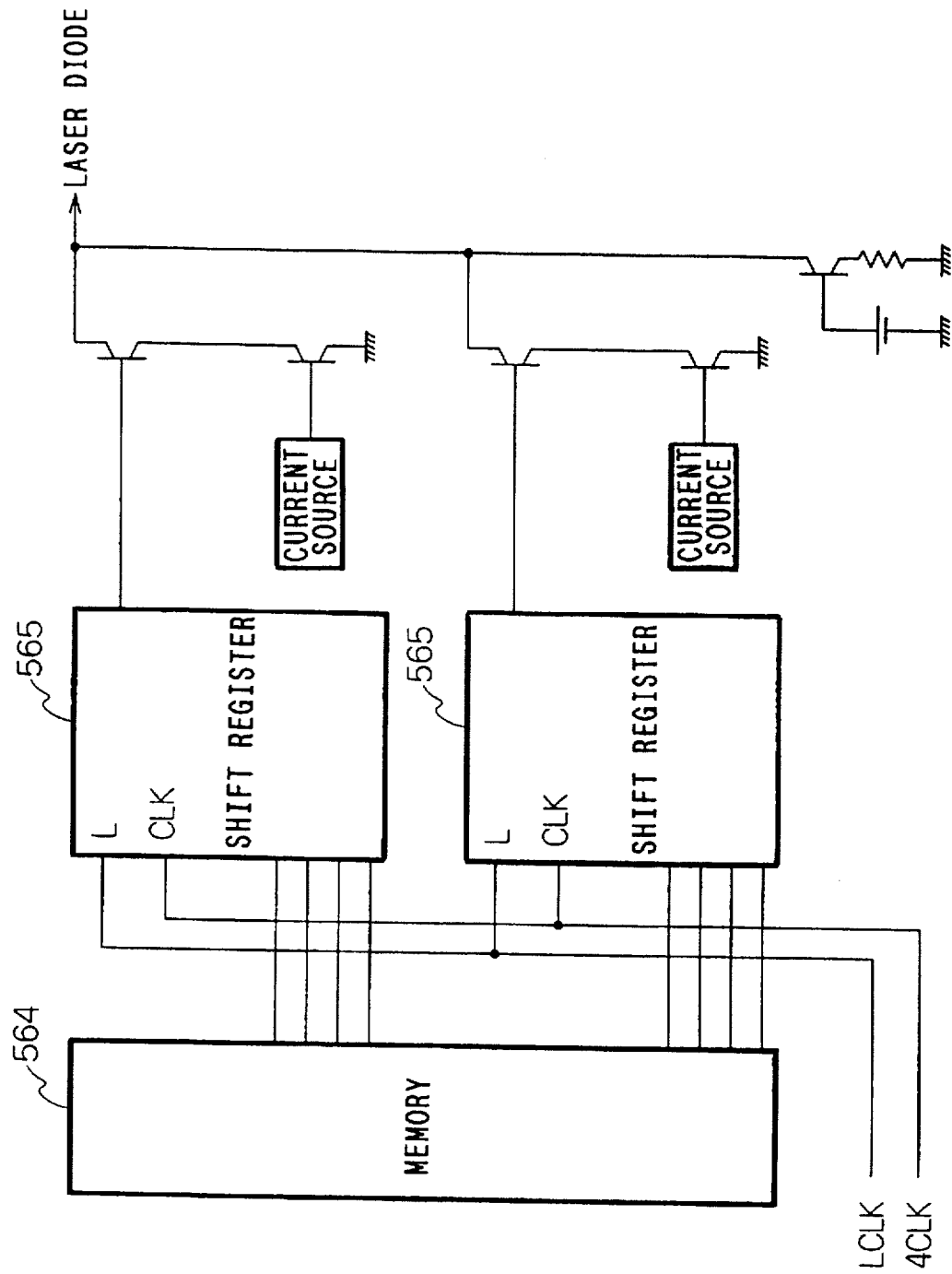

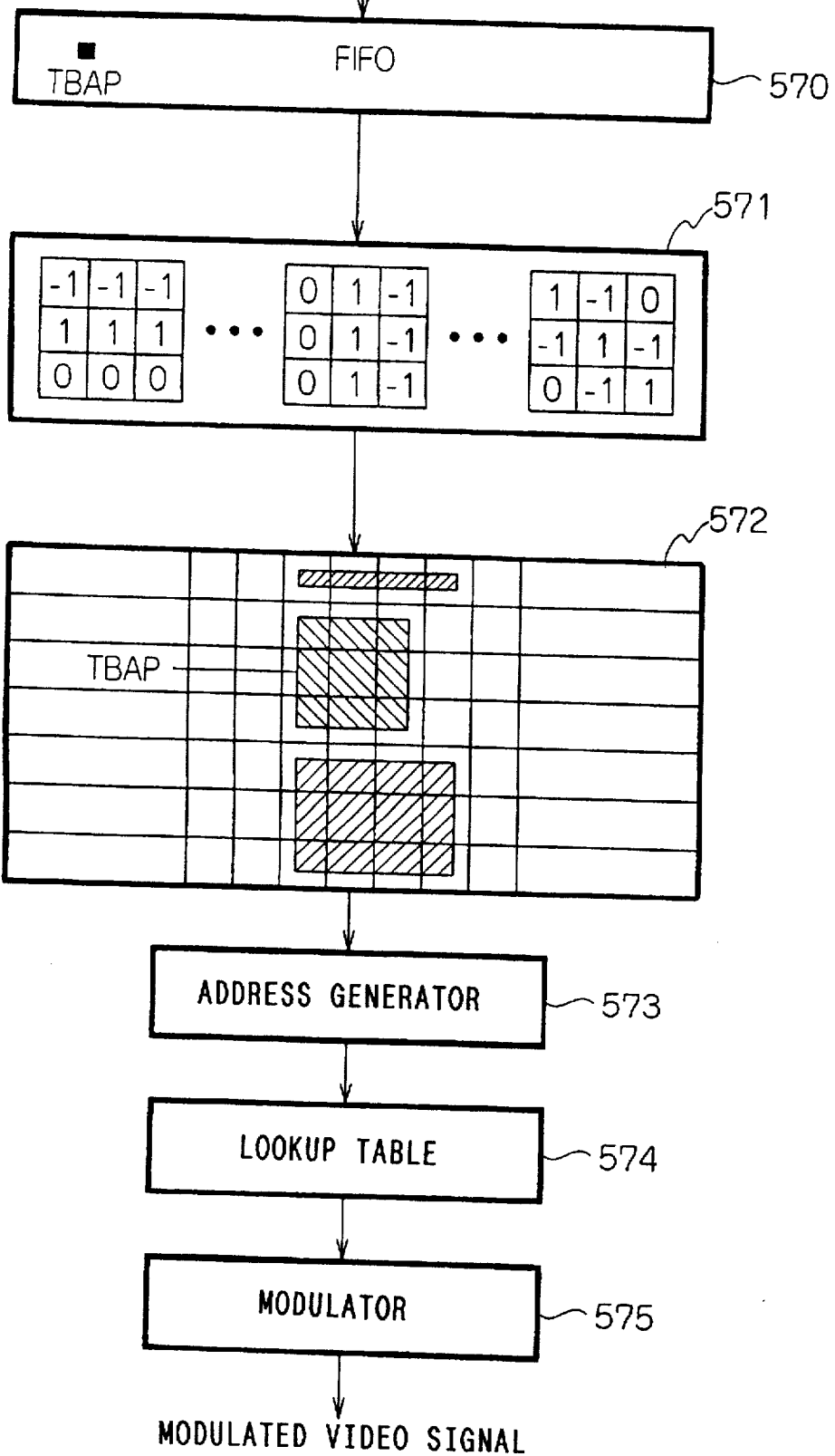

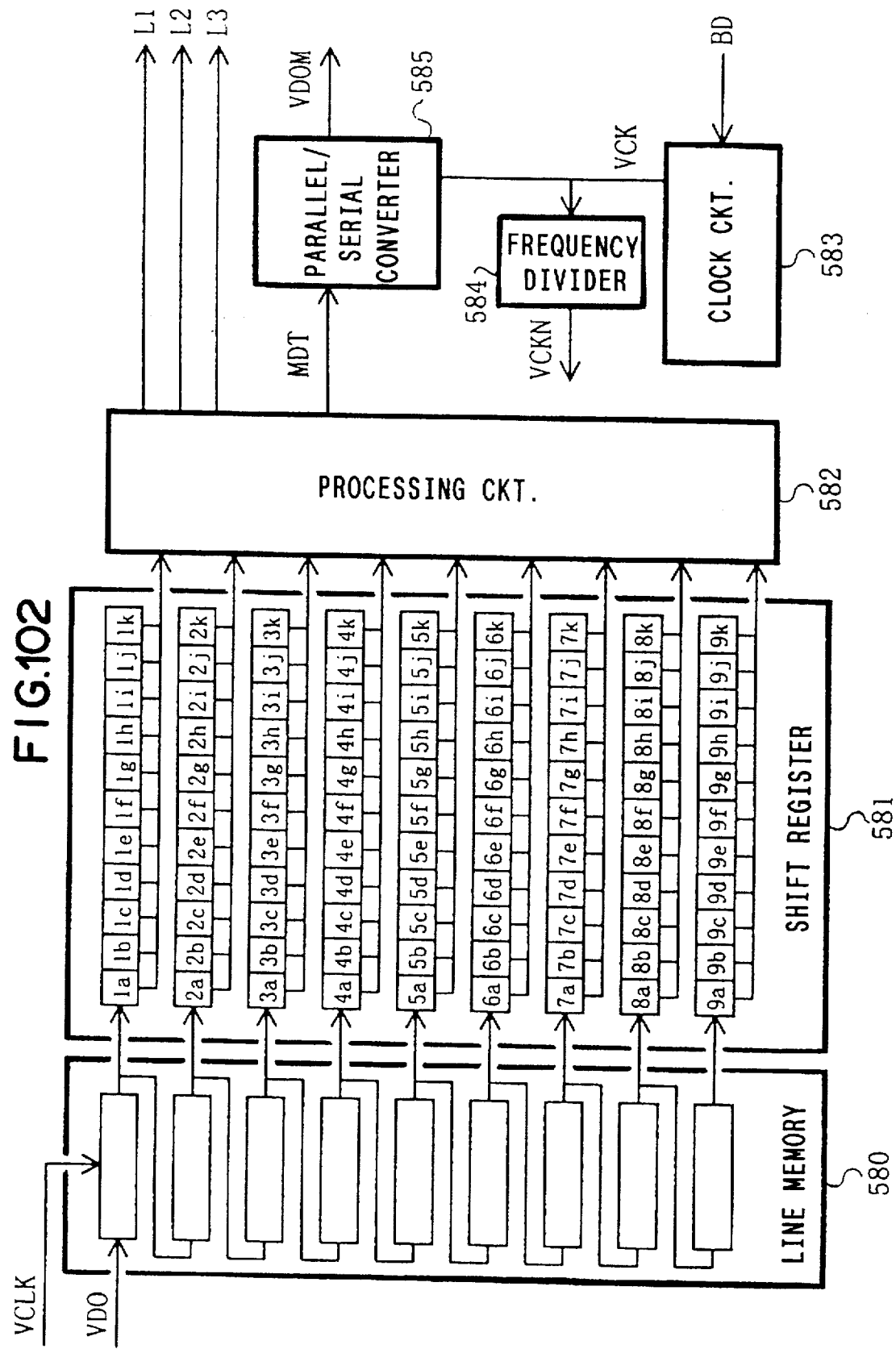

ELECTROPHOTOGRAPHIC PRINTER

BACKGROUND OF THE INVENTION

1. Field of the Invention

The present invention relates to an electrophotographic printer, and more particularly to an electrophotographic printer having a smoothing circuit for smoothing slant portions of characters and figures on the basis of modulated video signals to enhance image quality.

2. Description of Related Art

As a technique on a smoothing circuit in a conventional electrophotographic printer have been known Japanese Laid-open Patent Application No. Hei-2-112966 entitled "IMAGE OUTPUTTING METHOD AND DEVICE" and U.S. Pat. No. 4,847,641 entitled "PIECE-WISE PRINTIMAGE ENHANCEMENT FOR DOT MATRIX PRINTER" which were filed by and patented to Hewlett-Packard Company, Japanese Laid-open Patent Application No. Hei-3-33769 entitled "OPTICAL RECORDING DEVICE" filed by Hitachi, Ltd., and Japanese Laid-open Patent Application No. Hei-5-6438 entitled "METHOD FOR CORRECTING PICTURES DISPLAYED BY PRINT DEVICE OR DISPLAY DEVICE AND DEVICE FOR CORRECTING OUTPUT OF PRINT DEVICE AND DISPLAY DEVICE FOR PRODUCING DIGITALIZED PICTURES IN DOT MATRIX FORMAT" and U.S. Pat. No. 5,029,108 entitled "EDGE ENHANCEMENT METHOD AND APPARATUS FOR DOT MATRIX DEVICES" which have been filed by and patented to Destiny Technology Corporation.

Further, there have been also known Japanese Laid-open Patent Application No. Hei-4-268867 entitled "INFORMATION RECORDING DEVICE", Japanese Laid-open Patent Application No. Hei-4-341060 entitled "INFORMATION RECORDING DEVICE" and Japanese Laid-open Patent Application No. Hei-6-992 entitled "RECORDING DEVICE" which were filed by Canon Inc., Japanese Laid-open Patent Application No. Hei-4-304070 entitled "IMAGE PROCESSING DEVICE" filed by Ricoh Co., Ltd., Japanese Patent Application No. Hei-5-500443 entitled "RASTER PRINT DRIVING DEVICE" and U.S. Pat. No. 5,109,283 entitled "RASTER SCANNING ENGINE DRIVER WHICH INDEPENDENTLY LOCATES ENGINE DRIVE SIGNAL TRANSISTORS WITHIN EACH CELL AREA" which were filed by Xerographic Laser Images Corporation".

According to the Japanese Laid-open Patent application No. Hei-2-112966 and U.S. Pat. No. 4,847,641, as shown in FIG. 98, there are provided an FIFO buffer 550 for outputting a sampling window formed of 49 cells containing the center cell which are selected from a subset 11 bits×7 lines formed by inputting a bit map image, a piecewise matching network for inputting the sampling window to compare plural preset templates, and a compensation sub cell generator 552 for replacing the center cell of the sampling window by a compensation sub cell and outputting it if the sampling window is coincident with any template or directly outputting the center cell as it is if the sampling window is coincident with no template. The setting of the templates and the detection of the coincidence in the piecewise network 551 are performed by a programmable logic array (PLA). Generation of a compensation sub cell in the compensation sub cell generator 552 is performed with a clock whose period is equal to eight times of the period of the ordinary video output, and the compensation sub cell generator 552 generates eight kinds of compensation sub cells in accordance with the kind of the coincident template.

According to the Japanese Laid-open Patent Application No. Hei-3-33769, as show in FIGS. 99 and 100, there are provided a buffer memory 560 which has a memory capacity of four lines and is adapted to store pixel data corresponding to pixels to be recorded and pixel data around the pixel data concerned within a predetermined range from input pixel data of a host computer, a pattern recognition device 561 for recognizing on the basis of the stored pixel data what kind of image the pixel data corresponding to the recording image quality belongs to as a pixel, and outputting a recognition result as recognition data, a data base 562 for storing a light exposure pattern signal on a photosensitive member of an engine so that the recording pixel can be most ideally recorded, and selecting a light exposure pattern signal on the basis of recognition data, and a current converter 563 for converting the light exposure pattern signal to a driving current for the engine. The pattern recognition in the pattern recognition device 561 and the definition of the light exposure pattern signal to the recognition data in the data base 562 are performed by a memory 564 in which a value of five pixels in longitudinal direction and five pixels in lateral direction is set as an address. The generation of the driving current in the current converter 563 is performed by shifting and outputting the light exposure pattern signal with a clock having four times of the period of ordinary video output by shift registers 565, and then generating current values of four levels per bit with a transistor.

According to the Japanese Laid-open Patent Application No. Hei-5-6438 and U.S. Pat. No. 5,029,108, as shown in FIG. 101, there are provided an FIFO 570 which has a capacity of seven lines and is adapted to temporarily store input video picture data to assign a predetermined bit location as TBAP (to-be-adjusted-pixel), a gradient mask edge detector 571 for detecting an edge segment on the basis of a convolution of a 3×3 pattern matrix containing the TBAP at the center thereof and a 3×3 gradient mask matrix and classifying the bit pattern matrixes into either a horizontal or vertical group on the basis of the direction of gradient change indicated by the result of the convolution while previously-evaluated pixels and yet-to-be-evaluated pixels are contained, a segment change detector 572 for comparing the vertical and horizontal groups with vertical and horizontal sets of reference bit patterns to judge necessity of correction of TBAP, and generating a specific internal code when the necessity is judged, an address generator 573 for converting the internal code to an address code, a lookup table 574 for receiving the address code and outputting a modulation instruction code, and a modulator 575 for outputting a video signal which is modulated by the modulation instruction signal. The generation of the video signal modulated in the modulator 575 is performed by forward and reverse clocks of eight times of the period of the ordinary video output.

According to the Japanese Laid-open patent Application No. Hei-6-992, as shown in FIGS. 102 and 103, there are provided a line memory 580 which is input with an image signal VDO with a clock signal VCLK and adapted to store dot information of nine lines, a shift register 581 for forming dot matrix data of 11 dots in the main scanning direction and 9 lines in the auxiliary scanning direction on the basis of the output of the line memory 580, a processing circuit 582 for detecting the feature of the dot matrix data to change a pixel being noted (hereinafter referred to as "target pixel") 5$f$ if occasion demands, and outputting a parallel signal MDT of 4 bits and light amount indication codes L1 to L3 of 3 bits indicating the irradiation intensity of each bit, a clock generating circuit 583 for generating a clock signal which is synchronized with a main operating synchronous signal BD and has the frequency of four times of the ordinary output period, a frequency-dividing circuit 583 for quartering the clock signal VCK to generate a clock signal VCKN, and a parallel/serial converter 585 for converting a parallel signal MDT to a serial signal VDOM on the basis of the clock signal VCK.

The feature detection of the target pixel in the processing circuit 582 is performed by a logic circuit which is adapted to detect a boundary line in the neighborhood of the target pixel by collation with predetermined patterns from reference areas of 11×9, a logic circuit for detecting the coincidence of pixels of each of seventeen divided small areas, and a logic circuit for determining the value of the parallel signal MDT and the light amount indication code in accordance with a combination condition of the above detection results. The generation of the driving current of a laser diode is performed by generating current values of 8 levels per bit on the basis of the serial signal VDOM and the light amount indication codes L1 to L3 by constant current switching circuits 586.

According to the Japanese Laid-open patent application No. Hei-4-304070, as shown in FIG. 104, there are provided an FIFO buffer 590 for storing binary image data supplied from a page memory for three(n) lines and supplied the data in m(dot)×n(line) area with a notice picture, a comparison pattern unit 591 for storing comparison patterns each comprising 3 pixels×3 pixels, an enlargement processor 592 for comparing the comparison patterns and image data of a 3×3 area which contain a target pixel at the center thereof and are supplied from the FIFO buffer 590, and performing 2×2-enlargement processing to enlarging the target pixel by 2×2 times in accordance with the comparison result, a line buffer 593 which has a capacity of two lines and is adapted to store data which are enlarged by 2×2 times, and a filter processor 594 for performing spatial filtering processing of 2×2 areas and converting the enlarged image to multivalue data. The multivalue data generated in the filter processor 594 are supplied to a laser printer having a multivalue laser driver.

According to the Japanese Laid-open Patent Application No. Hei-5-500443 and U.S. Pat. No. 5,109,283, as shown in FIG. 105, there are provided a software 600 which operates on a host computer and severs to control the overall print driving device, a line data storage unit 601 for temporarily storing image information input from the host computer, a timing controller 602 for generating necessary timing signal and control signal in response to a horizontal synchronous signal and a vertical synchronous signal of an engine, a lookup table 603 for outputting a digital signal indicating the position of a transition point of an output picture signal in a basic print cell while a data signal transmitted from the line data storage unit 601 is used aa an address, and a modulation circuit 604 for outputting the transition modulation signal to the engine in accordance with the digital signal.

The image information input from the host computer comprises a binary image whose resolution is two times as high as that of the engine in both horizontal and vertical directions, or a multivalue image whose resolution is equal to that of the engine. With respect to the binary image, a pixel array of 4 pixels in the horizontal direction and 4 pixels in the vertical direction is set as a basic print cell, and it is used as an address for the lookup table 603. With respect to the multivalue image, a pixel array of 2 pixels in the horizontal direction and 2 pixels in the vertical direction is set as a basic print cell, and the value of each pixel and the position information are set as an address for the lookup table 603. A synchronizing circuit for generating a basic double clock signal in the timing controller 602 comprises a selection circuit 605, a delay circuit 606, a priority encoder 608, etc. as shown in FIG. 106. The modulation circuit 604 is achieved by an analog circuit comprising a D/A converter, an analog/ramp generator, a comparator and a coupler. Further, in place of the timing controller 602 and the modulation circuit 604, a digital picture signal modulation circuit which comprises a digital circuit may be used.

The conventional electrophotographic printers as described above have the following problems.

First, in the Japanese Laid-open Patent Application No. Hei-2-112966 and the U.S. Pat. No. 4,847,641, since the templates are empirically-derived bit patterns representing composite error elements which are common to all the bit map images, tests and estimations are required for various images every engine in order to design the templates and establish the association between each template and each compensation sub cell, and an application to each individual device is not easy. Further, since the compensation sub cell is generated with the clock based on an ordinary oscillator, the variation point of the compensation sub cell becomes rough when the transmission rate of the video signal is high, and thus the optimum compensation sub cell cannot be generated, so that the best image quality cannot be obtained. In addition, an FIFO buffer having a capacity enough to store pixels of eight lines is needed, resulting in cost-up.

In the Japanese Laid-open Patent Application No. Hei-3-33769, calculations and recording tests are required for various images every engine in order to design recognition data and establish the association between each recognition data and a light exposure pattern signal, and thus an application to each individual device is not easy. Further, the engine is required to be a multivalue laser printer having a representation capability of 4-level gray scale and this technique is not applicable to a general binary laser printer. Further, the driving current to the engine is merely varied at 4-division/4-level per output pixel, and synchronization based on the clock signal of four times increases jitter in the horizontal direction, so that the best image quality cannot be obtained. In addition, a buffer memory having a capacity enough to store pixels of four lines and a memory having a 25-bit address space for generating the light exposure pattern signal are needed, resulting in cost-up.

In the Japanese Laid-open Patent Application NO. Hei-5-6438 and the U.S. Pat. No. 5,029,108, a slight improvement is made from the viewpoint of the direction of the gradient change of a 3×3 area having a target pixel at the center thereof. However, no clear definition is provided to the design of the reference bit pattern and the establishment of the connection (association) between each detection result and the address code, and this definition must be prepared every device. Therefore, the application of this technique to an individual device is not easily performed. Further, since the modulated video signal is generated by the clock based on the ordinary oscillator, the variation point of the video signal becomes rough when the transmission rate of the video signal is high, so that the optimum video signal cannot be generated and thus the best image quality cannot be achieved. In addition, since an FIFO having a capacity enough to store pixels of seven lines, the cost is increased.

In the Japanese Laid-open Patent Application No. Hei-6-992, Japanese Laid-open Patent Application No. Hei-4-341060 and the Japanese Laid-open Patent Application No. Hei-4-268867, an improvement is acknowledged from the viewpoint of the support of the binary half-tone images. However, the association between the result of the feature detection of the target pixel and the output signal to the engine in the processing circuit is fixed in the circuit, and this circuit must be designed and prepared every device. Therefore, the application to an individual device cannot be easily preformed. Further, a multivalue laser printer having a representation capability of 8-level gray scale must be used as the engine, and thus this technique is not applicable to a general binary laser printer. Still further, the driving current to the engine is merely varied at 4-division/8-level per output pixel, and the synchronization based on the clock signal of four times increases the jitter in the horizontal direction, so that the best image quality cannot be obtained. In addition, a line memory having a capacity enough to store pixels of 9 lines is needed, so that the cost is increased.

In the Japanese Laid-open Patent Application No. Hei-4-304070, since the scale of enlargement in the enlargement processor is fixed, there are some input images for which the contours of the enlarged images cannot be smoothed. Further, since the multivalue data generated in the filter processor is disposed at the center of print pixels, the contour of the output image cannot be aligned, and thus the best image quality cannot be obtained. Still further, this technique is used on the assumption that a multivalue laser printer is used, and it is not applicable to a general binary laser printer. In addition, a line buffer is needed to hold an enlarged image, and thus the cost must be increased.

In the Japanese Laid-open Patent Application No. Hei-5-500443 and the U.S. Pat. No. 5,109,283, an image to be generated is a binary image having two-times resolution in the horizontal and vertical directions or a multivalue image of 8 bits. Therefore, in the case of the binary image, a memory capacity and a processing capability of four times are needed. In the case of the multivalue image, a memory capacity and a processing capability of eight times are needed. Therefore, this technique causes the cost to increase remarkably. Further, in the case of the binary image, the frequency of the maximum transition in the basic print cell of input four pixels is equal to 2, and thus a larger amount of information may be lost as compared with an ordinary print mode. On the other hand, since the transition modulation signal is generated with plural clock signals using a delay circuit, this technique may be applied even when the transmission rate of the video signal is high, and the jitter in the horizontal direction can be minimized. However, the delay circuit is constructed by an LCR time-constant circuit or a one-shot multivibrator. Not only does the characteristic of each of these constituent elements of the delay circuit have a large dispersion, but also the characteristic itself is greatly varied with variation of temperature and applied voltage. Therefore, a user must provide an observing means and an adjusting means for the delay characteristic, and must adjust the delay characteristic to his desired characteristic by using these means at all times.

SUMMARY OF THE INVENTION

An object of the present invention is to provide an electrophotographic printer which can overcome the disadvantages of the conventional techniques, and can perform precise smoothing processing by merely setting the characteristic of an engine.

In order to attain the above object, an electrophotographic printer includes a controller for generating image data on the basis of received print data, a smoothing circuit for outputting a video signal which is modulated to smooth edge portions in an image generated by said controller, and an engine for recording the image on a sheet in accordance with the video signal output from said smoothing circuit, wherein said smoothing circuit includes image input means through which the image data generated by said controller are input, area generating means for generating a reference area comprising a noted pixel located at the center position thereof and reference pixels surrounding the noted pixel on the basis of the image data input to said image input means, feature extracting means for judging whether the reference area generated by said area generating means is an image which should be subjected to smoothing processing by a pattern matching, and detecting the gradient of a contour portion of the image if the reference area is judged to be an image to be subjected to the smoothing processing, resolution-enhancing means for segmenting into small areas each pixel in the reference area generated by said area generating means in accordance with the extraction result of said feature extraction means and then performing resolution-enhancing correction processing, area selecting means for dividing into areas the corrected pixels generated by said resolution-enhancing means in accordance with the resolution ratio of said controller and said engine and then selecting an area to be supplied from the divided areas to next means, density calculation means for calculating the density of the overall selected area on the basis of individual pixel values of the selected area, center-of-gravity calculation means for calculating the center of gravity of the overall selected area on the basis of the individual pixel values of the selected area, characteristic correction means for correcting the density calculated in said density calculation means and the center of gravity calculated in said center-of-gravity calculation means in accordance with preset input/output characteristic information of said engine, variation point calculating means for calculating the variation point of the video signal on the basis of the density and the center of gravity which are corrected by said characteristic correction means, and video output means for outputting the video signal in accordance with the variation point information which is obtained by said variation point calculation means.

Further, the video output means includes first signal delay means for connecting in series at least one kind of delay elements whose number is equal to a to generate delay signals of a from one input signal, and selecting and outputting one of the delay signals of a, second signal delay means for connecting in series first signal delay means whose number is equal to m, and receiving a reference signal having the frequency of n-times of a video signal transmission frequency f which is originally defined by said engine, thereby generating delay signals of m, phase detection means for detecting a phase shift from the reference signal by using the most delayed delay signal of said second signal delay means as a reference signal, condition determining means for determining an output selection condition of said second signal delay means on the basis of the detection result of said phase detection means, signal generating means for generating n×m signals of frequency f which are delayed by 1/(n×m×f) from the reference signal and the m delay signals of said second signal delaying means, signal selection means for selecting from the n×m signals of said signal generating means a signal which is most synchronized with a horizontal synchronous signal output from said engine and setting the selected signal as a zero-phase signal, and setting as a s-phase signal a signal which is delayed from the zero-phase signal by s/(n×m×f), third signal delay means for delaying the horizontal synchronous signal of said engine to avoid the horizontal synchronization during a selection condition transition period of signal selection means, horizontal synchronizing means for receiving the horizontal synchronous signal delayed by said third signal delay means and performing the horizontal synchronization on the basis of the zero-phase signal selected by said signal selection means, and pulse generating means for generating a video signal specified by the variation point information which is output by said variation point calculating means.

BRIEF DESCRIPTION OF THE DRAWINGS

FIG. 11 is a circuit diagram showing the construction of synchronous output means 11 shown in FIG. 1;

FIG. 21 shows detection operators used by feature extraction means shown in FIG. 1, in which 21(a) to 21(e) are diagrams showing the weighted matrix representation of detection operators P1 to P5 when the gradient is equal to +1 and a target pixel is a black pixel;

FIG. 22 shows the detection operators used in the feature extraction means shown in FIG. 1, in which 22(a) to 22(d) are diagrams showing the weighted matrix representation of detection operators P6 to P9 when the gradient is equal to +1 and the target pixel is a white pixel;

FIG. 23 shows the detection operators used in the feature extraction means shown in FIG. 1, in which 23(a) to 23(e) are diagrams showing the weighted matrix representation of detection operators P10 to P14 when the gradient is equal to −1 and the target pixel is a black pixel;

FIG. 24 shows the detection operators used in the feature extraction means shown in FIG. 1, in which 24(a) to 24(d) are diagrams showing the weighted matrix representation of detection operators P15 to P18 when the gradient is equal to −1 and the target pixel is a white pixel;

FIG. 25 shows the detection operators used in the feature extraction means shown in FIG. 1, in which 25(a) to 25(f) are diagrams showing the weighted matrix representation of detection operators P19 to P24 when the gradient is equal to +½ and the target pixel is a black pixel;

FIG. 26 shows the detection operators used in the feature extraction means shown in FIG. 1, in which 26(a) to 26(d) are diagrams showing the weighted matrix representation of detection operators P25 to P28 when the gradient is equal to +½ and the target pixel is a white pixel;

FIG. 27 shows the detection operators used in the feature extraction means shown in FIG. 1, in which 27(a) to 27(f) are diagrams showing the weighted matrix representation of detection operators P29 to P34 when the gradient is equal to −½ and the target pixel is a black pixel;

FIG. 28 shows the detection operators used in the feature extraction means shown in FIG. 1, in which 28(a) to 28(d) are diagrams showing the weighted matrix representation of detection operators P35 to P38 when the gradient is equal to −½ and the target pixel is a white pixel;

FIG. 29 shows the detection operators used in the feature extraction means shown in FIG. 1, in which 29(a) to 29(f) are diagrams showing the weighted matrix representation of detection operators P39 to P44 when the gradient is equal to +2 and the target pixel is a black pixel;

FIG. 30 shows the detection operators used in the feature extraction means shown in FIG. 1, in which 30(a) to 30(d) are diagrams showing the weighted matrix representation of detection operators P45 to P48 when the gradient is equal to +2 and the target pixel is a white pixel;

FIG. 31 shows the detection operators used in the feature extraction means shown in FIG. 1, in which 31(a) to 31(f) are diagrams showing the weighted matrix representation of detection operators P49 to P54 when the gradient is equal to −2 and the target pixel is a black pixel;

FIG. 32 shows the detection operators used in the feature extraction means shown in FIG. 1, in which 32(a) to 32(d) are diagrams showing the weighted matrix representation of detection operators P55 to P58 when the gradient is equal to −2 and the target pixel is a white pixel;

FIG. 49 is a diagram showing resolution-enhancing correction processing of resolution-enhancing means shown in FIG. 1 when the resolution ratio is equal to 1:2, in which 49(a) to 49(d) are diagrams showing the detection operators P15 to P18 when the gradient is equal to −1 and the target pixel is a white pixel;

FIG. 58 is a diagram showing corrected pixels which are generated by a resolution-enhancing procedure when the resolution ratio of the controller and the engine is equal to 1:1;

FIG. 59 is a diagram showing corrected pixels which are generated by the resolution-enhancing procedure when the resolution ratio of the controller and the engine is equal to 1:2;

FIG. 60 is a diagram showing selected areas generated by the area selection means when the resolution ratio of the controller and the engine is equal to 1:1, in which (S1) to (S20) represent the selected areas corresponding to the corrected pixels Q1 to Q20;

FIG. 62 is a diagram showing selected areas generated by the area selection means when the resolution of the controller and the engine is equal to 1:2, in which (T1) to (T18) shows cases when the corrected pixels R1 to R28 are divided;

FIG. 63 is a diagram showing the density of each selected area which is calculated by density calculating means;

FIG. 64 is a diagram showing the center of gravity of each selected area which is calculated by center-of-gravity calculating means shown in FIG. 1;

FIG. 65 is a first diagram showing the relationship between the density/center of gravity and video signals;

FIG. 66 is a second diagram subsequent to the first diagram (FIG. 65), which shows the relationship between the density/center of gravity and the video signals;

FIG. 69 is a diagram showing the relationship between the density/center of gravity and edge data in variation point calculating means shown in FIG. 1;

FIG. 77 is a circuit diagram showing the construction of condition determining means 321 shown in FIG. 72;

FIG. 78 is a diagram showing a count value of a counter circuit 360 shown in FIG. 77;

FIG. 82 is a signal waveform diagram showing the operation of each part in the second signal delay means 322 shown in FIG. 79;

FIG. 83 is a circuit diagram showing the construction of signal generating means 323 shown in FIG. 72;

FIG. 86 is a diagram showing the corresponding relationship between the input and the output in a priority encoder 441 shown in FIG. 85;

FIG. 98 is a diagram showing a prior art as disclosed in Japanese Laid-open Patent Application No. Hei-2-112966 and U.S. Pat. No. 4,847,641, in which an equivalent image is generated through steps (a) to (e);

FIG. 99 is a block diagram showing the construction of a prior art described in Japanese Laid-open Patent Application No. Hei-3-33769;

FIG. 100 is a circuit diagram showing the construction of a current converter shown in FIG. 99;

FIG. 101 is a diagram showing the operation of a prior art described in Japanese Laid-open Patent Application No. Hei-5-6438 and U.S. Pat. No. 5,029,108;

FIG. 102 is a diagram showing the construction of a prior art described in Japanese Laid-open Patent Application NO. Hei-6-992;

DETAILED DESCRIPTION OF THE PREFERRED EMBODIMENTS

Preferred embodiments according to the present invention will be described hereunder with reference to the accompanying drawings.

[MAIN PART OF SMOOTHING CIRCUIT]

Figure 2:
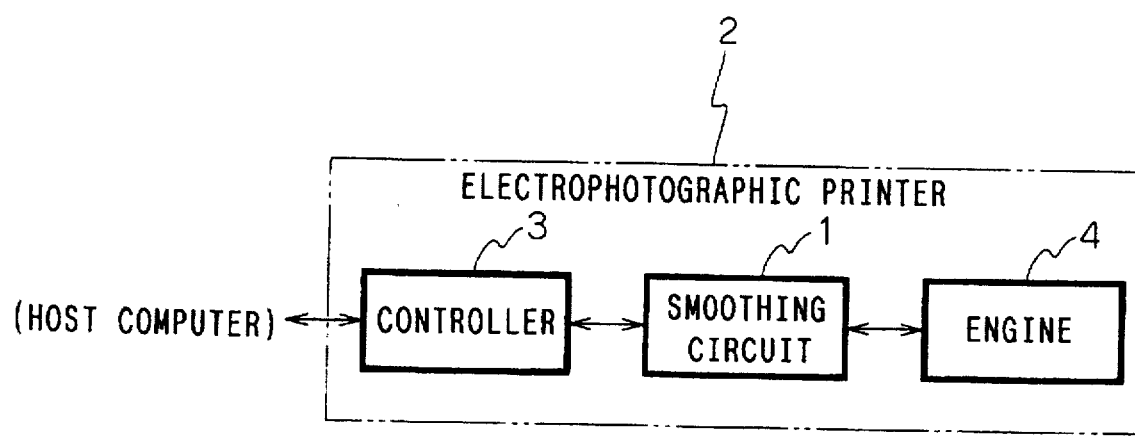
FIG. 2 is a block diagram showing the construction of an electrophotographic printer having the smoothing circuit shown in FIG. 1.

As shown in FIG. 2, an electrophotographic printer according to the present invention includes a controller 3 for generating image data on the basis of print data which are received from a host computer, a smoothing circuit 1 for smoothing edge portions of image data generated by the controller 3 and outputting video signals obtained by modulating the smoothed image data, and an engine 4 for recording image information on a sheet in accordance with the video signal output from the smoothing circuit 1.

Figure 1:
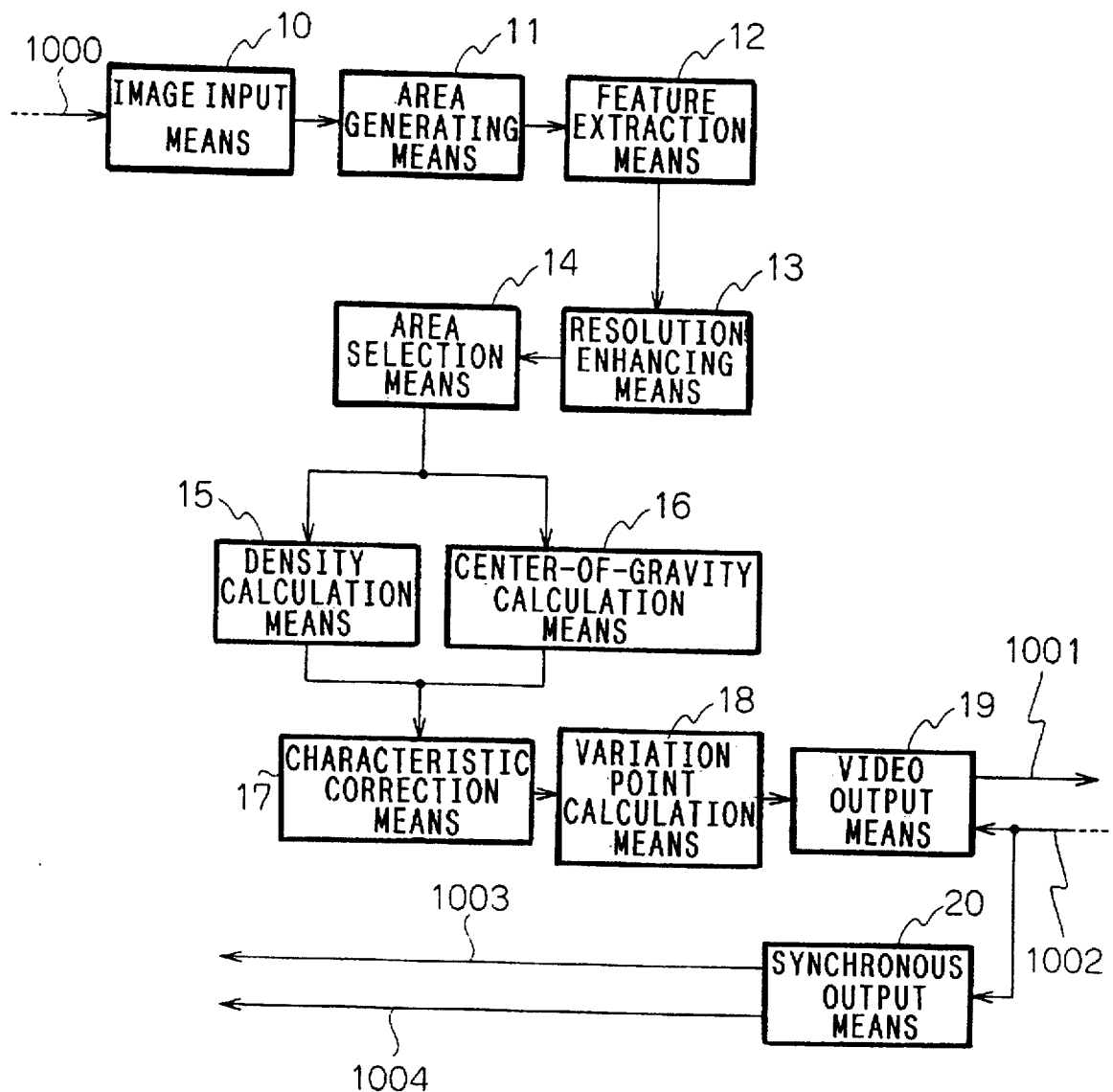
FIG. 1 is a functional block of a smoothing circuit according to a first embodiment of the present invention.

As shown in FIG. 1, the smoothing circuit 1 comprises image input means 10 for inputting the image data generated by the controller 1, area generating means 11 for generating, on the basis of the image data input to the image input means 10, a reference area comprising a pixel being noted (hereinafter referred to as "noted pixel") at the center thereof and reference pixels surrounding the noted pixel, feature extraction means 12 for judging on the basis of pattern matching whether the image of the reference area generated by the area generating means 11 is an image which should be subjected to the smoothing processing, and detecting the gradient of the contour portion of the image concerned if it is judged to be subjected to the smoothing processing, and resolution enhancing means 13 for subdividing into small areas each pixel in the reference area generated by the area generating means 11 and performing resolution-enhancing correction processing.

Figure 20:
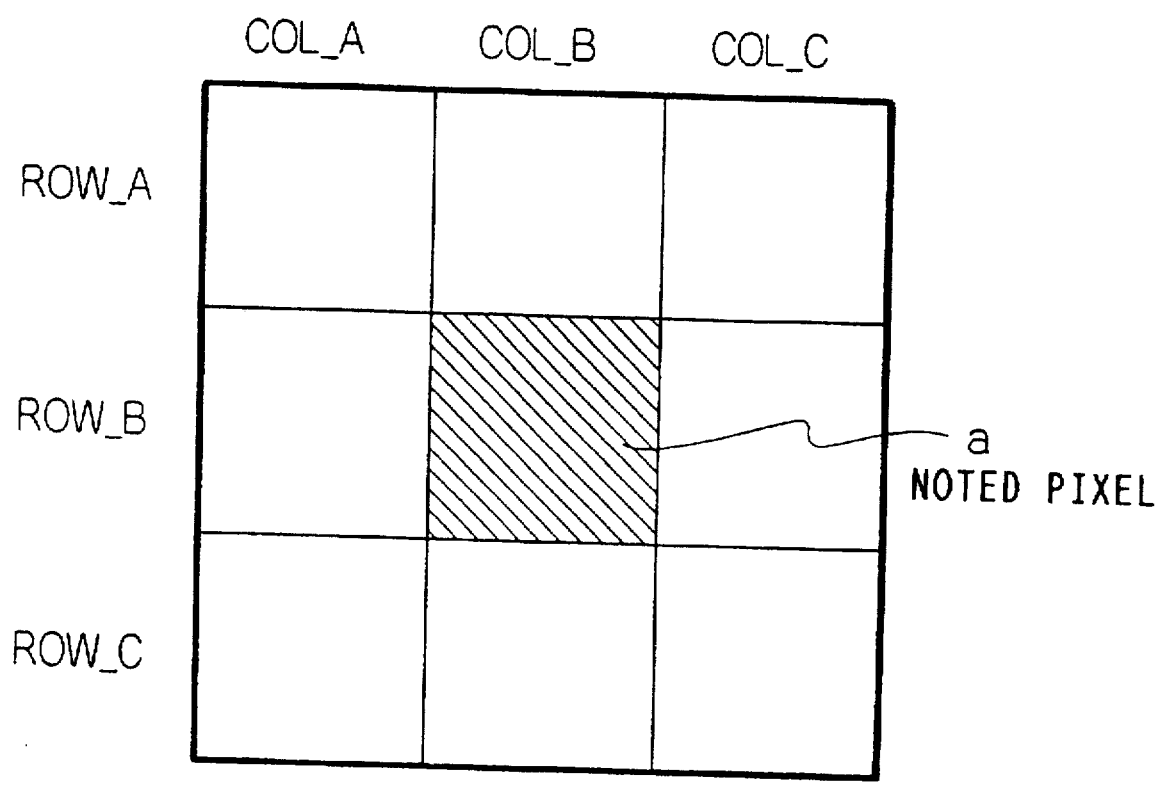
FIG. 20 is a diagram showing an example of a reference area generated by the area generating means shown in FIG. 19.
Figure 33A:
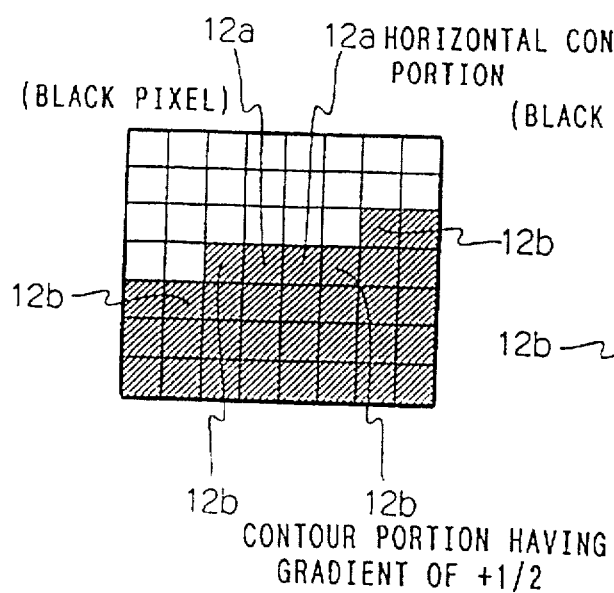
FIG. 33 shows various cases when the gradient is equal to values other than the values shown in FIGS. 21 to 32, in which 33(a) and 33(b) show contours when the gradient is equal to +¼, and 33(c) and 33(d) show contours when the gradient is equal to +⅓.
Figure 33B:
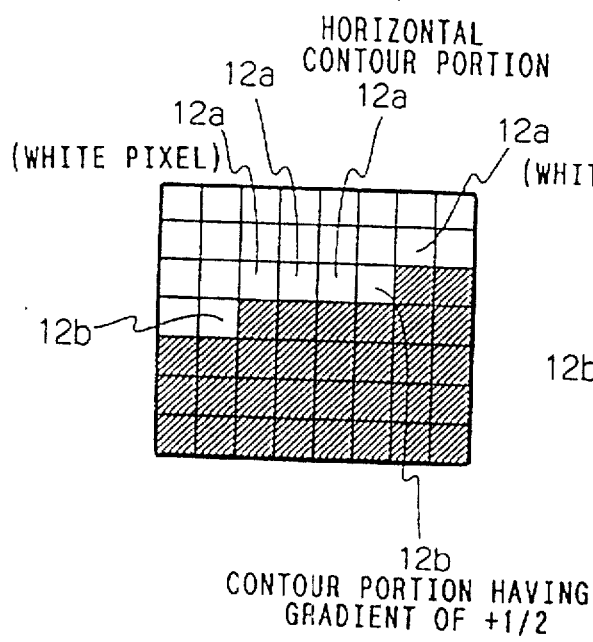
Figure 33C:
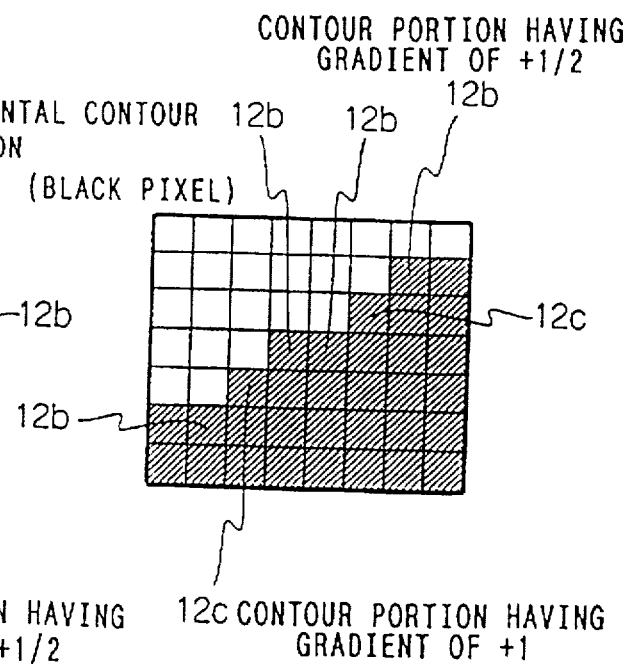
Figure 33D:
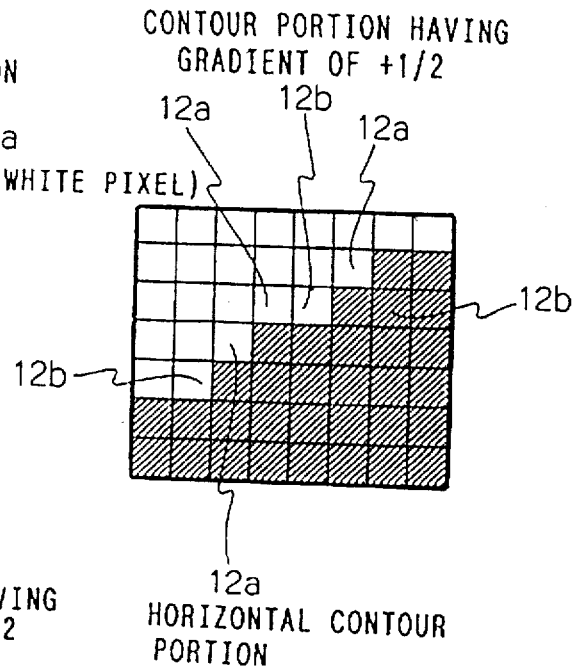
Figure 34A:
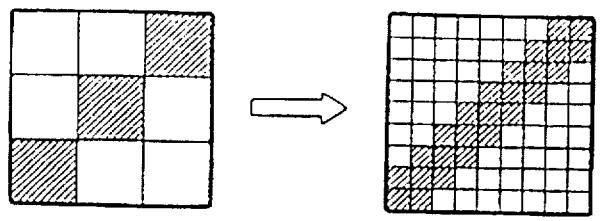
FIG. 34 is a diagram showing resolution-enhancing correction processing of resolution-enhancing means shown in FIG. 1 when the resolution ratio is equal to 1:1, in which 34(a) to 34(e) are diagrams showing the detection operators P1 to P5 when the gradient is equal to +1 and the target pixel is a black pixel.
Figure 34B:
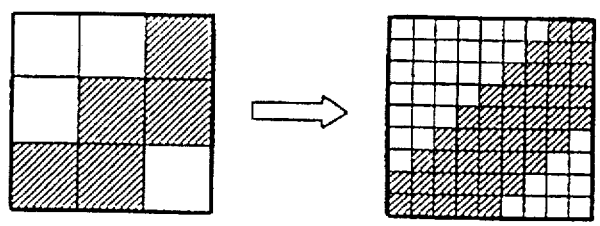
Figure 34C:
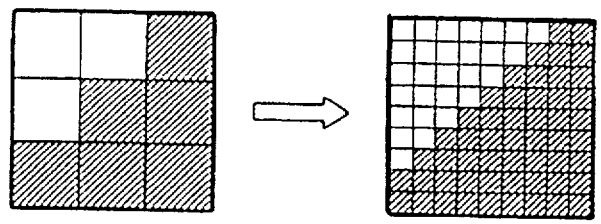
Figure 34D:
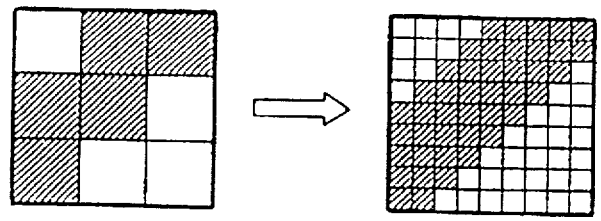
Figure 34E:
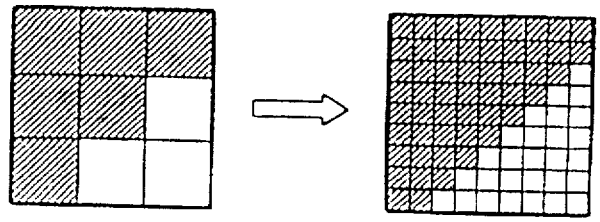
Figure 35A:
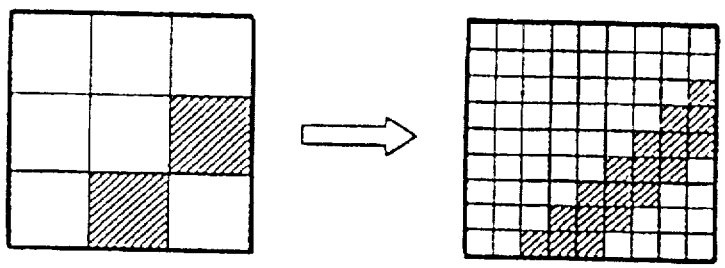
FIG. 35 is a diagram showing resolution-enhancing correction processing of resolution-enhancing means shown in FIG. 1 when the resolution ratio is equal to 1:1, in which 35(a) to 35(d) are diagrams showing the detection operators P6 to P9 when the gradient is equal to +1 and the target pixel is a white pixel.
Figure 35B:
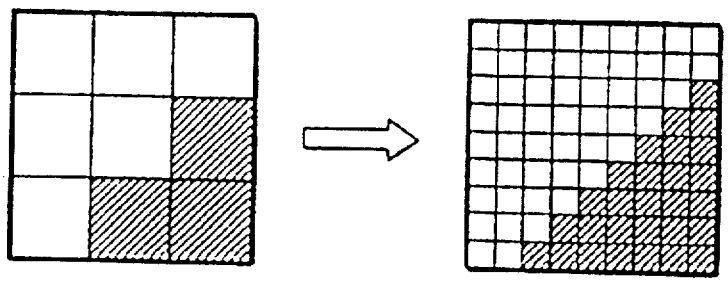
Figure 35C:
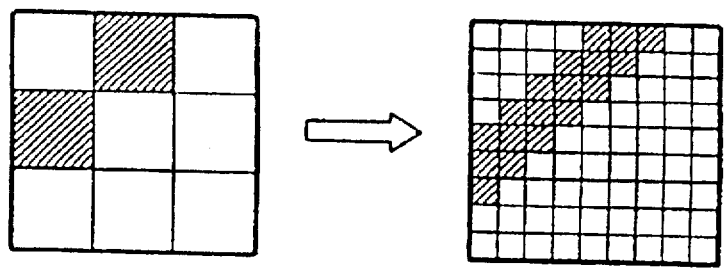
Figure 35D:
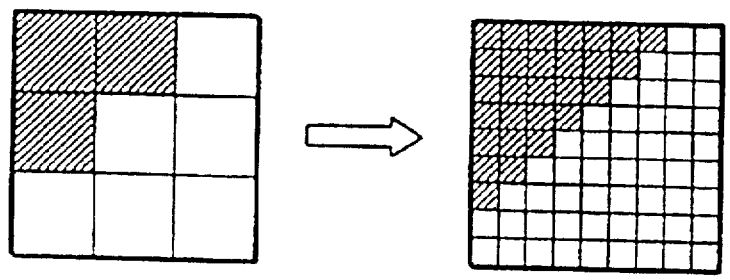
Figure 36A:
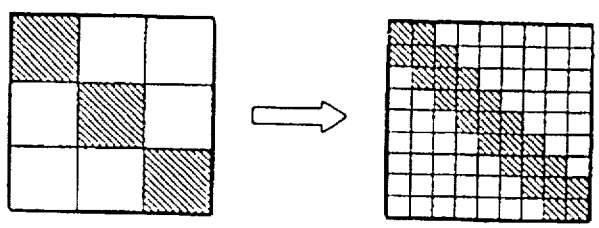
FIG. 36 is a diagram showing resolution-enhancing correction processing of resolution-enhancing means shown in FIG. 1 when the resolution ratio is equal to 1:1, in which 36(a) to 36(e) are diagrams showing the detection operators P10 to P14 when the gradient is equal to −1 and the target pixel is a black pixel.
Figure 36B:
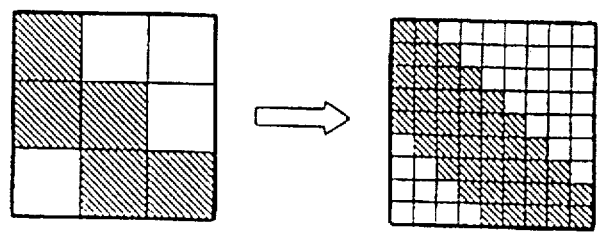
Figure 36C:
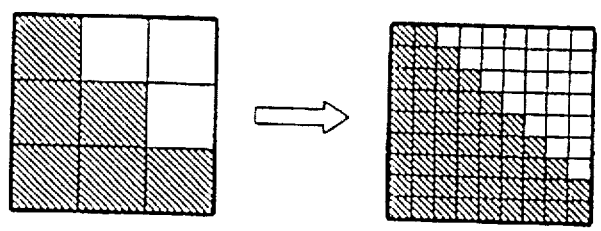
Figure 36D:
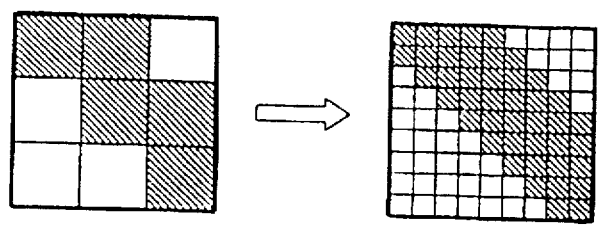
Figure 36E:
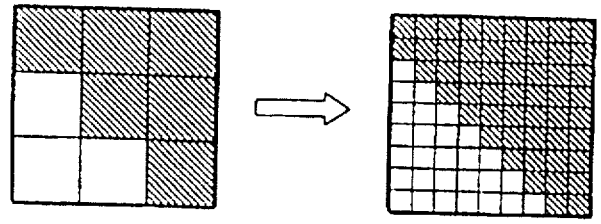
Figure 37A:
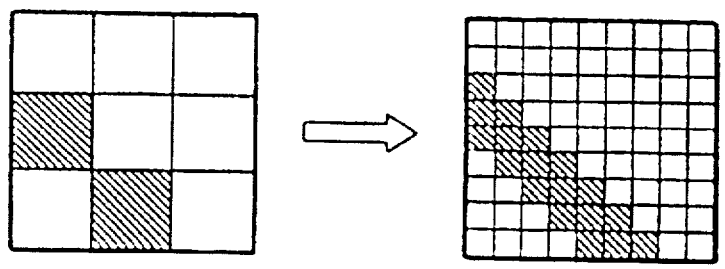
FIG. 37 is a diagram showing resolution-enhancing correction processing of resolution-enhancing means shown in FIG. 1 when the resolution ratio is equal to 1:1, in which 37(a) to 37(d) are diagrams showing the detection operators P15 to P18 when the gradient is equal to −1 and the target pixel is a white pixel.
Figure 37B:
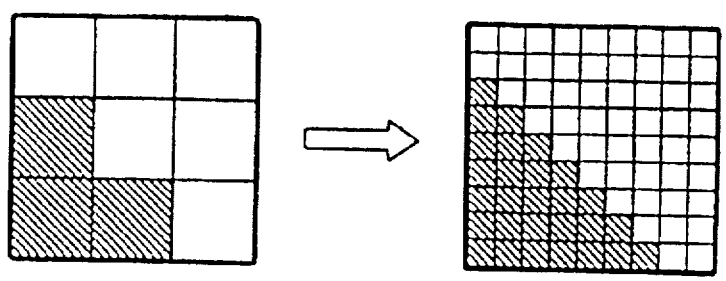
Figure 37C:
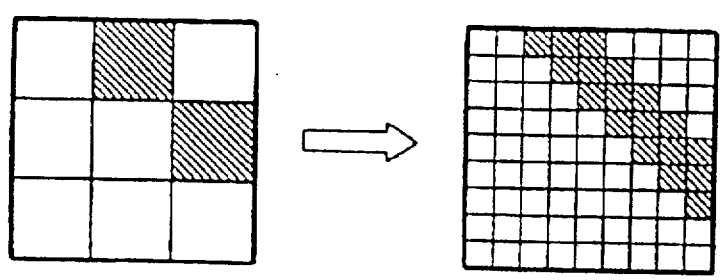
Figure 37D:
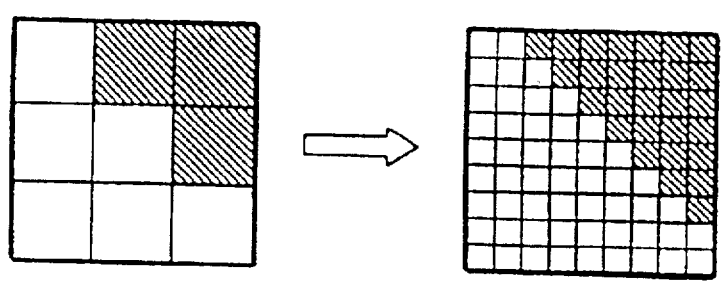
Figure 38A:
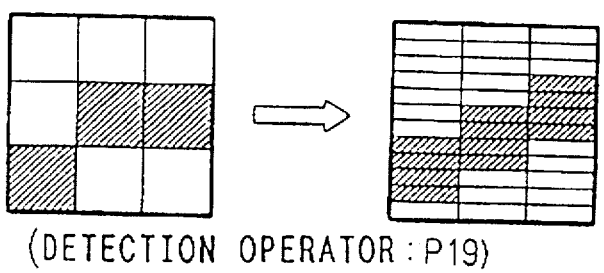
FIG. 38 is a diagram showing resolution-enhancing correction processing of resolution-enhancing means shown in FIG. 1 when the resolution ratio is equal to 1:1, in which 38(a) to 38(f) are diagrams showing the detection operators P19 to P24 when the gradient is equal to +½ and the target pixel is a black pixel.
Figure 38B:
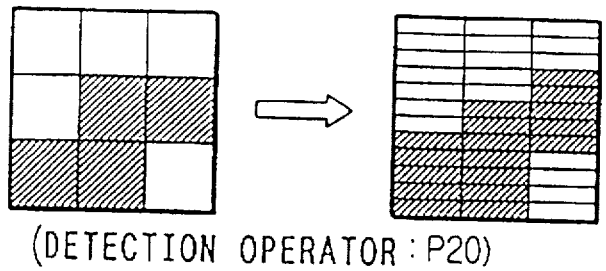
Figure 38C:
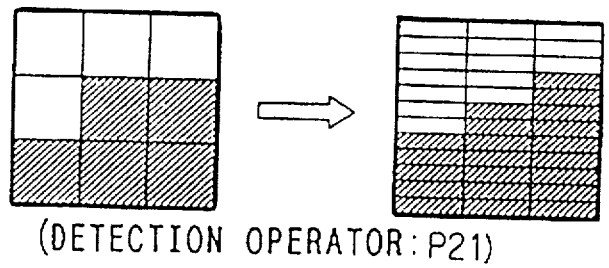
Figure 38D:
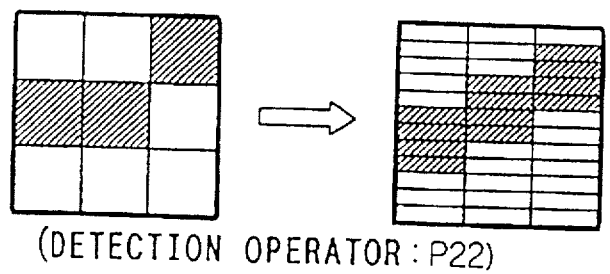
Figure 38E:
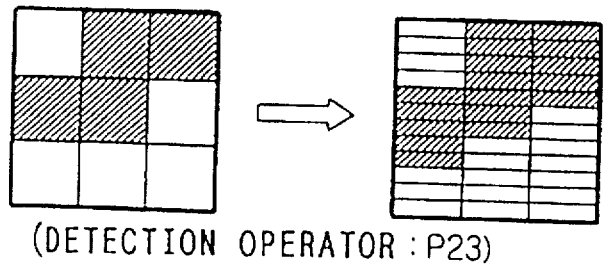
Figure 38F:
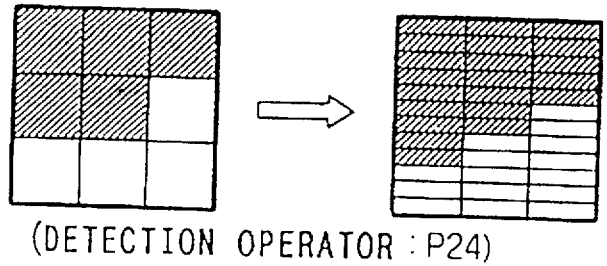
Figure 39A:
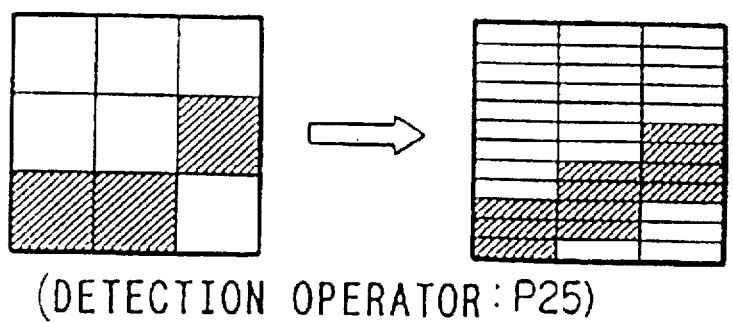
FIG. 39 is a diagram showing resolution-enhancing correction processing of resolution-enhancing means shown in FIG. 1 when the resolution ratio is equal to 1:1, in which 39(a) to 39(d) are diagrams showing the detection operators P25 to P28 when the gradient is equal to +½ and the target pixel is a white pixel.
Figure 39B:
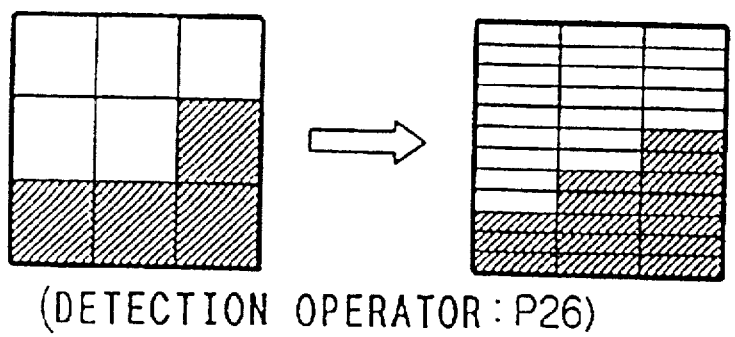
Figure 39C:
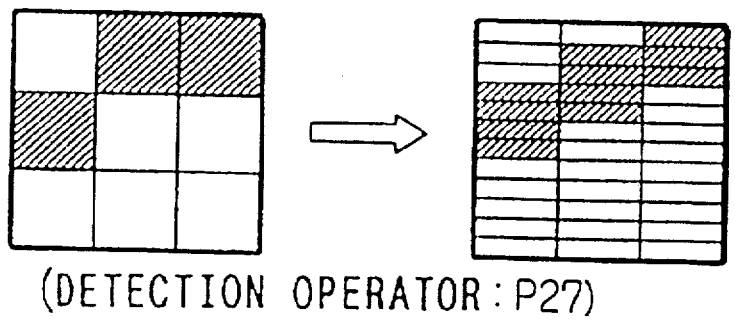
Figure 39D:
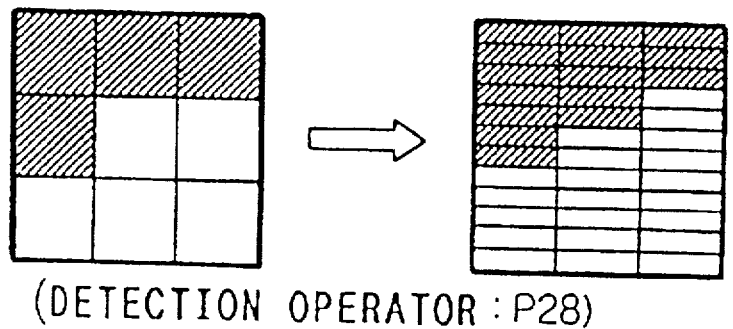
Figure 40A:
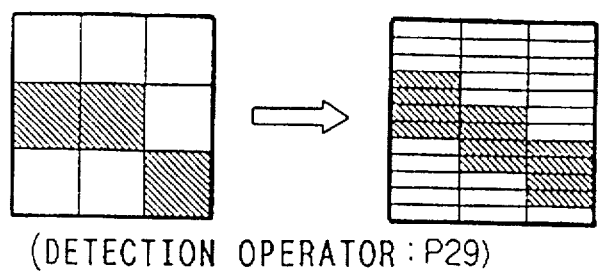
FIG. 40 is a diagram showing resolution-enhancing correction processing of resolution-enhancing means shown in FIG. 1 when the resolution ratio is equal to 1:1, in which 40(a) to 40(f) are diagrams showing the detection operators P29 to P34 when the gradient is equal to −½ and the target pixel is a black pixel.
Figure 40B:
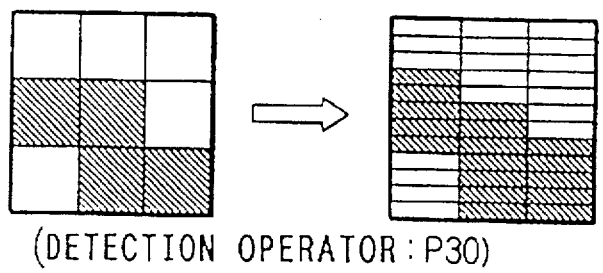
Figure 40C:
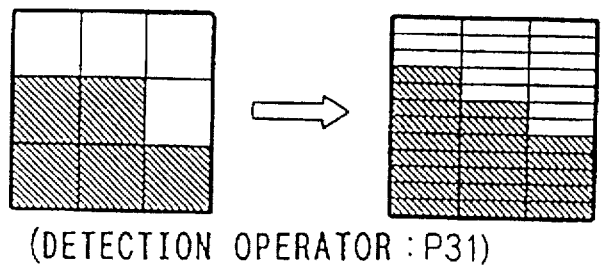
Figure 40D:
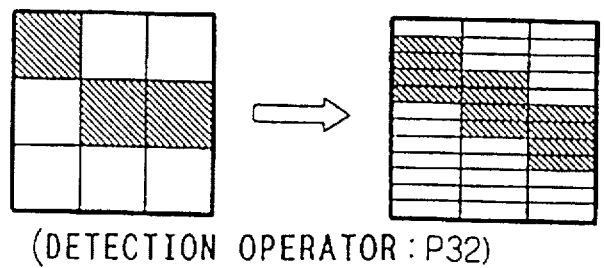
Figure 40E:
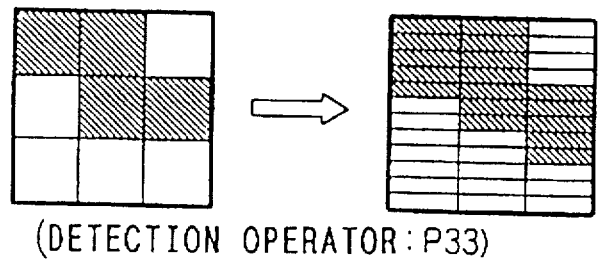
Figure 40F:
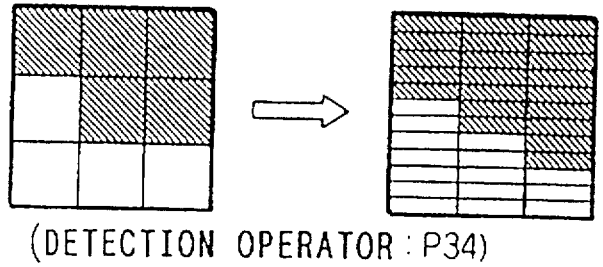
Figure 41A:
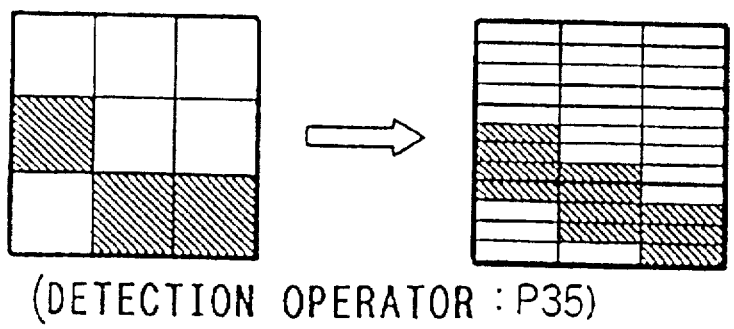
FIG. 41 is a diagram showing resolution-enhancing correction processing of resolution-enhancing means shown in FIG. 1 when the resolution ratio is equal to 1:1, in which 41(a) to 41(d) are diagrams showing the detection operators P35 to P38 when the gradient is equal to −½ and the target pixel is a white pixel.
Figure 41B:
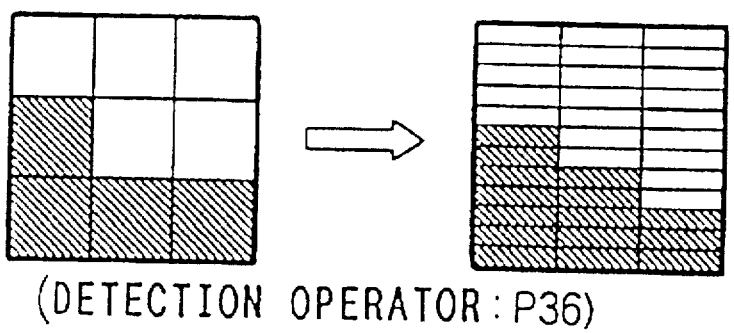
Figure 41C:
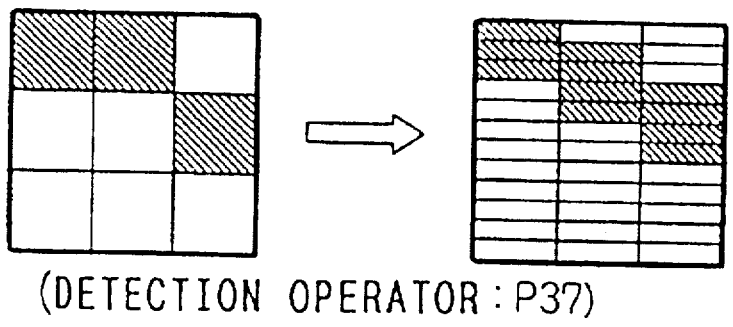
Figure 41D:
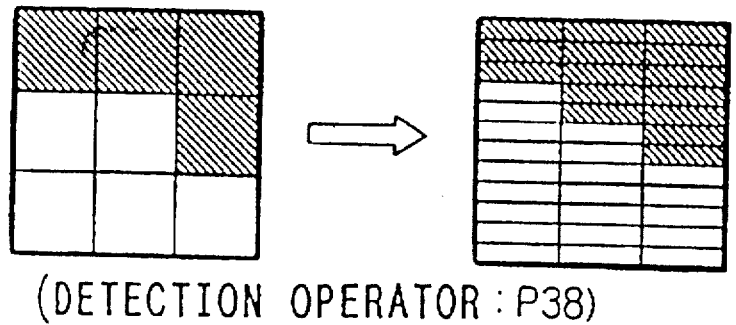
Figure 42A:
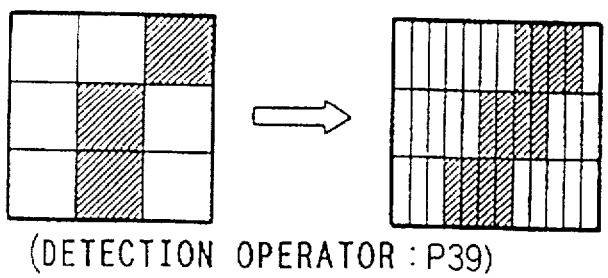
FIG. 42 is a diagram showing resolution-enhancing correction processing of resolution-enhancing means shown in FIG. 1 when the resolution ratio is equal to 1:1, in which 42(a) to 42(f) are diagrams showing the detection operators P39 to P44 when the gradient is equal to +2 and the target pixel is a black pixel.
Figure 42B:
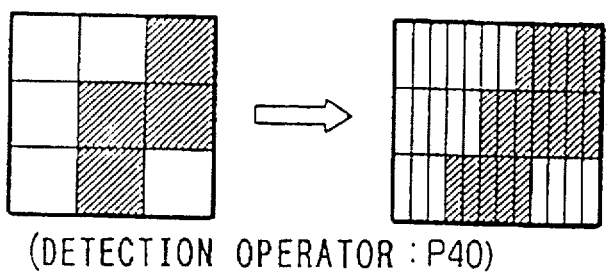
Figure 42C:
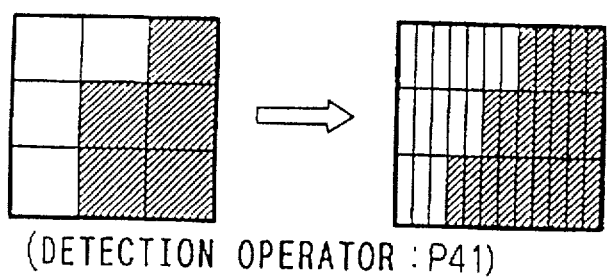
Figure 42D:
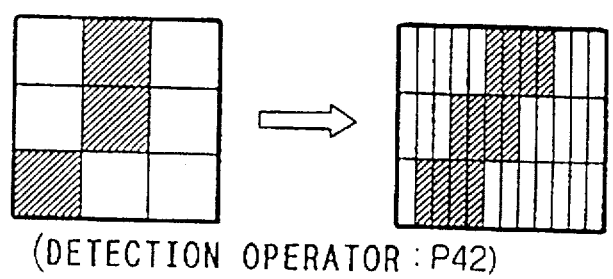
Figure 42E:
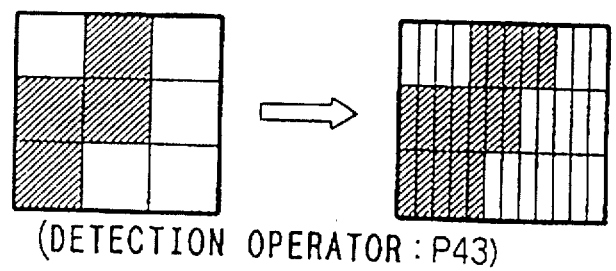
Figure 42F:
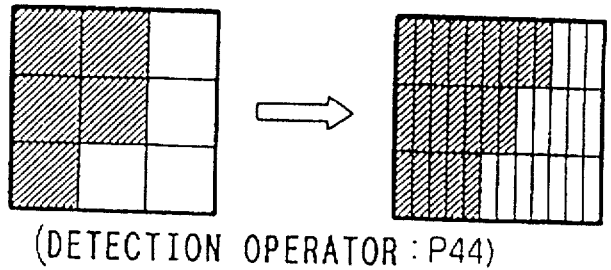
Figure 43A:
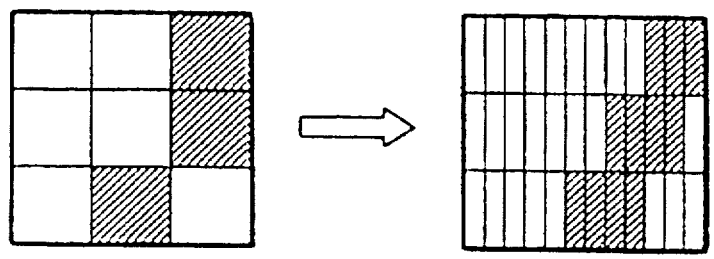
FIG. 43 is a diagram showing resolution-enhancing correction processing of resolution-enhancing means shown in FIG. 1 when the resolution ratio is equal to 1:1, in which 43(a) to 43(d) are diagrams showing the detection operators P45 to P48 when the gradient is equal to +2 and the target pixel is a white pixel.
Figure 43B:
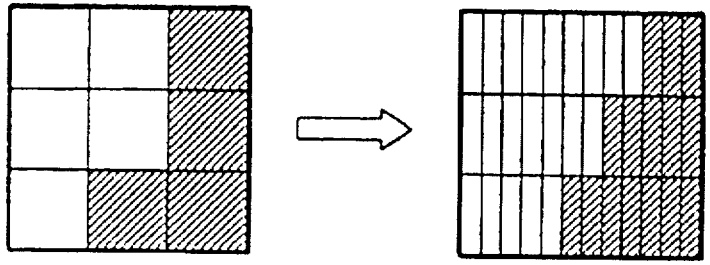
Figure 43C:
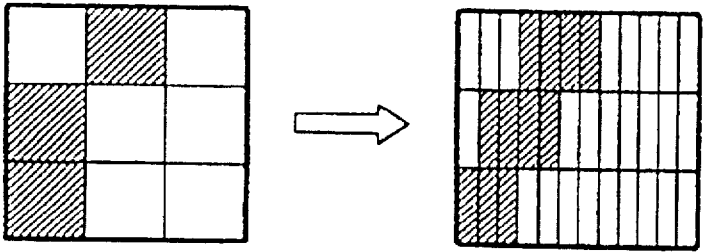
Figure 43D:
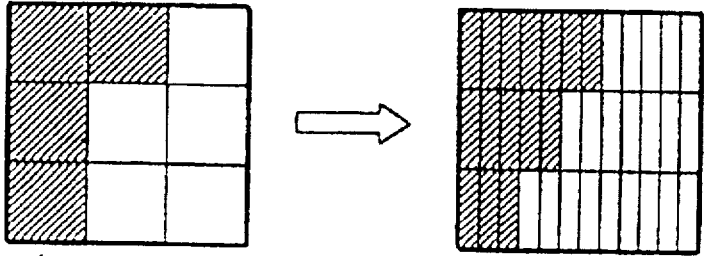
Figure 44A:
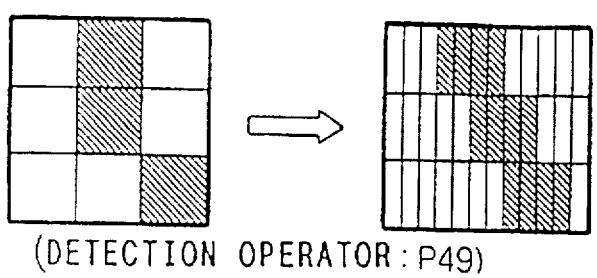
FIG. 44 is a diagram showing resolution-enhancing correction processing of resolution-enhancing means shown in FIG. 1 when the resolution ratio is equal to 1:1, in which 44(a) to 44(f) are diagrams showing the detection operators P49 to P54 when the gradient is equal to −2 and the target pixel is a black pixel.
Figure 44B:
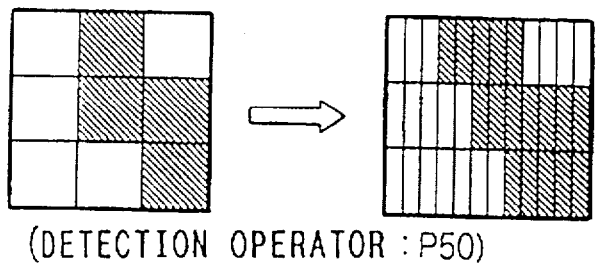
Figure 44C:
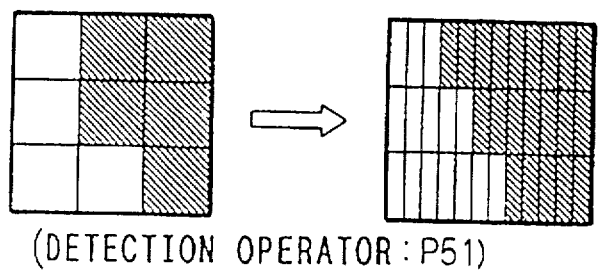
Figure 44D:
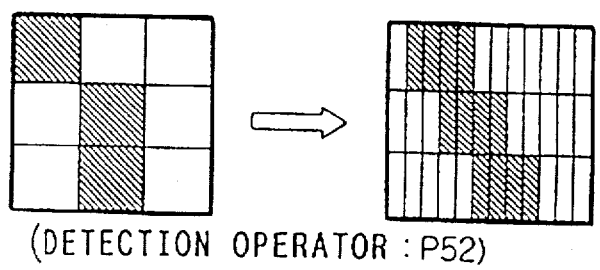
Figure 44E:
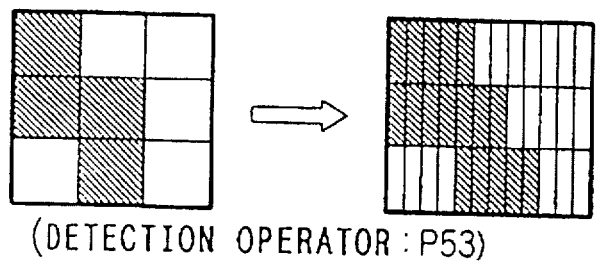
Figure 44F:
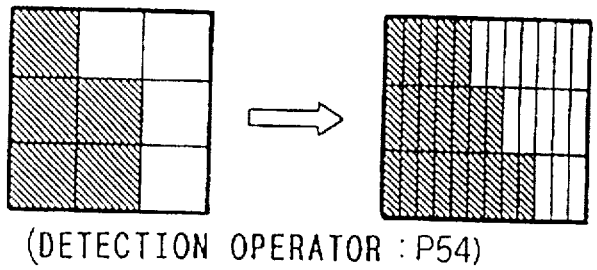
Figure 45A:
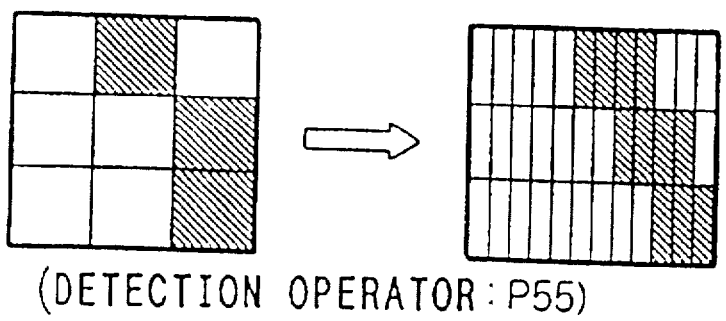
FIG. 45 is a diagram showing resolution-enhancing correction processing of resolution-enhancing means shown in FIG. 1 when the resolution ratio is equal to 1:1, in which 45(a) to 45(d) are diagrams showing the detection operators P55 to P58 when the gradient is equal to −2 and the target pixel is a white pixel.
Figure 45B:
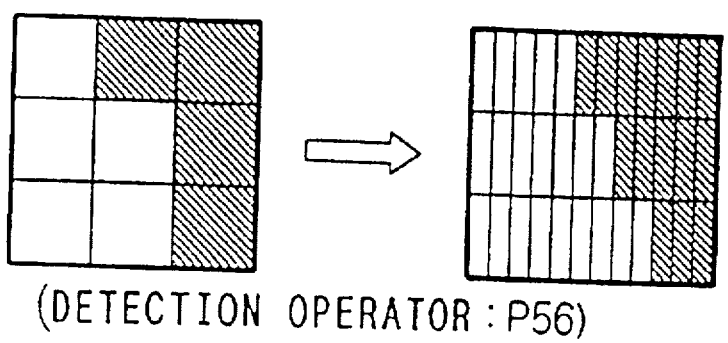
Figure 45C:
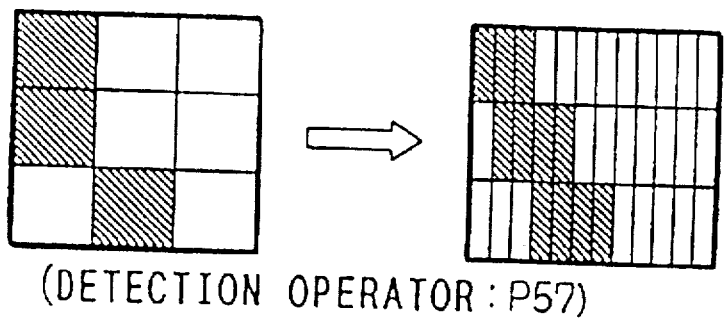
Figure 45D:
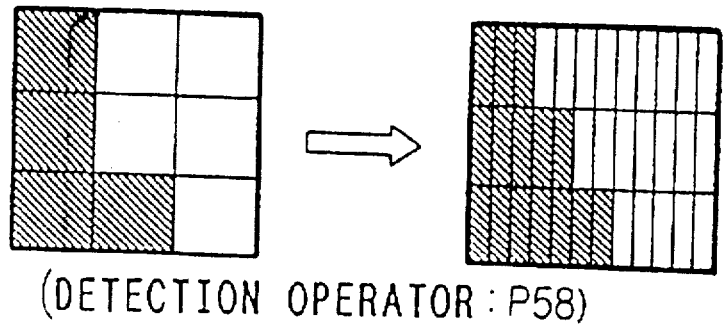
Figure 46A:
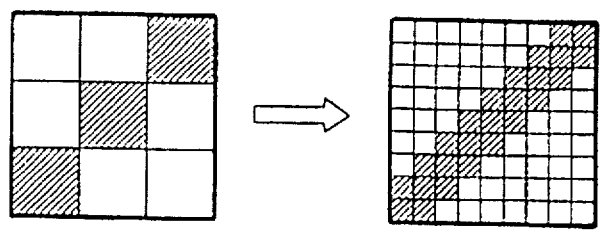
FIG. 46 is a diagram showing resolution-enhancing correction processing of resolution-enhancing means shown in FIG. 1 when the resolution ratio is equal to 1:2, in which 46(a) to 46(e) are diagrams showing the detection operators P1 to P5 when the gradient is equal to +1 and the target pixel is a black pixel.
Figure 46B:
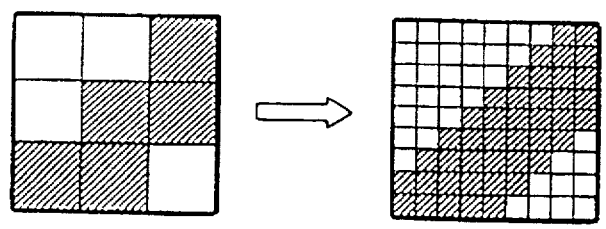
Figure 46C:
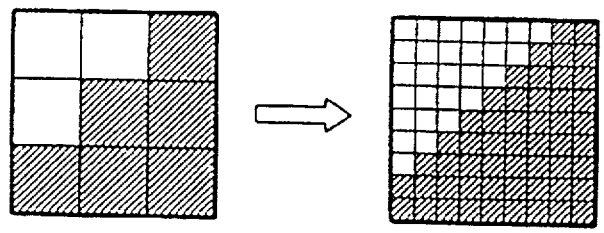
Figure 46D:
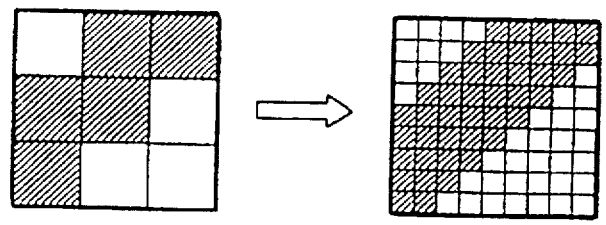
Figure 46E:
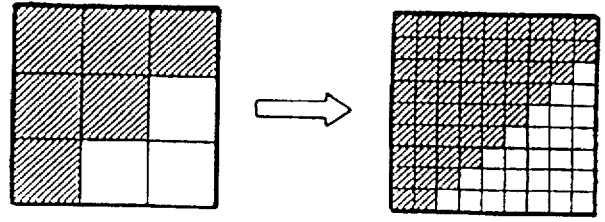
Figure 47A:
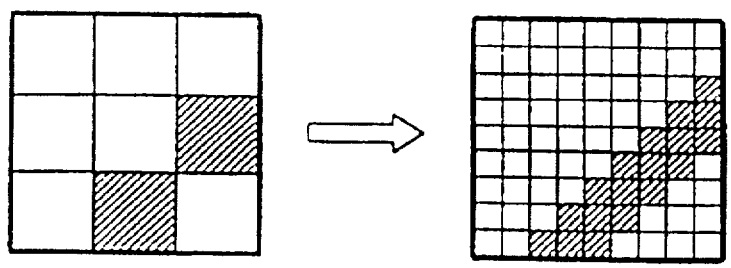
FIG. 47 is a diagram showing resolution-enhancing correction processing of resolution-enhancing means shown in FIG. 1 when the resolution ratio is equal to 1:2, in which 47(a) to 47(d) are diagrams showing the detection operators P6 to P9 when the gradient is equal to +1 and the target pixel is a white pixel.
Figure 47B:
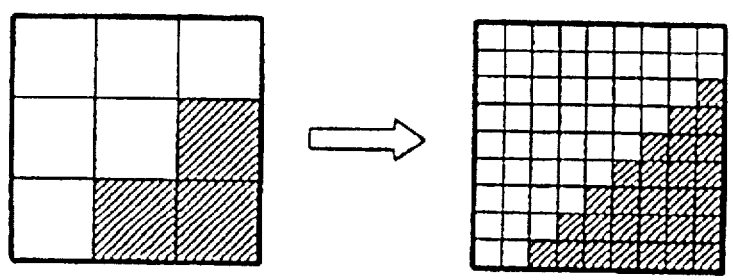
Figure 47C:
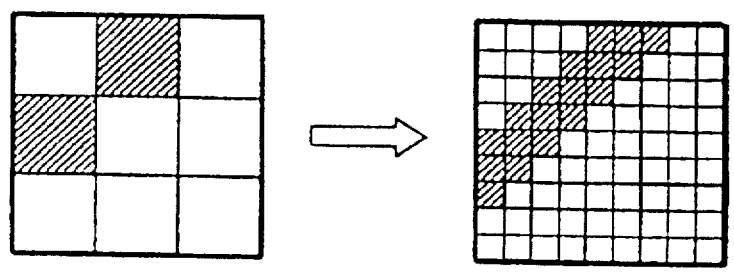
Figure 47D:
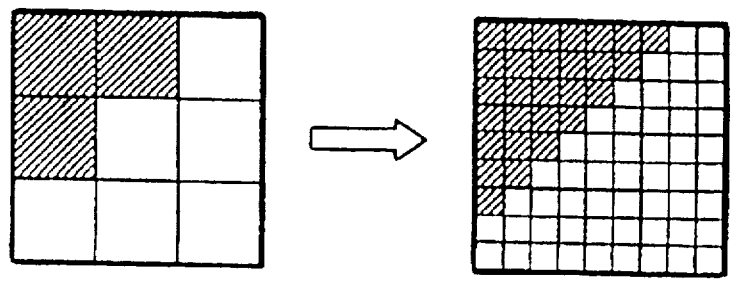
Figure 48A:
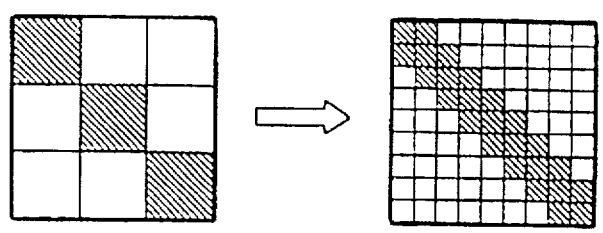
FIG. 48 is a diagram showing resolution-enhancing correction processing of resolution-enhancing means shown in FIG. 1 when the resolution ratio is equal to 1:2, in which 48(a) to 48(e) are diagrams showing the detection operators P10 to P14 when the gradient is equal to −1 and the target pixel is a black pixel.
Figure 48B:
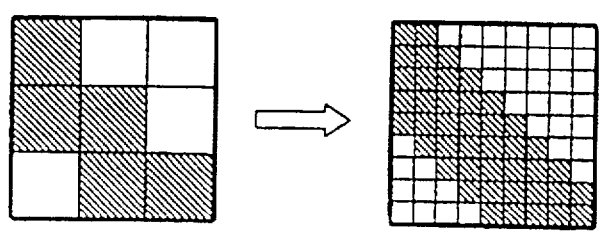
Figure 48C:
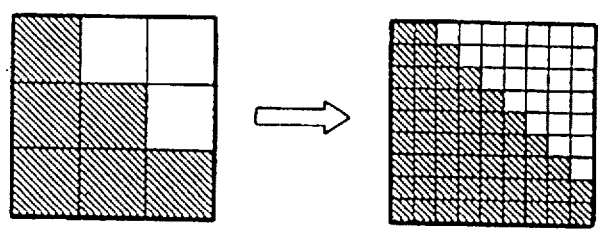
Figure 48D:
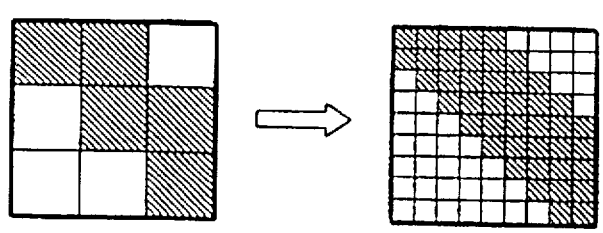
Figure 48E:
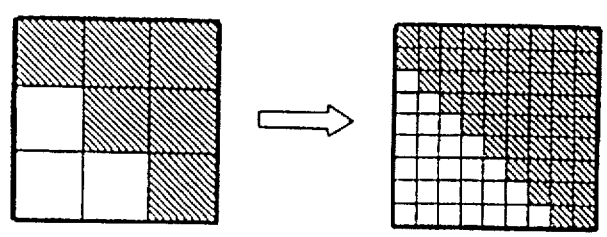
Figure 50A:
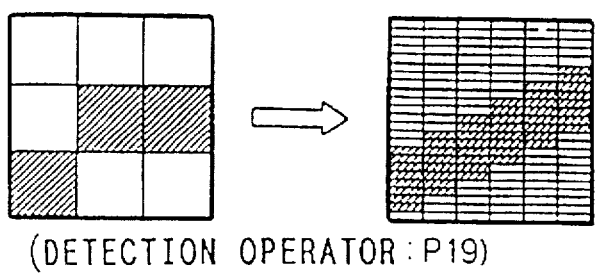
FIG. 50 is a diagram showing resolution-enhancing correction processing of resolution-enhancing means shown in FIG. 1 when the resolution ratio is equal to 1:2, in which 50(a) to 50(f) are diagrams showing the detection operators P19 to P24 when the gradient is equal to +½ and the target pixel is a black pixel.
Figure 50B:
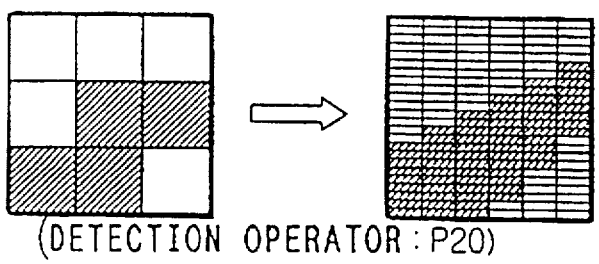
Figure 50C:
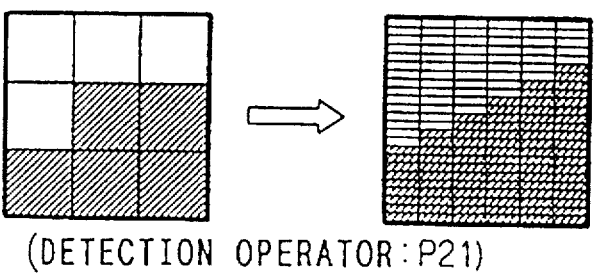
Figure 50D:
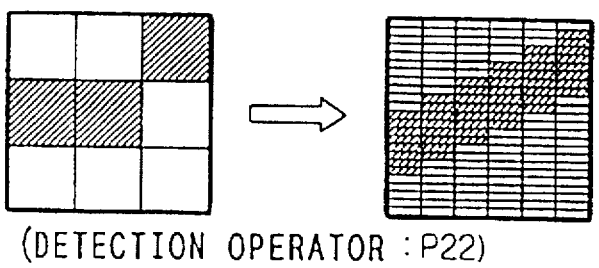
Figure 50E:
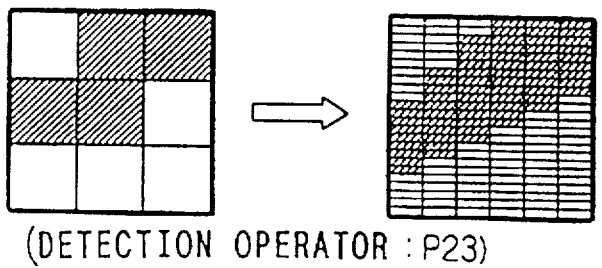
Figure 50F:
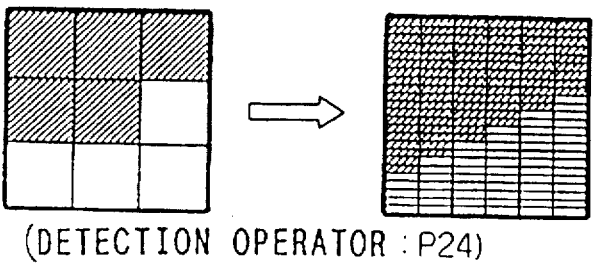
Figure 51A:
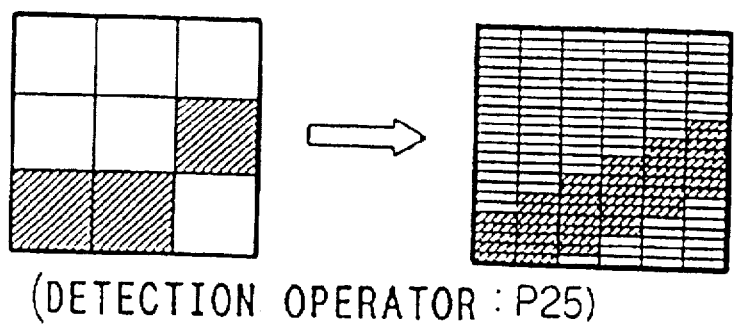
FIG. 51 is a diagram showing resolution-enhancing correction processing of resolution-enhancing means shown in FIG. 1 when the resolution ratio is equal to 1:2, in which 51(a) to 51(d) are diagrams showing the detection operators P25 to P28 when the gradient is equal to +½ and the target pixel is a white pixel.
Figure 51B:
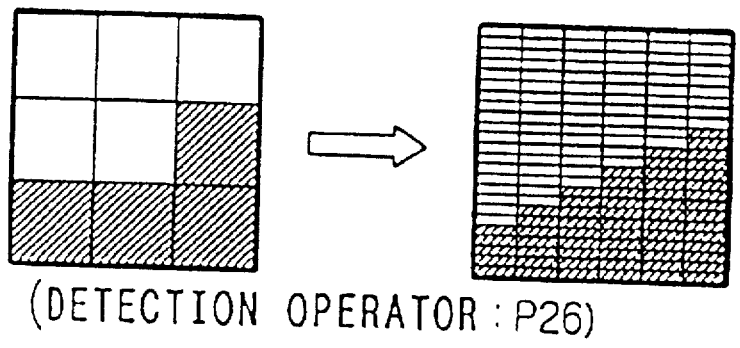
Figure 51C:
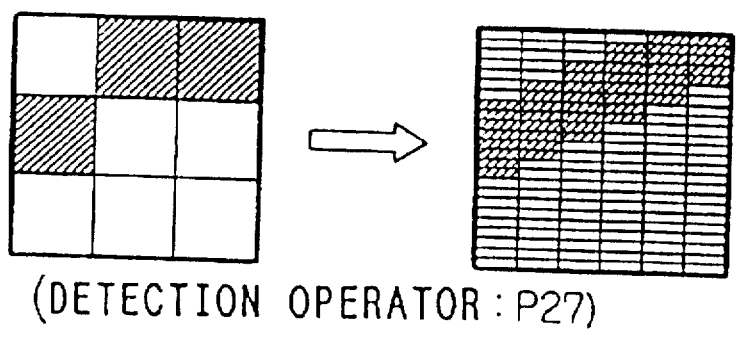
Figure 51D:
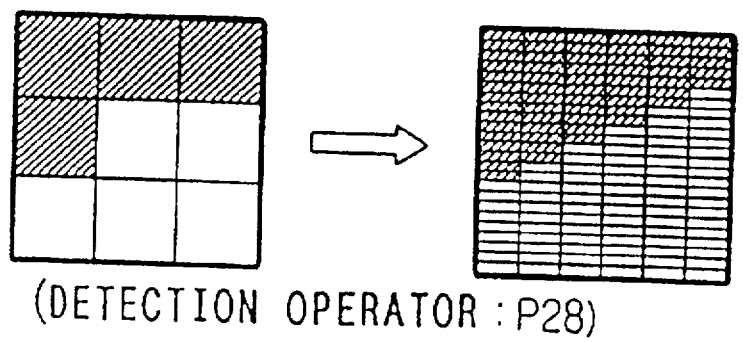
Figure 52A:
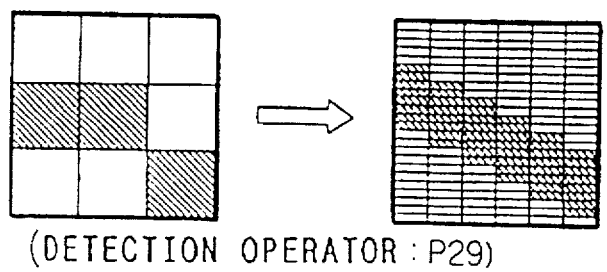
FIG. 52 is a diagram showing resolution-enhancing correction processing of resolution-enhancing means shown in FIG. 1 when the resolution ratio is equal to 1:2, in which 52(a) to 52(f) are diagrams showing the detection operators P29 to P34 when the gradient is equal to −½ and the target pixel is a black pixel.
Figure 52B:
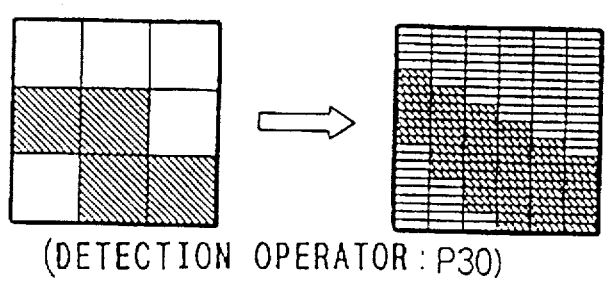
Figure 52C:
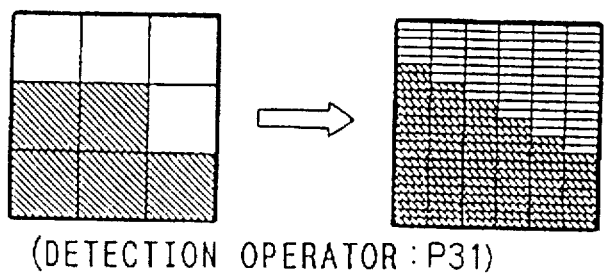
Figure 52D:
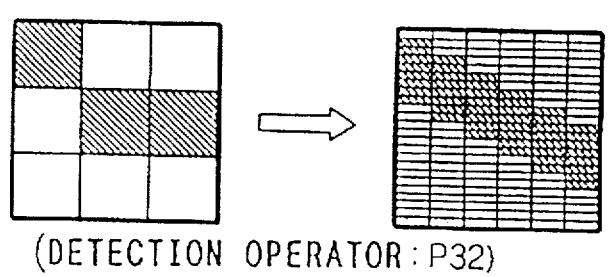
Figure 52E:
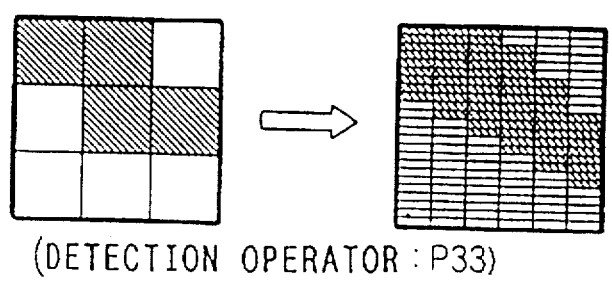
Figure 52F:
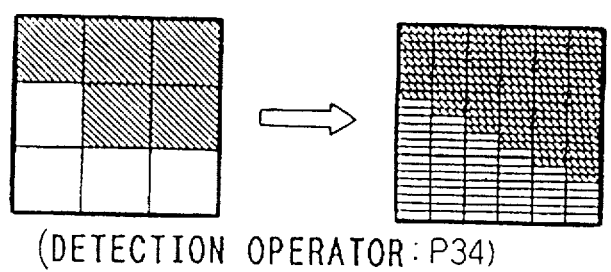
Figure 53A:
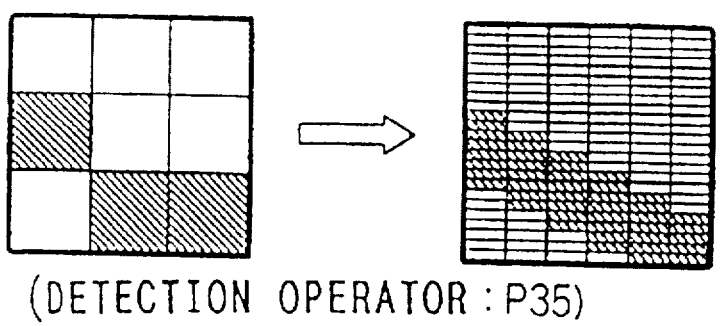
FIG. 53 is a diagram showing resolution-enhancing correction processing of resolution-enhancing means shown in FIG. 1 when the resolution ratio is equal to 1:2, in which 53(a) to 53(d) are diagrams showing the detection operators P35 to P38 when the gradient is equal to −½ and the target pixel is a white pixel.
Figure 53B:
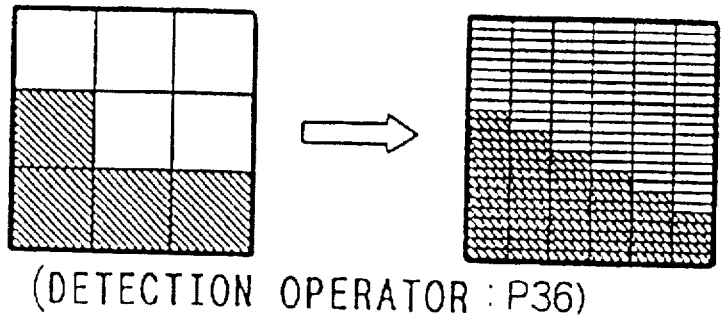
Figure 53C:
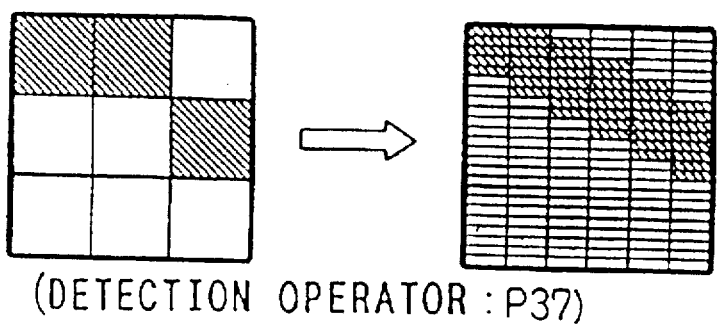
Figure 53D:
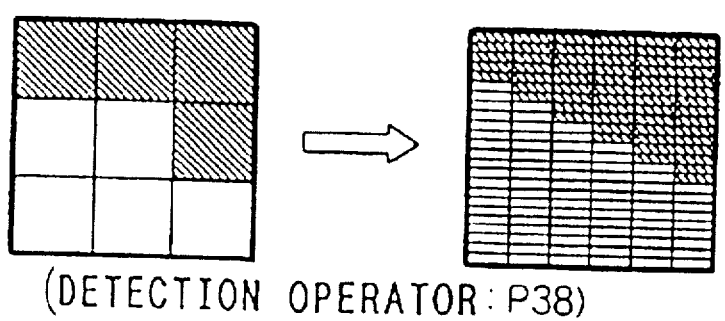
Figure 54A:
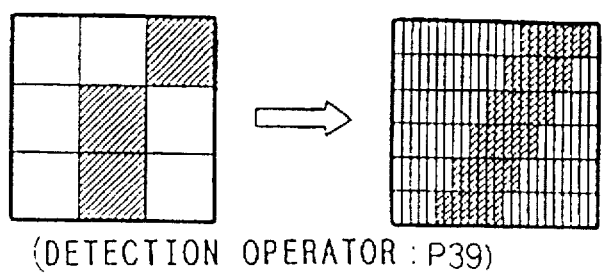
FIG. 54 is a diagram showing resolution-enhancing correction processing of resolution-enhancing means shown in FIG. 1 when the resolution ratio is equal to 1:2, in which 54(a) to 54(f) are diagrams showing the detection operators P39 to P44 when the gradient is equal to +2/2 and the noted pixel is a black pixel.
Figure 54B:
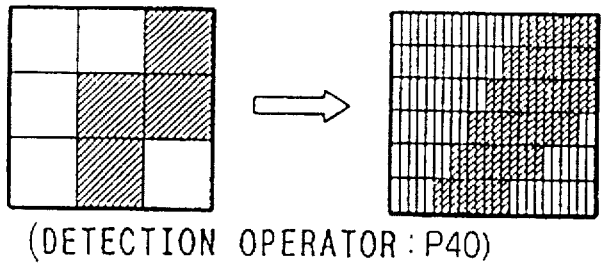
Figure 54C:
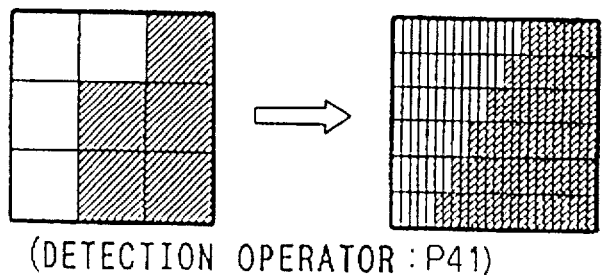
Figure 54D:
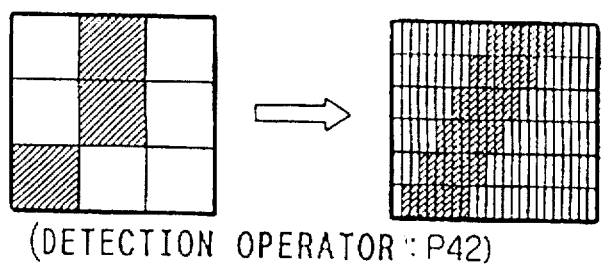
Figure 54E:
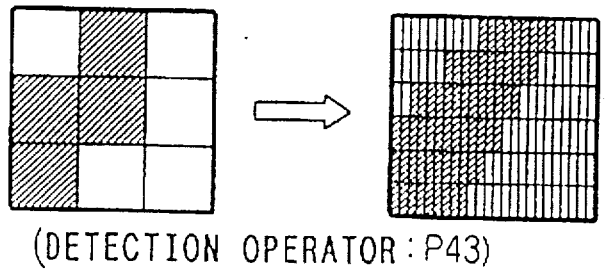
Figure 54F:
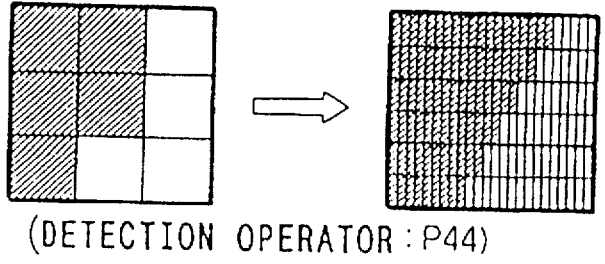
Figure 55A:
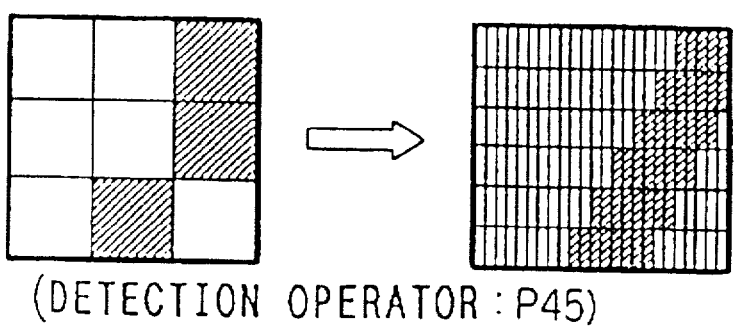
FIG. 55 is a diagram showing resolution-enhancing correction processing of resolution-enhancing means shown in FIG. 1 when the resolution ratio is equal to 1:2, in which 55(a) to 55(d) are diagrams showing the detection operators P45 to P48 when the gradient is equal to +2/2 and the target pixel is a white pixel.
Figure 55B:
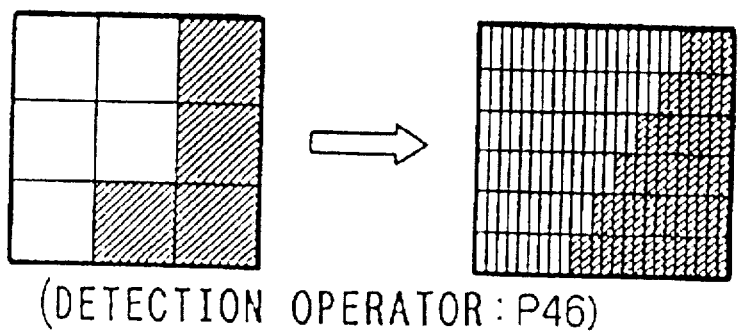
Figure 55C:
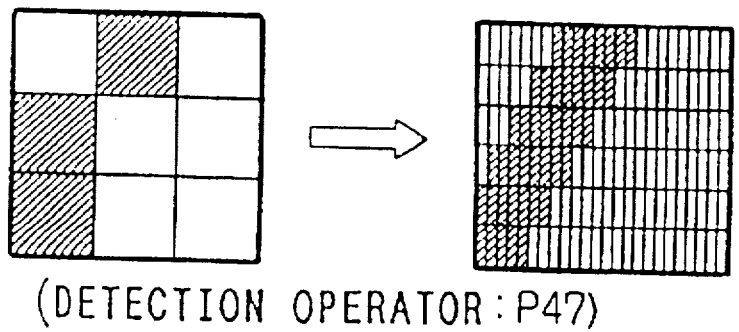
Figure 55D:
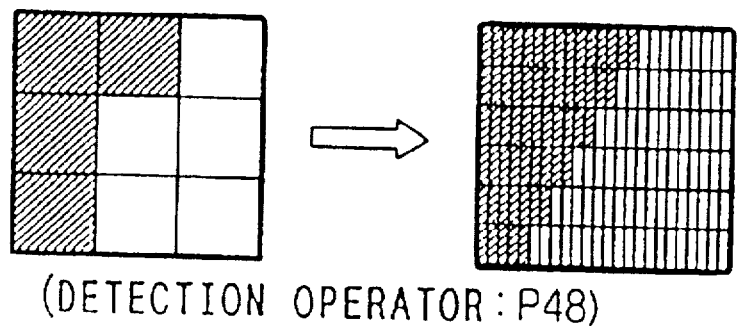
Figure 56A:
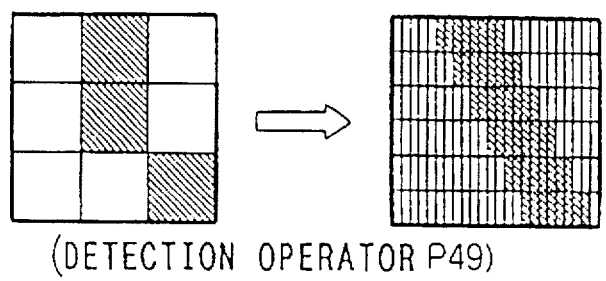
FIG. 56 is a diagram showing resolution-enhancing correction processing of resolution-enhancing means shown in FIG. 1 when the resolution ratio is equal to 1:2, in which 56(a) to 56(f) are diagrams showing the detection operators P49 to P54 when the gradient is equal to −2/2 and the target pixel is a black pixel.
Figure 56B:
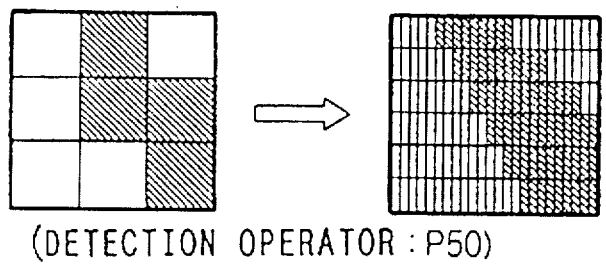
Figure 56C:
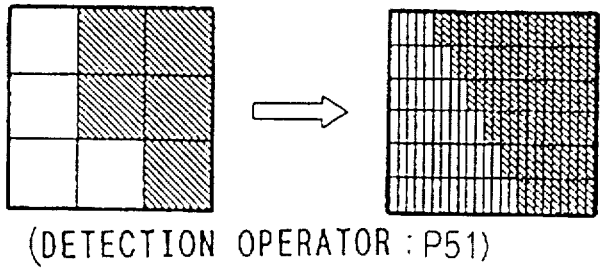
Figure 56D:
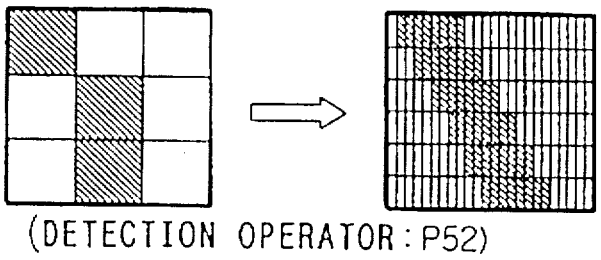
Figure 56E:
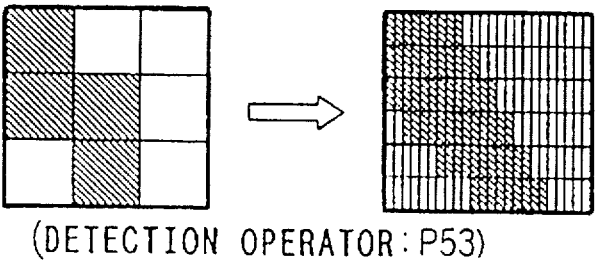
Figure 56F:
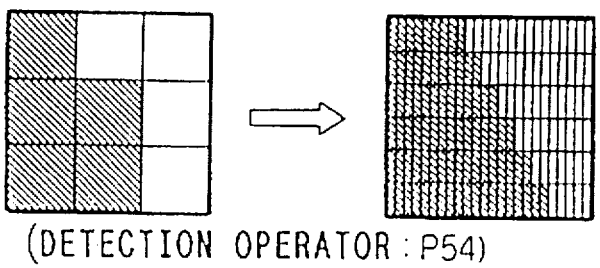
Figure 57A:
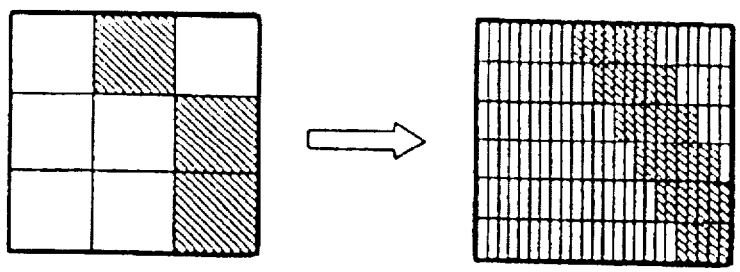
FIG. 57 is a diagram showing resolution-enhancing correction processing of resolution-enhancing means shown in FIG. 1 when the resolution ratio is equal to 1:2, in which 57(a) to 57(d) are diagrams showing the detection operators P55 to P58 when the gradient is equal to −2/2 and the target pixel is a white pixel.
Figure 57B:
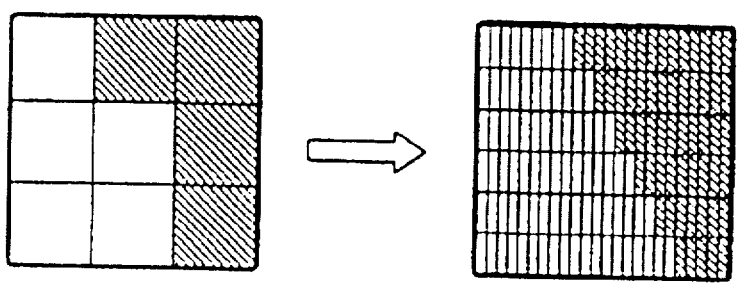
Figure 57C:
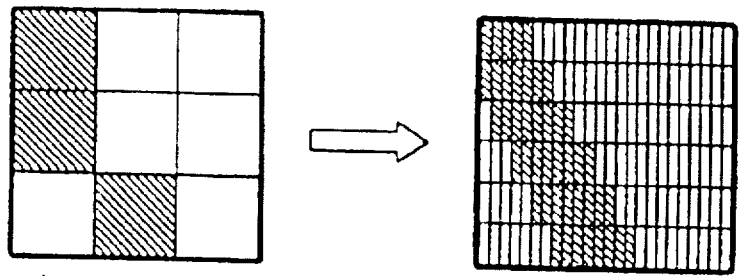
Figure 57D:
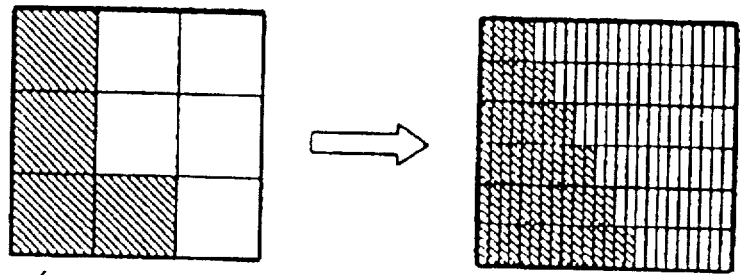
Figure 61A:
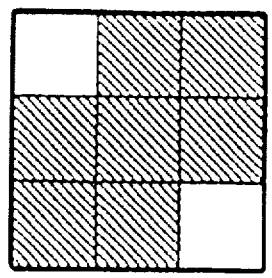
FIG. 61 is a diagram showing area division in the area selection means when the resolution ratio of the controller and the engine is equal to 1:2, in which 61(a) shows a corrected pixel R1, 61(b) shows the selected area thereof, 61(c) shows a corrected pixel R26 and 61(d) shows the selected area thereof.
Figure 61B:
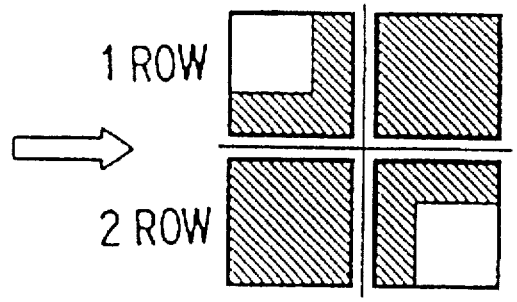
Figure 61C:
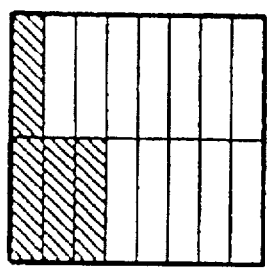
Figure 61D:
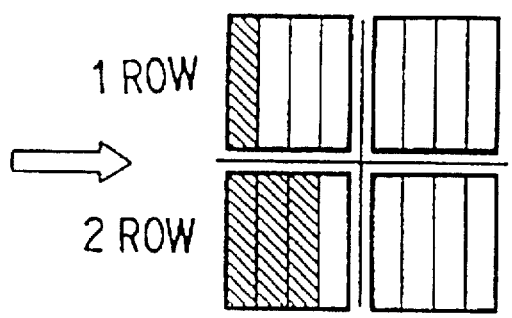

The area generating means 11 generates a 3×3 area for example (see FIG. 20). The feature extraction means 12 performs pattern matching on the 3×3 area concerned, and specifies the gradient of the 3×3 area by using detection operators P (see FIG. 21 to 33). Further, the resolution enhancing correction means 13 first subdivides a noted pixel into small areas (K rows×L columns) in order to enhance the resolution. There are provided plural types for the subdividing manner, and one suitable subdividing type is determined in accordance with the type of the gradient (P1 to P60) which is specified by the feature extraction means 12. For example, the noted pixel is subdivided into a 3×3 area (see FIG. 34), a 1×4 area (see FIG. 38) or the like. The resolution enhancing correction means 13 performs the smoothing processing on the basis of the subdivided area.

Further, according to this embodiment, in juxtaposition with the resolution enhancing means 13 are provided density calculation means 15 (see FIG. 63) for calculating the density of the overall noted pixel on the basis of the respective pixel values of the subdivided noted pixel (i.e., subdivided small areas of the noted pixel), center-of-gravity calculation means 16 for calculating the center of gravity of the overall noted pixel on the basis of the respective pixels of the noted pixel subdivided by the resolution-enhancing means 13 (see FIG. 64), and characteristic correction means 17 for correcting the density calculated by the density calculation means 15 and the center of gravity calculated by the center-of-gravity calculation means 16 in accordance with preset input/output characteristic information of an engine.

The density calculated by the density calculation means 15 serves as the pulse width of a video signal to be output to the engine 4, and the center of gravity which is calculated by the center-of-gravity calculation means 16 serves as the center position of the pulse concerned (see FIG. 65). The density and the center of gravity are calculated in no consideration of the characteristic of the engine 4 (see (a) of FIG. 67). The characteristic correction means 17 corrects the density and the center of gravity on the basis of the engine (see (b) of FIG. 67).

In juxtaposition with the characteristic correction means 17 are provided variation point calculation means 18 for calculating the variation point of the video signal on the basis of the density and the center of gravity which are corrected by the characteristic correction means 17, and video output means 19 for outputting the video signal according to the variation point information which is calculated by the variation point calculating means 18.

The variation point calculation means 18 calculates the variation point (edge data) of the video signal on the basis of the density and the center of gravity thus calculated (see FIG. 69). Further, vide output means 19 outputs the edge data to the engine 4.

In this embodiment, the smoothing processing is varied in accordance with the resolution ratio of the controller 3 and the engine 4. Accordingly, the following smoothing processing can be automatically performed irrespective of the resolution ratio of the controller 3 and the engine 4. Specifically, as shown in FIG. 1, in juxtaposition with the resolution enhancing means 13 is provided area selection means 14 for dividing the noted pixel subdivided by the resolution enhancing means 13 in accordance with the resolution ratio of the controller 3 and the engine 4, and selecting from the divided areas concerned an area to be supplied to the density calculation means and the center-of-gravity means (see FIG. 61).

In this case, each of the density calculation means 15 and the center-of-gravity calculation means 15 is provided with an individual selected area calculation function of calculating the density or the center of gravity on the basis of each pixel value of the area selected by the area selection means 14.

[Electrophotographic printer]

FIG. 2 is a block diagram showing the construction of the electrophotographic printer 2 according to a first embodiment of the present invention. The electrophotographic printer 2 includes the controller 3 for developing print data into bit map data, the smoothing circuit 1 for performing the pattern matching on the bit map data developed by the controller 3 to thereby perform the smoothing processing, and the engine 4 for printing (outputting) the data which have been subjected to the smoothing processing by the smoothing circuit 1.

Figure 3:
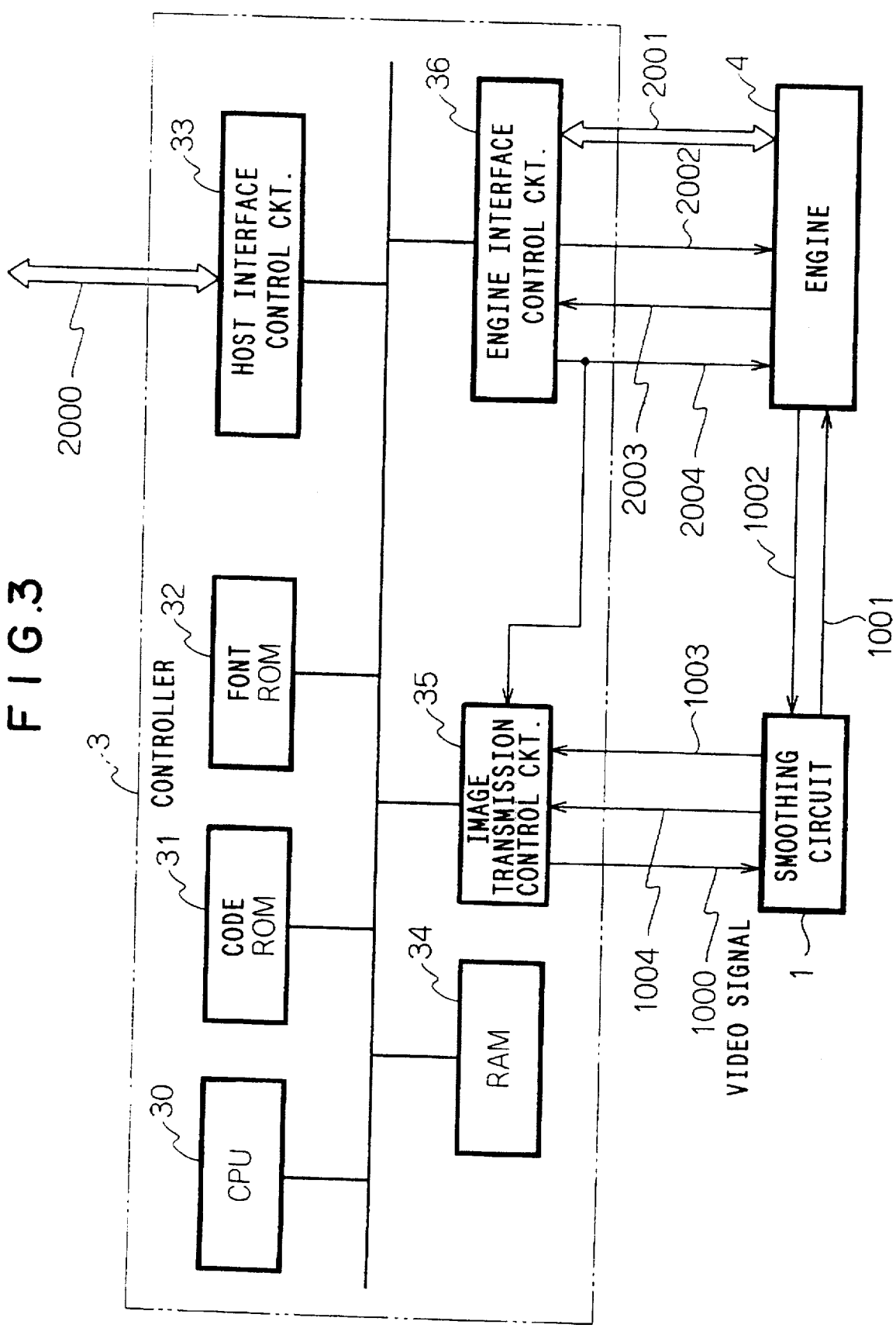
FIG. 3 is a block diagram showing the construction of a controller shown in FIG. 2.

FIG. 3 is a block diagram showing the construction of the controller 3. A CPU 30 is a microprocessor for fetching a command stored in a code ROM 31 to execute the command, and performs the overall management of the electrophotographic printer 2 and the control necessary for a series of printing operations. An engine interface control circuit 36 serves to handshake signals necessary for communication with the engine 4, and the CPU 30 issues a command to the engine and takes a status from the engine 4 through a command/status interface 2001. A host interface control circuit 33 serves to handshake signals necessary for communication with a host computer. The CPU 30 monitors a host interface 2000 through the host interface control circuit 3 at all times to receive data from the host computer.

Upon start of transmission of print data from the host computer, the received data are successively stored in the RAM 34 every predetermined data unit. The CPU 30 analyzes the received data, and generates a two-dimensional bit map image on the RAM 34 in accordance with the analysis result. Further, when the received data contains a character drawing instruction, the drawing information of the character concerned is read out from a font ROM 32, and the character is drawn as a bit map image at a specified coordinate position in a bit map image area on the RAM 34. When the generation of a bit map image corresponding to one page is completed, the CPU 30 instructs the engine 4 to start the print operation with a print start signal 2002.

Upon receiving this instruction, the engine 4 starts to output a horizontal synchronous signal 1002, and then outputs a vertical synchronous request signal 2003 when the internal equipments of the engine 4 are set to a printable state. The vertical synchronous request signal 2003 is recognized as an interruptive signal through the engine interface control circuit 36 by the CPU 30. When the CPU 30 recognizes the vertical synchronous request signal 2003, it outputs a vertical synchronous response signal 2004 to the engine 4 through the engine interface control circuit 36, and the engine 4 starts to feed a sheet on the basis of the vertical synchronous response signal 2004.

The horizontal synchronizing signal 1002 is subjected to synchronization processing as described later by the smoothing circuit 1, and then supplied as a horizontal synchronization signal 1002 to an image transmission control circuit 35. The image transmission control circuit 35 performs synchronization in the main scanning direction and the auxiliary scanning direction, and then serially transmits to the smoothing circuit 1, as a video signal 1000, a bit mag image which is developed on the RAM 34 in accordance with a video clock signal 1004 output from the smoothing circuit 1. The image data which are transmitted with the video signal 1000 are subjected to the smoothing processing described later in the smoothing circuit 1, and then transmitted to the engine 4 as a video signal 1001. Thereafter, the engine 1 records information on a sheet on the basis of the video signal 1001.

Figure 4:
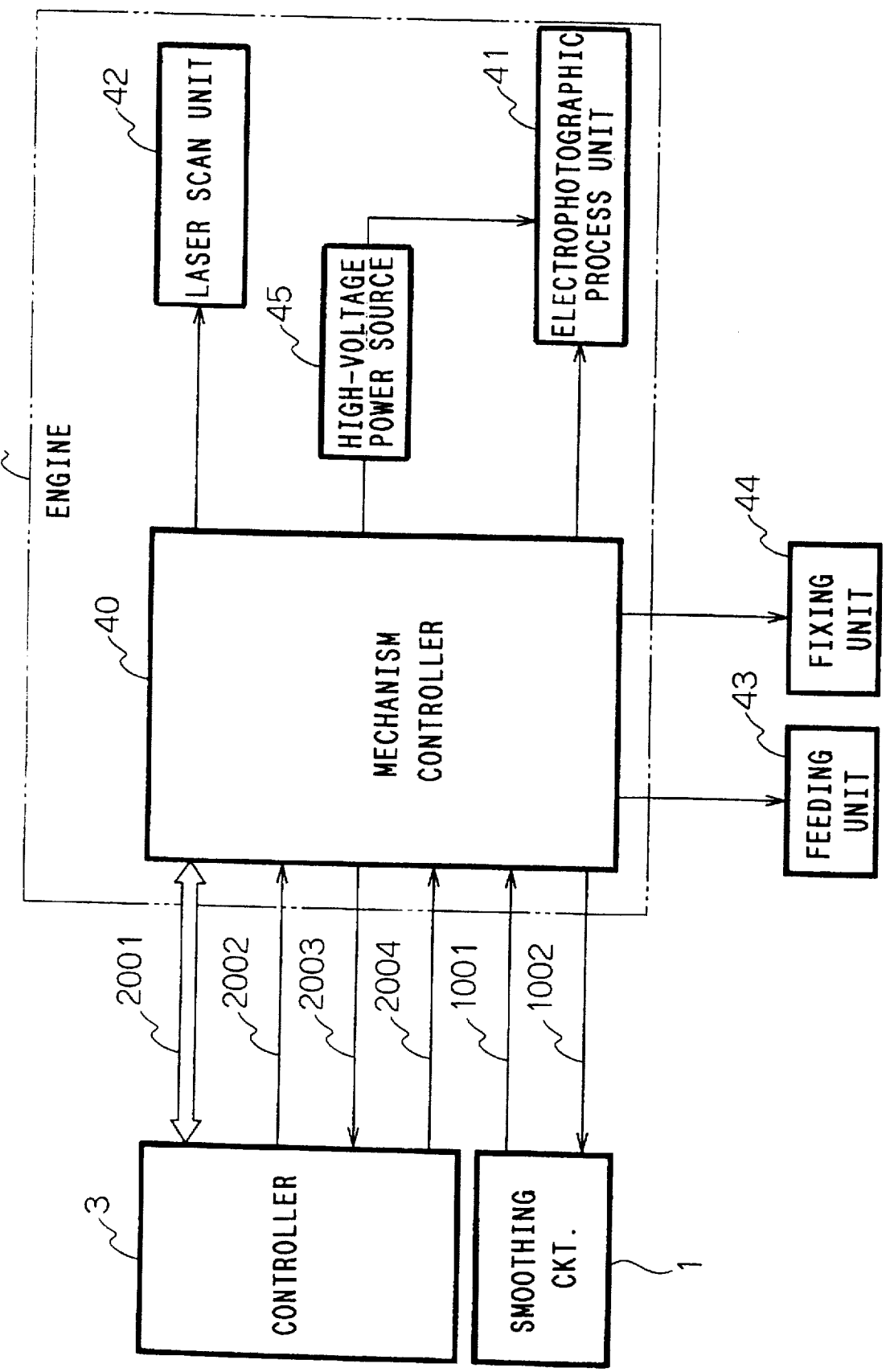
FIG. 4 is a block diagram showing the construction of an engine shown in FIG. 2.

FIG. 4 is a block diagram showing the construction of the engine 4. A mechanism controller 40 has a microcontroller unit, and controls an electrophotographic processor 41, a laser scan unit 42, a feeder 43 and a fixer 44 in accordance with commands which are transmitted through a command/status interface 2001 from the controller 2.

Figure 5:
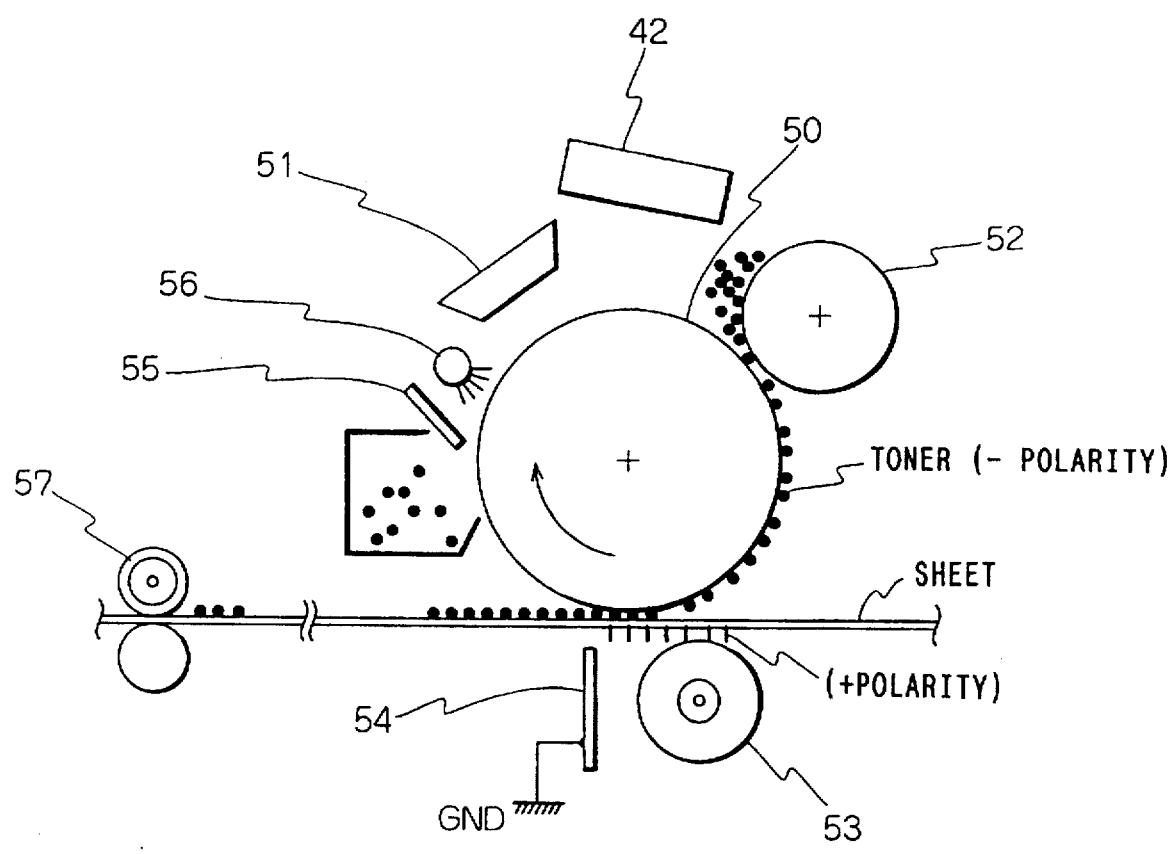
FIG. 5 is a diagram showing the construction of an electrophotographic process unit shown in FIG. 4.

The electrophotographic processor 41 serves as the central part of the electrophotographic printer, and it comprises a photosensitive drum 50, a main charger 51, a developing roller 52, a transfer roller 53, a discharge probe 54, a cleaning unit 55, an eraser unit 56, etc. as shown in FIG. 5. The laser scan unit 42 serves as a light source for irradiating a print image onto the photosensitive drum 50, and the ON/OFF operation of a laser of the laser scan unit 42 is controlled in accordance with the video signal 1001. The feeder 43 controls a sheet feeding operation from a hopper to a stacker, and it comprises a pickup roller for sucking a sheet from the hopper, a registration roller for positioning the tip of the sheet, a sensor for detecting the head of the sheet, a sensor for detecting the sheet size, etc.

The fixer 44 serves to fix toner transferred from the photosensitive drum 44 to the sheet with heat and pressure in a fixing unit 57, and it is controlled to keep a fixed temperature during each of a standby state and an operating state by a temperature sensor. A high-voltage power source 45 generates a high voltage necessary to perform the electrophotographic print operation, and the ON/OFF operation thereof is controlled by the mechanism controller 40.

In the electrophotographic print, a latent image which is an electrostatically charged image is formed on a photosensitive member by using a photoconduction phenomenon, and then colored charged fine particles, that is, toner is electrostatically attached onto the electrostatic latent image to form a visible image. The print process is divided into a charging process, a light exposure process, a developing process, a transfer process, a cleaning process and an erase process. In the charging process, the main charger 51 uniformly charges the surface of the photosensitive drum 50 to form a base for forming a latent image. In the light exposure process, the laser scan unit 43 irradiates light to the surface of the photosensitive drum 50 to form a latent image on the surface of the photosensitive drum 50. In the developing process, charged toner is electrostatically attached to the latent image on the photosensitive drum 50 under an electrostatic force by the developing roller 52 to thereby form a toner image on the photosensitive drum 50.

In the transfer process, the transfer roller 53 moves and attaches the toner image from the photosensitive drum 50 onto a sheet by an electrostatic force having the opposite polarity to that in the developing process. In the fixing process, the fixing unit 57 forever fixes the transferred toner image on the sheet by heat and pressure. In the cleaning process, the cleaning unit 55 removes and withdraws residual toner on the photosensitive drum which has not been transferred to the sheet. In the erase process, the erase unit 56 cancels the residual charges on the photosensitive drum 50 to wait for a next charging process.

[Characteristic of Electrophotographic Print]

Figure 6:
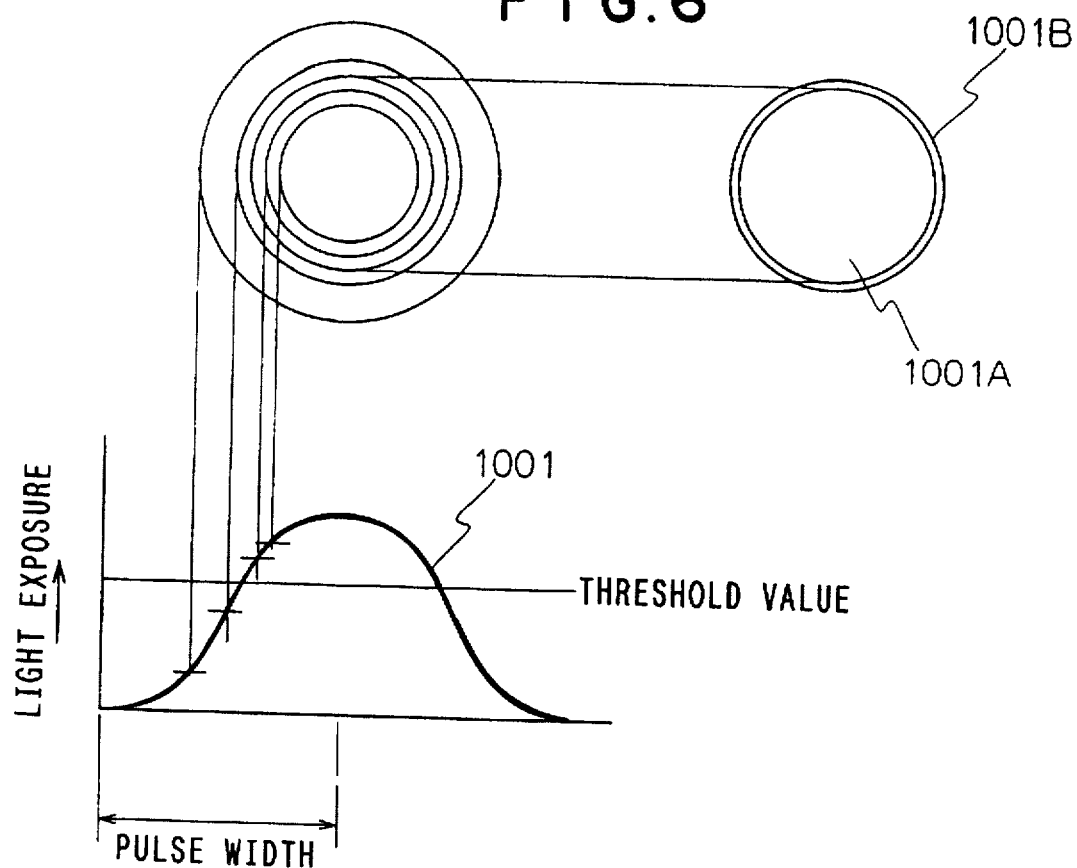
FIG. 6 is a diagram showing the relationship between a light exposure amount and a visible image for a perfect one-dot visible image.
Figure 7:
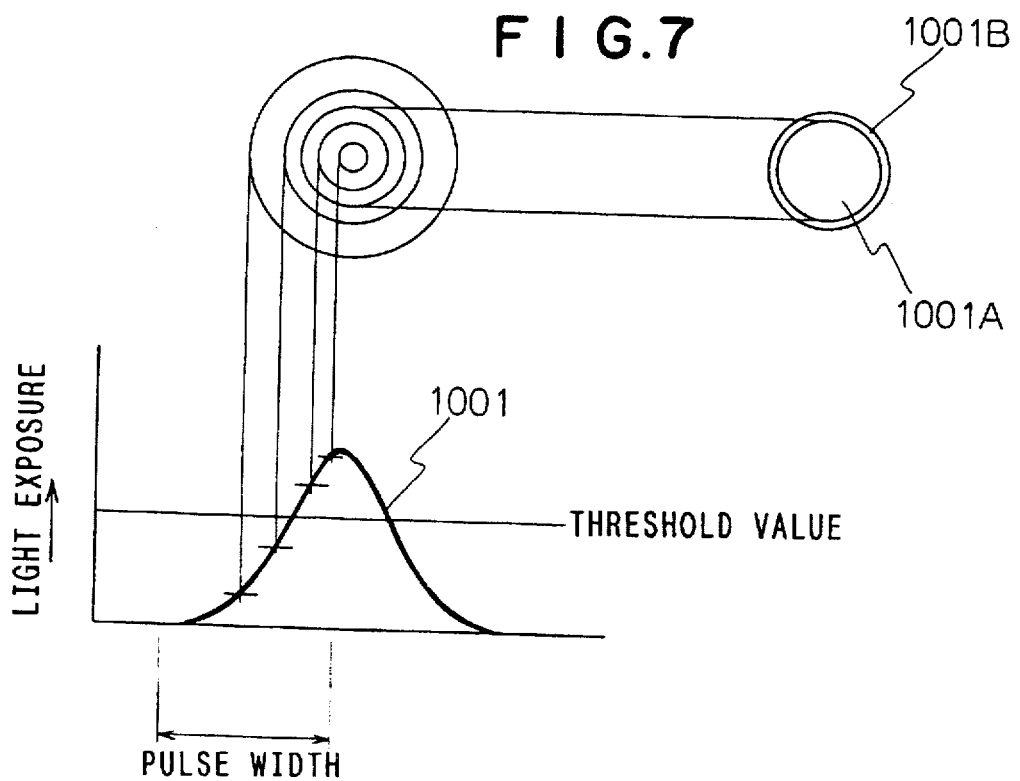
FIG. 7 is a diagram showing the relationship between the light exposure amount and the visible image for a visible image of 50% area of the one-dot visible image.
Figure 8:
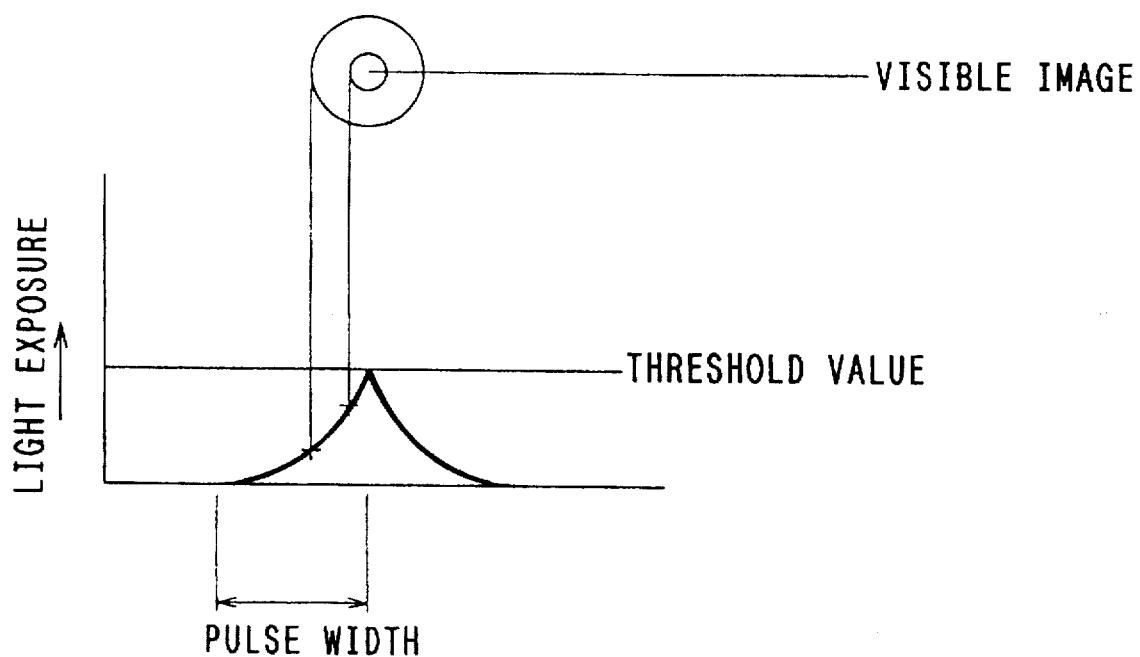
FIG. 8 is a diagram showing the relationship between the light exposure amount and the visible image for a visible image of 0% area of the one-dot visible image.

Next, the characteristic of the electrophotographic print which is important in the present invention will be described. FIGS. 6 to 8 show the relationship between the light exposure and the visible image. The relationship between the light exposure based on laser irradiation and the visible image based on the toner fixing is varied in accordance with the pulse width of the input video signal 1001 as shown in FIGS. 6 to 8.

Normally, the light exposure is maximized after a fixed rise-up time from the ON-time of the video signal 1001, and the light exposure is equal to zero after a fixed falling time from the OFF-time of the video signal 1001. FIG. 6 shows a contour distribution of the light exposure on the photosensitive drum 50.

As shown in FIG. 6, attachment or non-attachment of toner is made clear with respect to a threshold value of the light exposure (i.e., when the light exposure is not less than the threshold value, the toner is attached onto the photosensitive drum 50. However, when the light exposure is less than the threshold value, the toner is not clearly attached onto the photosensitive drum 50). The toner-attached portion corresponds to a visible image 1001a. Toner whose amount is needed for print is not attached onto a portion 1001B in which the light exposure is less than the threshold value.

The visible image of FIG. 6 corresponds to one perfect dot. If the area of the one dot is set as 100%, FIG. 7 shows a dot having 50% area, and FIG. 8 shows a dot of 0% area. In FIGS. 7 and 8, the video signal 1001 is turned off before the light exposure reaches the maximum value.

Figure 9:
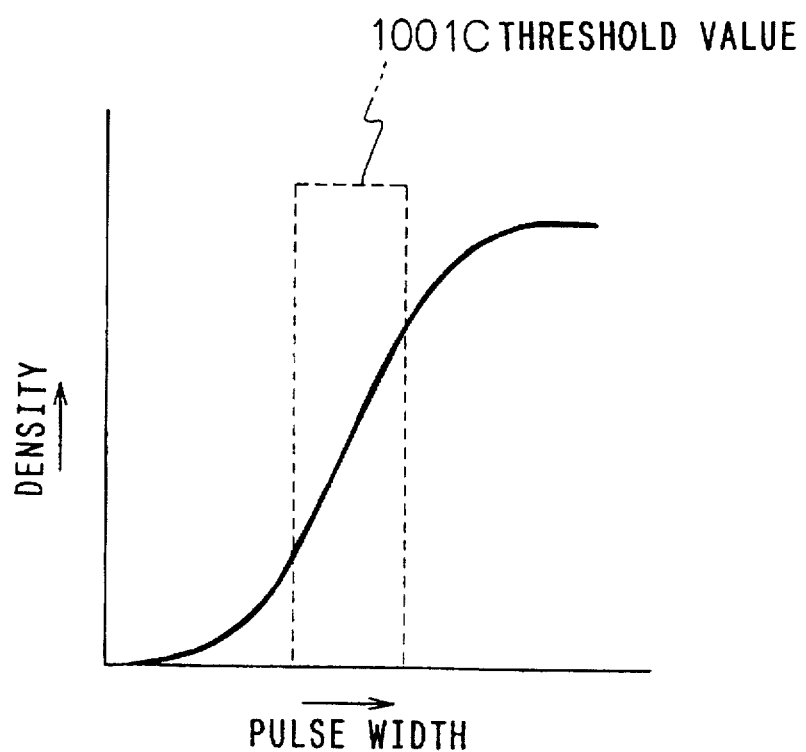
FIG. 9 is a diagram showing the relationship between the pulse width of a video signal shown in FIG. 1 and the density.
Figure 10A:
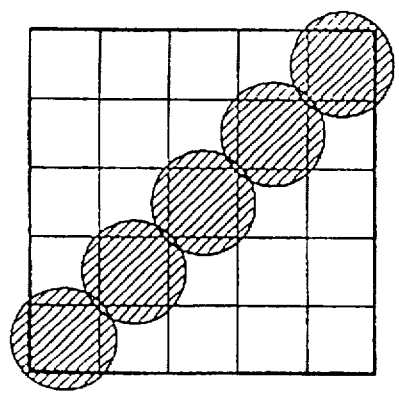
FIG. 10 is a diagram showing the concept of the smoothing processing performed by the smoothing circuit shown in FIG. 1, in which 10(a) to 10(d) are diagrams showing visible images and 10(e) to 10(h) show the video signals of the respective visible images.
Figure 10B:
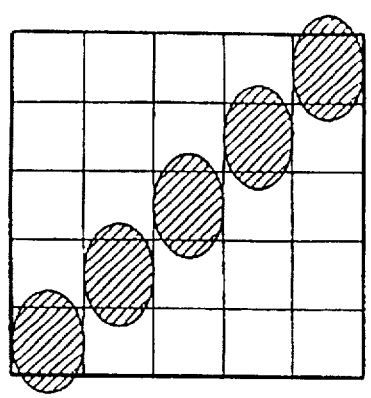
Figure 10C:
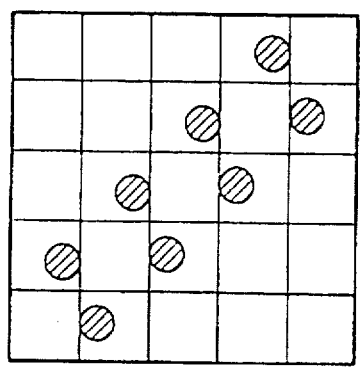
Figure 10D:
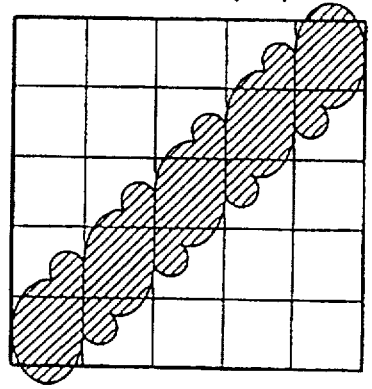
Figure 10E:
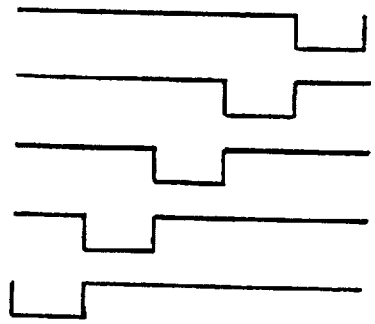
Figure 10F:
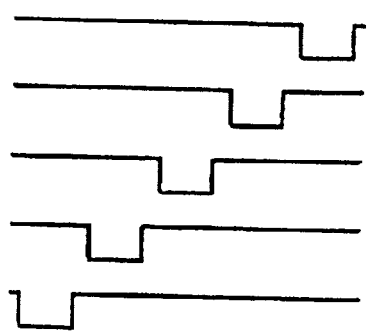
Figure 10G:
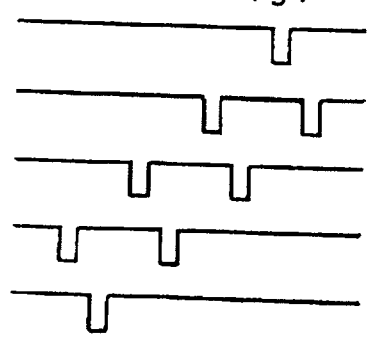
Figure 10H:
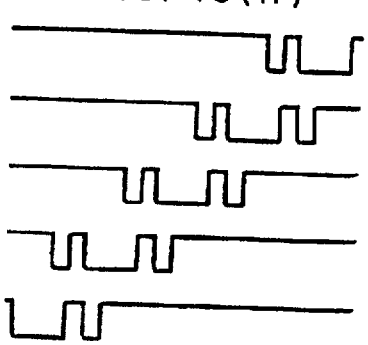

The pulse width of the video signal 1001 and the density of the visible image does not have a proportional relationship, but have such a characteristic as shown in FIG. 9. This characteristic is called as an input/output characteristic of the engine 4, the light and darkness of the density is clearly separated on a threshold of the pulse width. As the gradient of the curved line shown in FIG. 9 is sharper, the contrast is clearer, but halftone representation becomes worse. Conversely, as the gradient of the curved line is more moderate, the halftone representation is more excellent, but the contrast becomes more uncleared. It should be noted in FIG. 6 that charges due to the light exposure exist on the periphery of the fixed toner in the 100% and 50% areas and also exist even in the 0% area. Further, as the characteristic of the photosensitive member, the charges are accumulated every time light irradiation is repeated, and the final light exposure is equal to the total of the light exposure of the respective irradiation operations.

[Summary of Smoothing Processing]

FIG. 10 shows the concept of the smoothing processing of the present invention which effectively uses the characteristic of the electrophotographic print as described above. In FIG. 10, (a) shows a visible image when no smoothing processing is performed, and 10(e) shows a video signal of each line. The pulse width of the video signal shown in (e) of FIG. 10 represents a 100%-area dot as show in FIG. 6.

In FIG. 10, (b) to (d) show visible images when the smoothing processing is performed, and (f) to (h) show video signals for the respective visible images. In the smoothing processing, the visible images shown in (b) and (c) of FIG. 10 are combined with each other to form the final result (visible image) shown in (d) of FIG. 10. In (b) of FIG. 10, concave portions of (a) of FIG. 10 are corrected, and in (c) of FIG. 10 convex portions of (a) of FIG. 10 are corrected. If the visible image shown in (c) of FIG. 10 is alone, it has a light exposure which is deficient to form a sufficient visible image. However, the light exposure around the fixed toner of (c) of FIG. 10 is accumulated, and thus a sufficient visible image which can correct the convex portions of (a) of FIG. 10 can be finally obtained. Further, the visible image of (b) of FIG. 10 which is to be mixed with narrowing dots of (c) of FIG. 10 is set so that the density of the visible image shown in (d) of FIG. 10 is equal to that of (a) of FIG. 10.

[Operation of Smoothing Circuit]

The operation of the smoothing circuit will be described with reference to FIG. 1. First, the image input means 10 samples, in synchronism with the video clock signal 1004, image data which are output on the basis of the video signal 1000 by the controller 3, and temporarily holds the sampled image data therein.

Subsequently, the area generating means 11 forms a reference area of 3 pixels in main scanning direction×3 pixels in auxiliary scanning direction from the image data held in the image input means 10. In this embodiment, the reference area comprises a noted pixel at the center thereof and eight reference pixels around the noted pixel.

The feature extraction means 12 judges on the basis of the pattern matching process whether the reference area generated by the area generating means 11 is an image which should be subjected to the smoothing processing. If it is an image which should be subjected to the smoothing processing, the gradient of the contour portion of the image is detected.

The resolution enhancing means 13 subdivides each pixel of the reference area into K rows×L columns, and then smooths the contour portion. The values of the K and L are determined on the basis of the gradient detected by the feature extraction means 12 and the ratio of the resolution of images generated by the controller 3 and the recording resolution which is originally defined for the engine 4. Hereinafter, the resolution of the images generated by the controller 3 is referred to as "the resolution of the controller 3" and the recording resolution which is originally defined for the engine 4 is referred to as "the resolution of the engine 4".

When the resolution of the controller 3 is lower than the resolution of the engine 4, the area selection means 14 divides the noted pixel smoothed by the resolution enhancing means 13 in accordance with the resolution ratio of the controller 3 and the engine 4, and selects from the divided areas an area to be transmitted to a next step. If the resolution of the controller 3 is equal to the resolution of the engine 4, the overall noted pixel is selected as an area to be transmitted.

The density calculation means 15 and the center-of-gravity calculation means 16 calculates the density and the center of gravity of the area on the basis of the respective pixel values of the area which is divided and selected by the area selection means 14. The density and the center of gravity which are calculated by the density calculation means 15 and the center-of-gravity calculation means 16 are calculated on the assumption that the relationship between the pulse width and the density as described with reference to FIG. 9 satisfies the directly proportional relationship.

The characteristic correction means 17 corrects the density and the center of gravity calculated by the density calculation means 15 and the center-of-gravity calculation means 16 in accordance with input/output characteristic information of the engine 4 which is preset by the controller 3.

The variation point calculation means 18 calculates the final variation point of the video signal 1001 on the basis of the density and the center of gravity which are corrected by the characteristic correction means 17.

The video output means 19 outputs to the engine 4 the video signal having the pulse width which meets the variation point information obtained by the variation point calculation means 18.

The synchronous output means 20 outputs to the controller 3 the video clock signal 1004 for the transmission of the video signal 1000 by the controller 3 and the horizontal synchronous signal 100 which is synchronized with the video clock signal 1004.

Next, the construction of each part of the smoothing circuit will be described in detail.

[Synchronous output means 20]

FIG. 11 is a block diagram showing the synchronous output means 20. As shown in FIG. 11, the synchronous output means 20 includes an oscillator 90 for generating a clock signal SYSCLK, a frequency divider 91 for dividing the frequency of the SYSCLK signal transmitted from the oscillator 90, a synchronous circuit 9 for sampling the horizontal synchronous signal output from the engine 4 at a DOTCLK signal output from the frequency divider 91 to generate a horizontal synchronous signal LSYNC having a predetermined pulse width, and an output control circuit 93 for generating and outputting an HSYNC signal shown in FIGS. 13 and 14 in accordance with the resolution ratio of the controller and the engine on the basis of the LSYNC signal output from the synchronous circuit 92.

The oscillator 90 generates the clock signal SYSCLK having the frequency which is an integer times of the transmission frequency of the video signal which is originally defined in the engine 4. The SYSCLK signal is used as a basic clock signal of the video output means 19. Hereinafter, the video signal transmission frequency which is originally defined in the engine 4 is referred to as "the video frequency of the engine 4".

The frequency divider 91 generates a DOTCLK signal and a PIPCLK signal by dividing the frequency of the SYSCLK signal. When the resolution ratio of the controller 3 and the engine 4 is equal to 1:1, the DOTCKL signal is a clock signal having the same frequency as the video frequency of the engine 4. When the resolution ratio of the controller 3 and the engine 4 is equal to 1:2, it is a clock signal having a half frequency of the video frequency of the engine 4. The DOTCLK signal is used as an operating clock for the image input means 10 and the area generating means 11, and at the same time it is supplied to the controller 3 as a video clock signal 1004.

Further, when the resolution ratio of the controller 3 and the engine 4 is equal to 1:1, the PIPCLK signal is a clock signal having the same phase and the sam frequency as the DOTCLK signal. When the resolution ratio of the controller 3 and the engine 4 is equal to 1:2, it is a clock signal which has the same phase as the DOTCLK signal, but has a frequency of two times of the DOTCLK signal. The PIPCLK signal is used as a pipe line clock for data transmission between the respective functional blocks.

Figure 12:
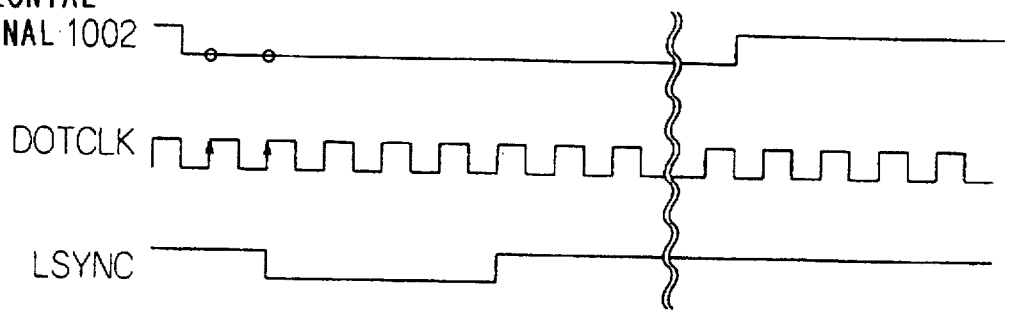
FIG. 12 is a waveform diagram showing the relationship between a horizontal synchronous signal of the synchronous output means shown in FIG. 11 and a video clock signal.

As shown in FIG. 12, the synchronous circuit 92 samples the horizontal synchronous signal 1002 output from the engine 4 at least two times on the basis of the DOTCLK signal to generate a horizontal synchronous signal LSYNC having a predetermined pulse width.

Figure 13:
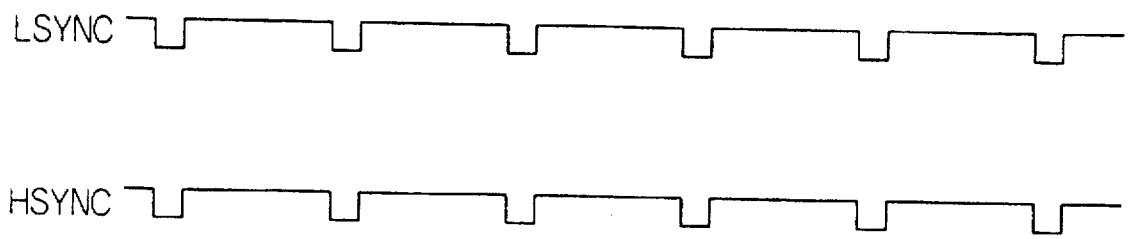
FIG. 13 is a waveform diagram showing a horizontal synchronous signal output from the synchronous output means shown in FIG. 11 when the resolution ratio of a controller and an engine is equal to 1:1.
Figure 14:
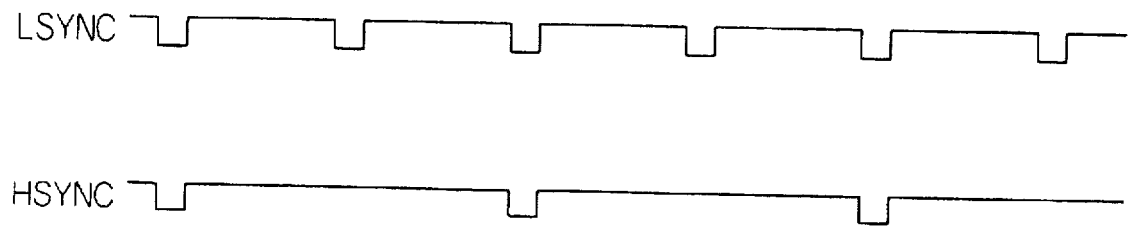
FIG. 14 is a waveform diagram showing a horizontal synchronous signal output from the synchronous output means shown in FIG. 11 when the resolution ratio of the controller and the engine is equal to 1:2.

When the resolution ratio of the controller 3 and the engine 4 is equal to 1:1, the output control circuit 93 directly outputs the LSYNC signal as HSYNC signal as shown in FIG. 13. When the resolution ratio of the controller 3 and the engine 4 is equal to 1:2, it outputs every other LSYNC signal as HSYNC signal as shown in FIG. 14. The HSYNC signal is supplied as the horizontal synchronous signal 1003 to the controller 3. The mode setting of the resolution ratio of the controller 3 and the engine 4 for the frequency divider 91 and the output controller 93 is beforehand performed by the controller 3.

[Image input means 10]

Figure 15A:
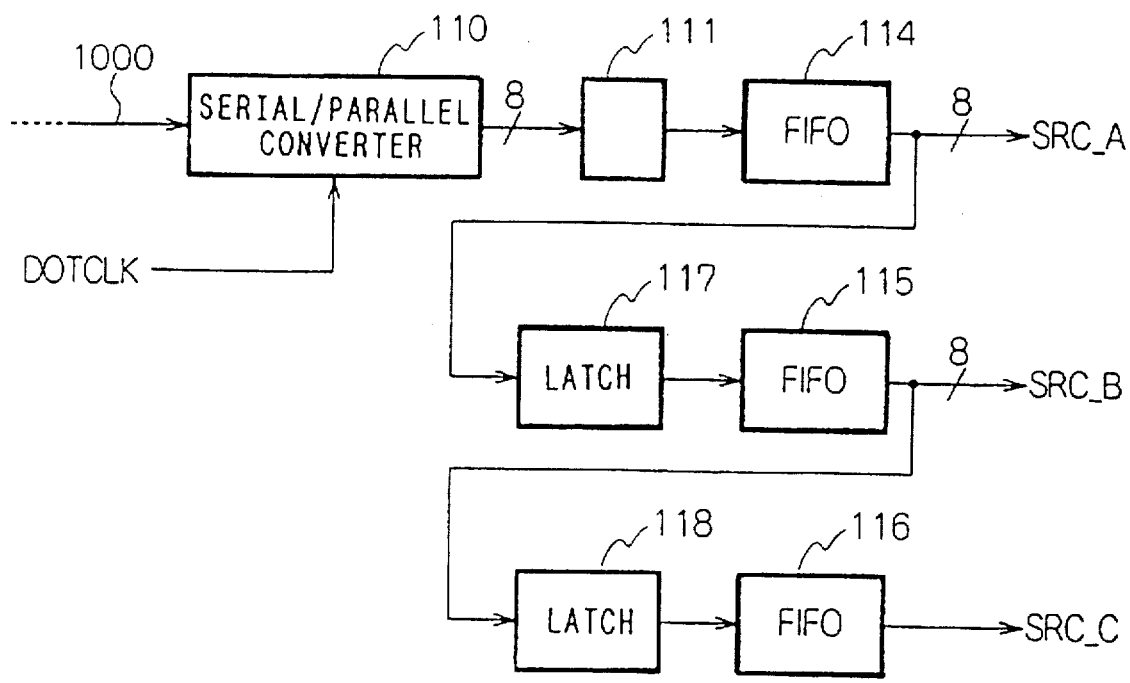
FIG. 15 is a circuit diagram showing the detailed construction of image input means shown in FIG. 1, in which 15(a) shows the whole construction of the image input means, and 15(b) is a circuit diagram showing the construction of an FIFO control circuit.
Figure 15B:
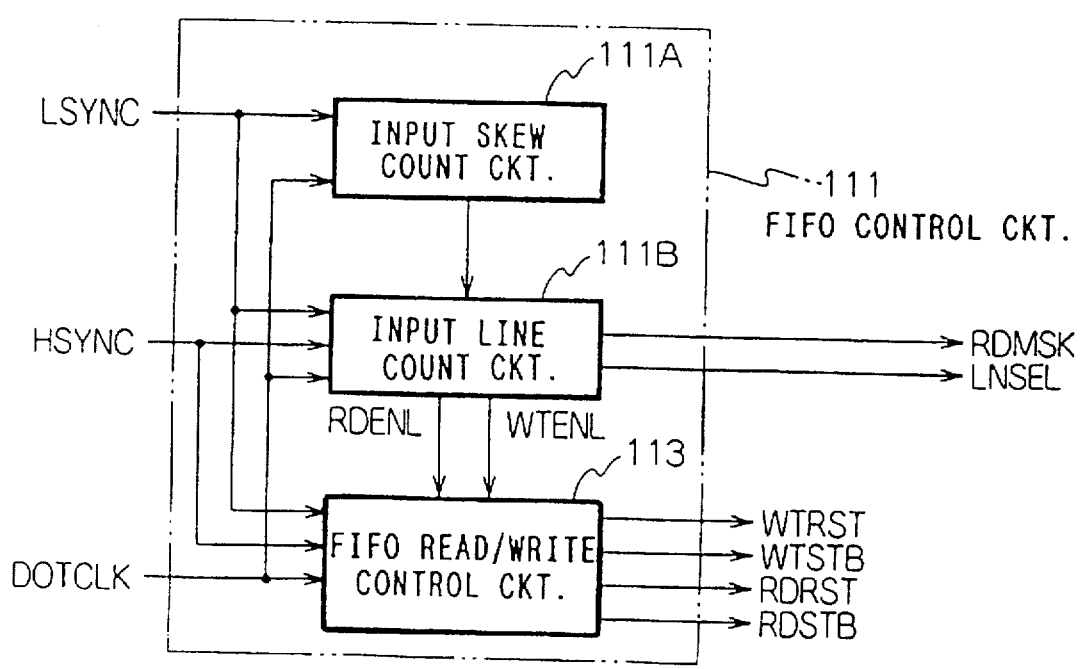

FIG. 15 is a circuit diagram of the image input means 10. The image input means 10 includes a serial/parallel converter 110 for converting the video signal 1000 output from the controller 3 to 8-bit parallel data, and an FIFO control circuit 111 for storing the parallel data output from the serial/parallel converter 110 into the FIFO 114.

The FIFO control circuit 111 includes an input skew/count circuit 111A for counting on the basis of the DOTCLK signal a skew value which is preset every time the LSYNC signal is input, an input line/count circuit 111B for counting on the basis of the DOTCLK signal the effective length of FIFOs 114 to 116 after the count of the input skew by the input skew/count circuit 111A is completed, and outputting RDENL signal or WTENL signal representing a read-out or write-in effective time period on the basis of the count value, and an FIFO read/write control circuit 113 for controlling write-in of a video signal output from the serial/parallel converter 110 into the FIFO in accordance with a signal which is output from the input line/count circuit 111B.

The serial/parallel converter 110 converts into 8-bit parallel data the video signal 1000 which is serially output from the controller 3 in synchronism with the DOTCLK signal. The 8-bit data which are output from the serial/parallel converter 110 are successively written in the FIFO 114 by the FIFO read/write control circuit 113.

The input skew/count circuit 111A counts the preset skew value on the basis of the DOTCLK signal every time the LSYNC signal is input. The "skew" means the time period from the output of the horizontal synchronous signal 1002 of the engine 4 to the time when the laser scanning reaches the left end of a sheet, and the skew value which is set in an output skew/count circuit 501 of video output means 19 described later by the controller 3 is directly used as the skew value to be set in the input skew/count circuit 111A.

After the count of the skew value by the input skew/count circuit 111 is completed, the input line/count circuit 111B counts the effective length of the FIFOs 114 to 116 on the basis of the DOTCLK signal so as to prevent overflow of the data read-out operation from the FIFOs 114 to 116 and the data write-in operation into the FIFOs 114 to 116. With respect to a line to which the LSYNC signal and the HSYNC signal are simultaneously input, each of RDENL signal representing a read-out effective time period of the FIFOs 114 to 116 and WTENL signal representing a write-in effective time period is output from the line. On the other hand, with respect to a line to which only the LSYNC signal is input, only the RDENL signal is output from the line.

Upon receiving the LSYNC signal, the FIFO read/write control circuit 113 outputs a reset signal (RDRST signal) for initializing the rad address counter in each of the FIFOs 114 to 116. Upon receiving the HSYNC signal, the FIFO read/write control circuit 113 outputs a reset signal (WRST) for initializing the write address counter of each of the FIFOs 114 to 116. During the read-out effective time period indicated by the RDENL signal, it outputs a read signal (RDSTB) for the FIFOs 114 to 116, and during the write-in effective time period indicated by the WTENL signal, it outputs a write signal (WTSTB) for the FIFOs 114 to 116.

Figure 16:
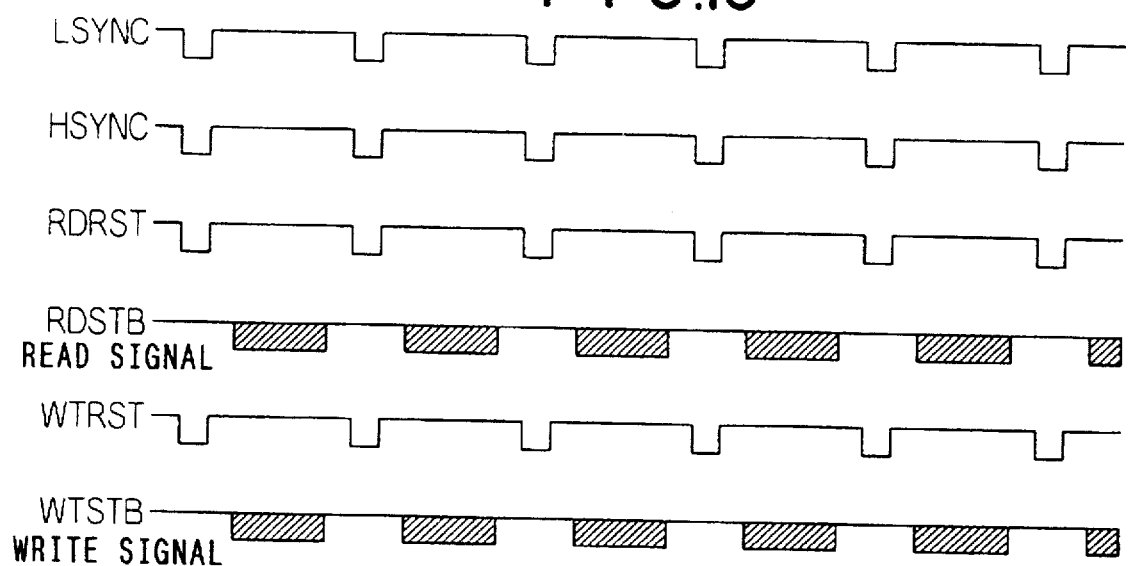
FIG. 16 is a schematic waveform diagram showing the control of the FIFO by the image input means shown in FIG. 15 when the resolution ratio of the controller and the engine is equal to 1:1.
Figure 17:
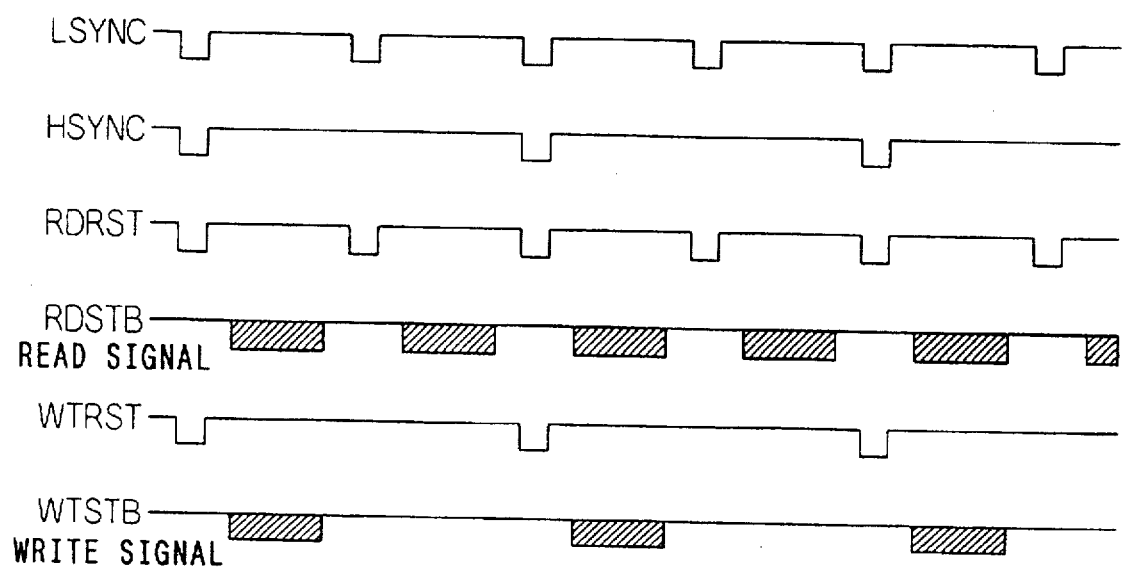
FIG. 17 is a schematic waveform diagram showing the control of the FIFO by the image input means shown in FIG. 15.

Accordingly, when the resolution ratio of the controller 3 and the engine 4 is equal to 1:1, the write cycle and the read cycle are performed every line as shown in FIG. 16. On the other hand, when the resolution ratio of the controller 3 and the engine 4 is equal to 1:2, the write cycle is performed every other line, but the read cycle is performed every line as shown in FIG. 17. This means that the same data are sequentially read out twice in the read cycle.

Figure 18:
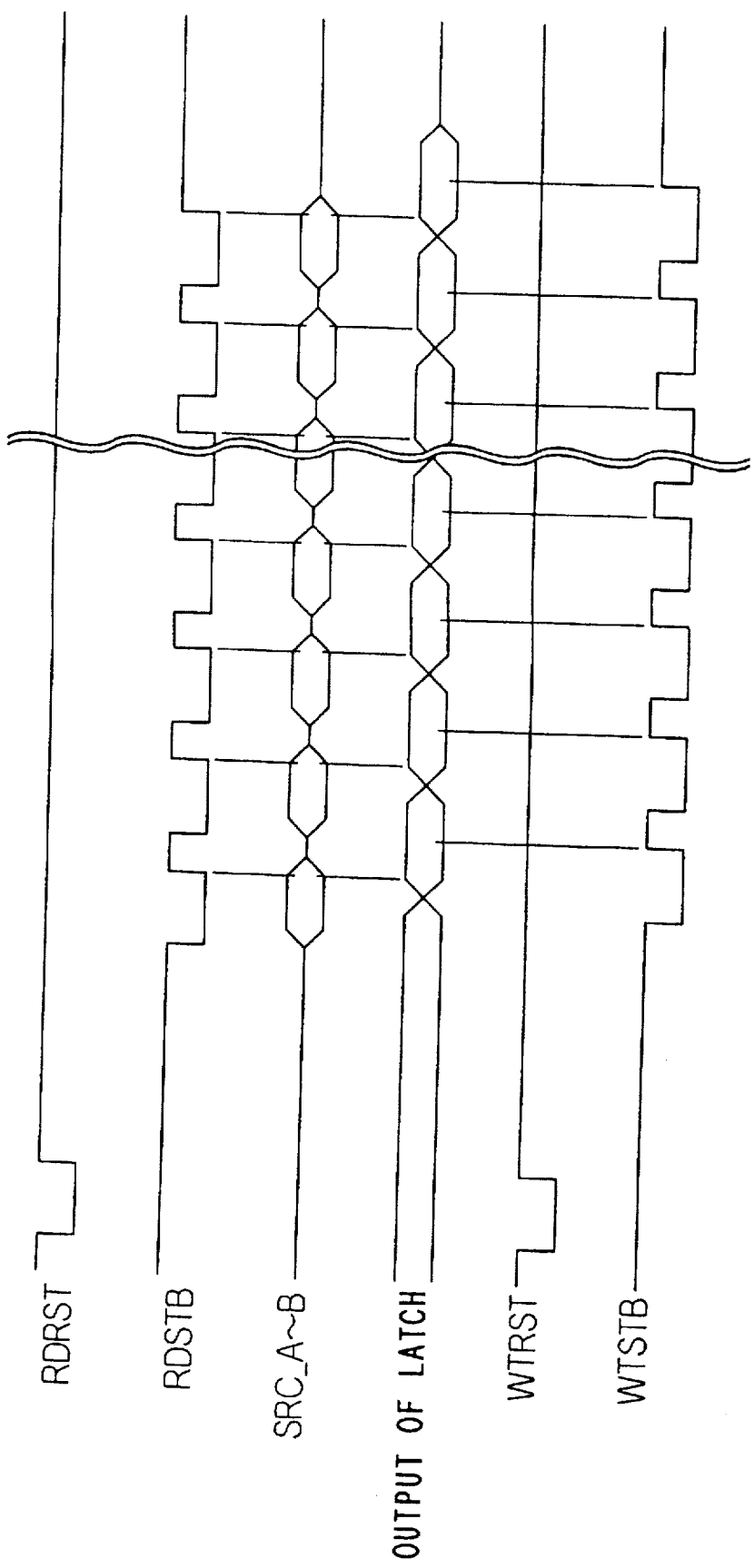
FIG. 18 is a detailed waveform diagram showing the read/write operation of the FIFO by the image input means shown in FIG. 15.

FIG. 18 is a detailed timing chart of the write cycle and the read cycle in the FIFOs 114 to 116. The FIFO read/write control circuit 113 outputs the RDSTB signal and the WTSTB signal so that the read cycle is surely prior to the write cycle. The read data SRC_A to SRC_B of the FIFOs 114 to 115 which are read out by the RDSTB signal are held in latches 117 to 118 respectively at the rise-up edge of the RDSTB signal. The data which are held in the latches 117 to 118 are written into the FIFOs 115 and 116 at the rise-up edge of the WTSTB signal. As a result, the data of the newest line are stored in the FIFOs 114 at all times while the data of the oldest line are stored in the FIFO 116 at all times.

The input line/count circuit 111B outputs RDMSK signal for masking SRC_A to SRC_C during the time period other than the read-out effective time period, and LNSEL signal representing whether the current line is a line to which both the LSYNC signal and the HSYNC signal are simultaneously input or a line to which only the LSYNC signal is input.

[Area generating means 11]

Figure 19:
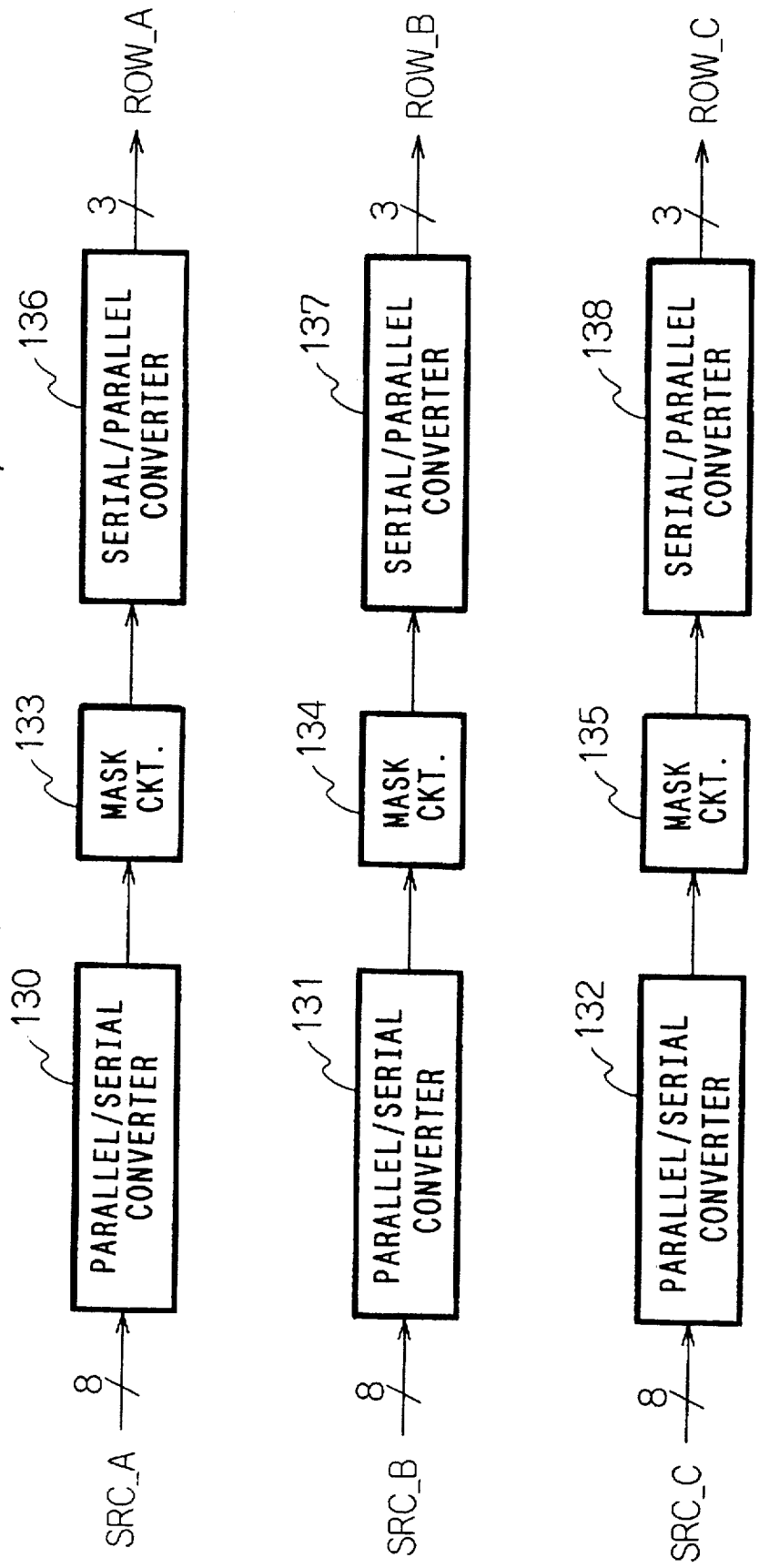
FIG. 19 is a circuit diagram showing the construction of area generating means shown in FIG. 1.

FIG. 19 is a circuit diagram showing the area generating means 11. Parallel/serial converters 130 to 132 latch the 8-bit data SRC_A to SRC_C output from the FIFOs 114 to 116 at the rise-up edge of the RDSTB signal, and shift and output these data in synchronism with the DOTCLK signal. Mask circuits 133 to 135 take the logical product of the shift-output of the parallel serial converters 130 to 132 and the RDMSK signal respectively in order to perform a masking in the time period other than the read-out effective time period.

Serial/parallel converters 136 to 138 converts the outputs of the mask circuits 133 to 135 to 3-bit parallel data in synchronism with the DOTSLK signal, and outputs the 3-bit parallel data as pixel data ROW_A to ROW_C for this reference area. Further, FIG. 20 represents a reference area which is generated by the area generating means 11. The reference area comprises 3 pixels in the main scanning direction×3 pixels in the auxiliary scanning direction, totally 9 pixels, and a noted pixel a is located at the center of the reference area.

[Feature extraction means 12]

Next, the algorithm of the feature extraction means 12 will be described. Detection operators which are exclusively used for to +½ and the noted pixel is a black pixel, FIG. 26 shows detection operators P25 to 28 for detecting a contour portion in which the gradient is equal to +½ and the noted pixel is a white pixel, FIG. 27 shows detection operators P29 to P34 for detecting a contour portion in which the gradient is equal to −½ and the noted pixel is a black pixel, FIG. 28 shows detection operators P35 to P38 for detecting a contour portion in which the gradient is equal to −½ and the noted pixel is a white pixel, FIG. 29 shows detection operators P39 to P44 for detecting a contour portion in which the gradient is equal to +2 and the noted pixel is a black pixel, FIG. 30 shows detection operators P45 to P48 for detecting a contour portion in which the gradient is equal to +2 and the noted pixel is a white pixel, FIG. 31 shows detection operators P49 to P54 for detecting a contour portion in which the gradient is equal to −2 and the noted pixel is a black pixel, and FIG. 32 shows detection operators P55 to P58 for detecting a contour portion in which the gradient is equal to −2 and the noted pixel is a white pixel.

With respect to contour portions having other gradient values than the above gradient values, each contour portion is regarded as a combination of a horizontal or vertical contour portion and a contour portion which can be detected by the detection operators P1 to P58, or a combination of contour portions which can be detected by the detection operators P1 to P58. For example, as shown in FIG. 33, the contour of an image having a gradient of +¼ is regarded as a combination of horizontal contour portions 12a and contour portions 23b having a gradient of +½, and the contour of an image having the gradient of +⅔ is regarded as a detection on the basis of the optimum matching are applied to the judgement of the feature extraction means 12 as to whether a reference area is an image which should be subjected to the smoothing processing, and the detection of the gradient of the contour portion when the reference area is judged to be the image which should be subjected to the smoothing processing. That is, the judgment and the detection are performed on the basis of the comparison result between the reference area and the detection operators. This is generally called as "pattern matching".

FIGS. 21 to 32 are diagrams showing the detection operators P which are expressed with weighted matrices. In FIGS. 21 to 32, "1" represents a black pixel, and "0" represents a white pixel. The center of each detection operator corresponds to the noted pixel. In this embodiment, the gradient is classified into six types corresponding to ±1, ±2, ±½ as shown in FIGS. 21 to 32.

Here, assuming that the main scanning direction is set to the X axis and the auxiliary scanning direction is set to the Y axis, FIG. 21 shows detection operators P1 to P5 for detecting a contour portion in which the gradient is equal to +1 and the noted pixel is a black pixel. FIG. 22 shows detection operators P6 to P9 for detecting a contour portion in which the gradient is equal to +1 and the noted pixel is a white pixel, FIG. 23 shows detection operators P10 to P14 for detecting a contour portion in which the gradient is equal to −1 and the noted pixel is a black pixel, FIG. 24 shows the detection operators P15 to P18 for detecting a contour portion in which the gradient is equal to −1 and the noted pixel is a white pixel, FIG. 25 shows detection operators P19 to P24 for detecting a contour portion in which the gradient is equal combination of contour portions 12b having a gradient of +½ and a contour portion 12c having a gradient of +1. Further, if a contour portion is not coincident with any one of the detection operators P1 to P58, the image of the contour portion is judged not to be subjected to the smoothing processing. In this case, for convenience's sake, if the noted pixel of this image is a black pixel, the contour portion is regarded as being coincident with a detection operator P59. On the other hand, if the noted pixel of the image is a white pixel, the contour portion is regarded as being coincident with a detection operator P60.

[Resolution Enhancing means 13]

As a result of the feature extraction process of the feature extraction means 12, the type of the coincident detection operator is notified to the resolution enhancing means 13. The resolution enhancing means 13 divides each pixel of the reference area into pixels of K rows×L columns on the basis of the coincident detection operators P1 to P60, and then smooths the contour portion of an image within the reference area through the resolution enhancing correction processing. The values of K and L are set as follows. In the case where the resolution ratio of the controller 3 and the engine 4 is equal to 1:1, when there is any coincidence based on any one of the detection operators P1 to P18 (gradient of ±1), (K,L)=(3,3) as shown in FIGS. 34 to 37. If there is any coincidence based on any one of the detection operators P19 to P38 (gradient of ±½), (K,L)=(4,1) as shown in FIGS. 38 to 41. If there is any coincidence based on any one of the detection operators P39 to P58 (gradient of ±2), (K,L)=(1,4) as shown in FIGS. 42 to 45.

In the case where the resolution ratio of the controller 3 and the engine 4 is equal to 1:2, if there is any coincidence based on any one of the detection operators P1 to P18 (gradient of ±1), (K,L)=(3,3) as shown in FIGS. 46 to 49. If there is any coincidence based on any one of the detection operators P19 to P38 (gradient of ±½), (K,L)=(8,2) as shown in FIGS. 50 to 53. Further, if there is any coincidence based on any one of the detection operators P39 to P58 (gradient of ±2), (K,L)=(2,8) as shown in FIGS. 54 to 57.

Further, even in any case where the resolution ratio is equal to 1:1 or 1:2, if there is any coincidence based on any one of the detection operators P59 to P60, that is, if it is judged that the smoothing processing should not be performed, the resolution enhancing correction processing is not performed. Accordingly, in this case, (K,L)=(1,1).

FIGS. 34 to 45 show the contents of the resolution enhancing correction processing when the resolution ratio of the controller 3 and the engine 4 is equal to 1:1. FIG. 34 shows the processing for a contour portion in which the gradient is equal to +1 and the noted pixel is a black pixel when the detection operators P1 to P5 are coincident with the contour portion, FIG. 35 shows the processing for a contour portion in which the gradient is equal to +1 and the noted pixel is a white pixel when the detection operators P6 to P9 are coincident with the contour portion, FIG. 36 shows the processing for a contour portion in which the gradient is equal to −1 and the noted pixel is a black pixel when the detection operators are coincident with the contour portion, and FIG. 37 shows the processing for a contour portion in which the gradient is equal to −1 and the noted pixel is a white pixel when the detection operators P15 to P18 are coincident with the contour portion. In any case, each pixel is divided into pixels of 3 rows×3 columns and then subjected to the smoothing processing.

FIG. 38 shows the processing for a contour portion in which the gradient is equal to +½ and the noted pixel is a black pixel when the detection operators P19 to P24 are coincident with the contour portion, FIG. 39 shows the processing for a contour portion in which the gradient is equal to +½ and the noted pixel is a white pixel when the detection operators P25 to P28 are coincident with the contour portion, FIG. 40 shows the processing on a contour portion in which the gradient is equal to −½ and the noted pixel is a black pixel when the detection operators P29 to P34 are coincident with the contour portion, and FIG. 41 shows the processing for a contour portion in which the gradient is equal to −½ and the noted pixel is a white pixel when the detection operators P35 to P38 are coincident with the contour portion. In each case, each pixel is divided into pixels of 4 rows×1 column and then smoothed.

FIG. 42 shows the processing for a contour portion in which the gradient is equal to +2 and the noted pixel is a black pixel when the detection operators P39 to P44 are coincident with the contour portion, FIG. 43 shows the processing for a contour portion in which the gradient is equal to +2 and the noted pixel is a white pixel when the detection operators P45 to P48 are coincident with the contour portion, FIG. 44 shows the processing for a contour portion in which the gradient is equal to −2 and the noted pixel is a black pixel when the detection operators P49 to P54 are coincident with the contour portion, and FIG. 45 shows the processing for a contour portion in which the gradient is equal to −2 and the noted pixel is a white pixel when the detection operators P55 to P58 are coincident with the contour portion. In each case, each pixel is divided into pixels of 1 row×4 columns, and then smoothed. When the contour portion is any one of the detection operators P59 and P60, no smoothing processing is performed, and an image before processed is used as an image after processed.

FIGS. 46 to 57 show the contents of the resolution enhancing correction processing when the resolution ratio of the controller 3 and the engine 4 is equal to 1:2. FIG. 46 shows the processing for a contour portion in which the gradient is equal to +1 and the noted pixel is a black pixel when the detection operators P1 to P5 are coincident with the contour portion, FIG. 47 shows the processing for a contour portion in which the gradient is equal to +1 and the noted pixel is a white pixel when the detection operators P6 to P9 are coincident with the contour portion, FIG. 48 shows the processing for a contour portion in which the gradient is equal to −1 and the noted pixel is a black pixel when the detection operators P10 to P14 are coincident with the contour portion, and FIG. 49 shows the processing for a contour portion in which the gradient is equal to −1 and the noted pixel is a white pixel when the detection operators P15 to P18 are coincident with the contour portion. In each case, each pixel is divided into pixels of 3 rows×3 columns, and then smoothed. The processing of FIGS. 34 and 35 are the same as the processing of FIGS. 46 to 49.

FIG. 50 shows the processing for a contour portion in which the gradient is equal to +½ and the noted pixel is a black pixel when the detection operators P19 to P24 are coincident with the contour portion, FIG. 51 shows the processing for a contour portion in which the gradient is equal to +½ and the noted pixel is a white pixel when the detection operators P25 to P28 are coincident with the contour portion, FIG. 52 shows the processing for a contour portion in which the gradient is equal to −½ and the noted pixel is a black pixel when the detection operators P29 to P34 are coincident with the contour portion, and FIG. 53 shows the processing for a contour portion in which the gradient is equal to −½ and the noted pixel is a white pixel when the detection operators P35 to P38 are coincident with the contour portion. In each case, each pixel is divided into pixels of 8 rows×2 columns, and then smoothed.

FIG. 54 shows the processing for a contour portion in which the gradient is equal to +2 and the noted pixel is a black pixel when the detection operators P39 to P44 are coincident with the contour portion, FIG. 55 shows the processing for a contour portion in which the gradient is equal to +2 and the noted pixel is a white pixel when the detection operators P45 to P48 are coincident with the contour portion, FIG. 56 shows the processing for a contour portion in which the gradient is equal to −2 and the noted pixel is a black pixel when the detection operators P49 to P54 are coincident with the contour portion, and FIG. 57 shows the processing for a contour portion in which the gradient is equal to −2 and the noted pixel is a white pixel when the detection operators P55 to P58 are coincident with the contour portion. In each case, each pixel is divided into pixels of 2 rows×8 columns, and then smoothed. If the contour portion is coincident with any one of the detection operators P59 and P60, no smoothing processing is performed, and an image before processed is directly used as an image after processed. The resolution enhancing correction processing is performed so as to keep the density of the image.

When each pixel is divided into pixels of 3 rows×3 columns as shown in FIGS. 34 to 37 and FIGS. 46 to 49, upon considering the smoothed contour portion, the density of the noted pixel (black pixel) is reduced by ⅑ and the density of the noted pixel (white pixel) is reduced by ⅑. In addition, the black pixel and the white pixel appear alternately, so that the density of the image itself is not varied.

When each pixel is divided into pixels of 4 rows×1 column or 1 row×4 columns, the density of the noted pixel (black pixel) is reduced by ¼, and the density of the noted pixel (white pixel) is reduced by ¼. In addition, the black pixel and the white pixel appear alternatively, so that the density of the image itself is not varied.

When each pixel is divided into pixels of 8 rows×2 columns or 2 rows×8 columns, the density of the noted pixel (black pixel) is reduced by ¼, and the density of the noted pixel (white pixel) is reduced by ¼. In addition, the black pixel and the white pixel appear alternatively, so that the density of the image itself is not varied.

Here, the noted pixel after the resolution enhancing correction processing is referred to as "corrected pixel". When the resolution ration of the controller 3 and the engine 4 is equal to 1:1, as shown in FIG. 58, the resolution enhancing means 13 generates twenty corrected pixels Q1 to Q20 from the sixty detection operators P1 to P60. Further, when the resolution ratio of the controller 3 and the engine 4 is equal to 1:2, as shown in FIG. 59 the resolution enhancing means 13 generates twenty eight corrected pixels RI to R28 from the sixty detection operators P1 to P60.

[Area selection means 14]

As a result of the resolution enhancing correction processing of the resolution enhancing means 13, the corrected pixels thus generated are supplied to the area selection means 14. The area selection means 14 selects from the corrected pixels an area to be supplied to the density calculation means 15 and the center-of-gravity calculation means 16 at the next step. First, when the resolution ration of the controller 3 and the engine 4 is equal to 1:1, each of the corrected pixels itself is set as a selected area. That is, the corrected pixels are directly used as selected areas S1 to S20 as shown in FIG. 60. The area selection means 14 directly supplies the corrected pixels as the selected areas to the density calculation means 15 and the center-of-gravity calculation means 16 at the next step.

Next, when the resolution ratio of the controller 3 and the engine 4 is equal to 1:2, the corrected pixel is divided into equal pixels of 2 rows×2 columns. For example, each of the corrected pixel R1 and the corrected pixel R26 is divided into four equal parts. The row (line) is selected on the basis of the LNSEL signal, and the column is selected on the basis of the DOTCLK signal. The line which is indicated by the LNSEL signal and on which the LSYNC signal and the HSYNC signal occur simultaneously is set as a first row, and the line on which only the LSYNC signal occurs is set as a second row. The time period of the first half cycle of the DOTCLK signal is set for the first column, and the time period of the last half cycle is set for the second column.

That is, with respect to the line for which the area generating means 11 transmits a renewed reference, a 1 row×1 column area and a 1 row×2 column are alternately set as a selected area. Further with respect to the line for which the area generating means 11 transmits the same reference area of the previous line, a 2 rows×1 column area and a 2 rows×2 columns area are successively set as a selected area. As a result, when the resolution ratio of the controller 3 and the engine 4 is equal to 1:2, the pixel generated by the controller 2 is enlarged twice in both the main scanning direction and the auxiliary scanning direction. Through the above processing, eighteen selected areas T1 to T18 shown in FIG. 60 are generated. The area selection means 14 supplies the selected areas concerned to the density calculation means 15 and the center-of-gravity calculation means 16 at the next step.

[Density calculation means 15]

The density calculation means 15 calculates the occupation rate of a black pixel area to the whole area of a selected area generated by the area selection means 14. As a result, nine kinds of density, i.e., 0, ⅑, ¼, ⅜, ⅝, ¾, ⅞, ⅞, 1 are obtained for the selected areas S1 to S20 and the selected areas T1 to T18 as shown in FIG. 63.

[Center-of-gravity calculation means 16]

The center-of-gravity calculation means 16 calculates the center of gravity of the black pixels in the main scanning direction for each selected area generated by the area selection means 14. In the calculation of the center of gravity, the center axis of each row is set as an action point, the center of gravity of the black pixels is set to "1" and the center of gravity of the white pixels is set to "0". Further, assuming that the left end axis of the selected area is set to "0" and the right end axis thereof is set to "1", the center of gravity represents the position in the horizontal direction from the left end axis. Consequently, thirteen kinds of center of gravity (i.e., ⅛, ⅙, ⅓, 11/30, ⅜, 11/24, ½, 13/24, ⅝, 19/30, ⅔, ⅚, ⅞) are calculated for the selected areas S1 to S20 and the selected areas T1 to T18 as shown in FIG. 64. When the selected area contains only white pixels, that is, when the selected area is the selected area S20 or T18, the center of gravity is set to ½ for convenience's sake.

Here, the meaning of the density calculated by the density calculation means 15 and the center of gravity calculated by the center-of-gravity calculation means 16 will be described hereunder. When the input/output characteristic of the engine 4 is linear, the density represents the time length of the period for which the video signal 1000 is ON, and the center of gravity represents the coordinate of the center of the time length. FIGS. 65 and 66 are diagrams showing the variation of the waveform of the video signal 1000 in accordance with each selected area when the engine 4 has a linear input/output characteristic. In FIGS. 65 and 66, seventeen kinds of waveform are generated from the selected areas S1 to S20 and the selected areas T1 to T18. However, actually, the input/output characteristic of the engine 4 is not linear, but it has such a characteristic as shown in FIG. 7, for example. Accordingly, it is required to correct the density and the center of gravity in accordance with the input/output characteristic of the engine 4.

[Characteristic correction means 17]

The characteristic correction means 17 corrects the density calculated by the density calculation means 15 and the center of gravity calculated by the center-of-gravity calculation mans 16 in accordance with the input/output characteristic of the engine 4. The characteristic correction means 17 has eight 6-bit registers to which indexes from 0 to 7 are allocated respectively, and the input/out characteristic of the engine 4 is defined by the controller 3.

Figure 67A:
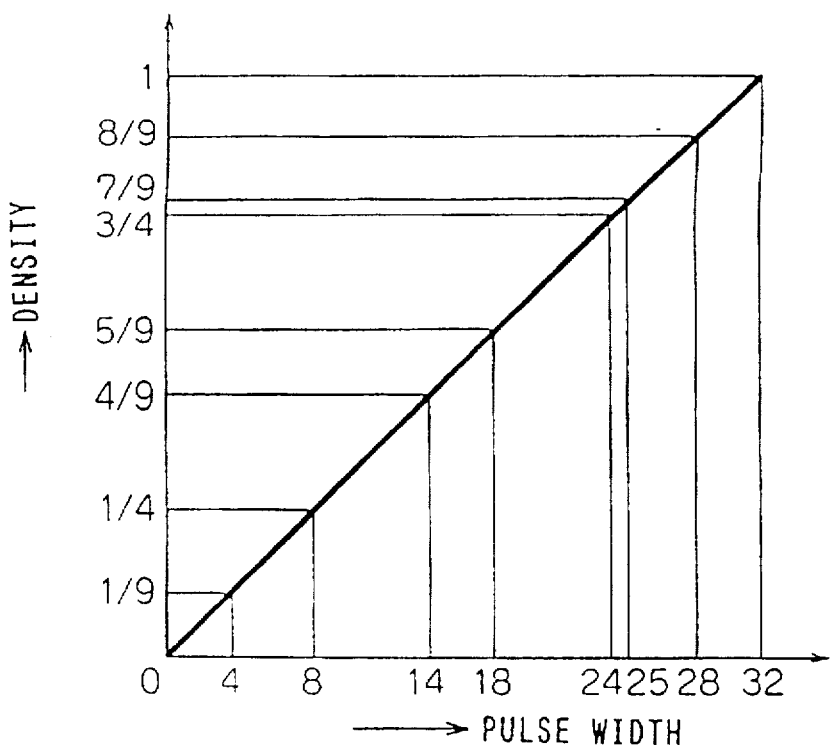
FIG. 67 so a diagram showing the input/output characteristic in characteristic correction means shown in FIG. 1, in which 67(a) shows the input/output characteristic before correction, and 67(b) shows the input/output characteristic after correction.
Figure 67B:
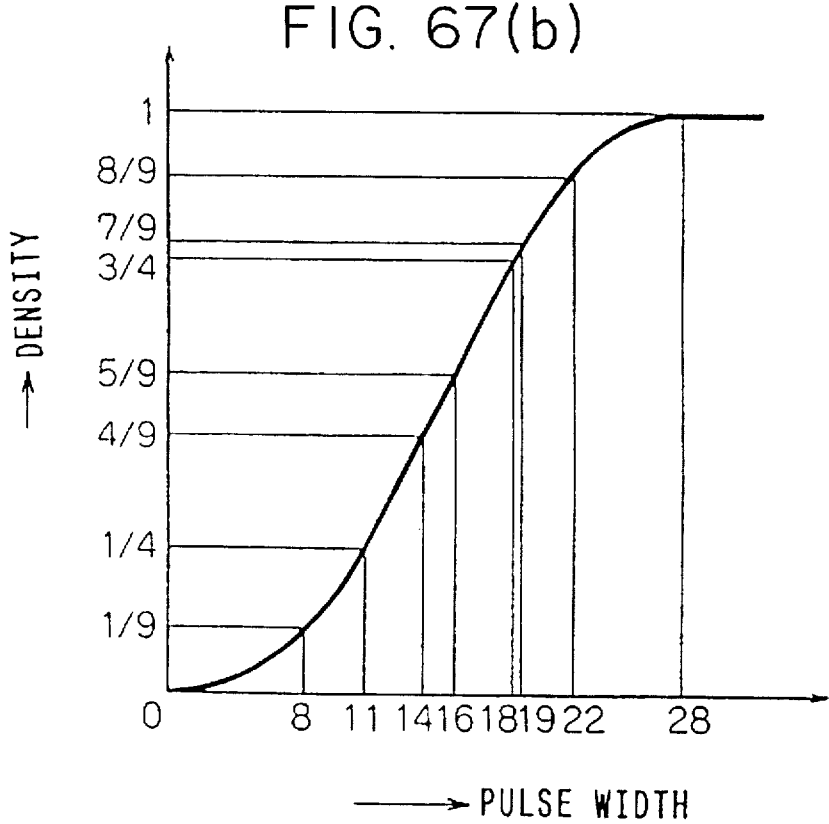

As shown in (a) of FIG. 67, the register having the index "0" corresponds to ⅑ density, the register having the index "1" corresponds to ¼ density, the register having the index "2" corresponds to ⅜ density, the register having the index "3" corresponds to ⅝ density, the register having the index "4" corresponds to ¾ density, the register of the index "5" corresponds to ⅞ density, the register of the index "6" corresponds to ⅞ density, and the register of the index "7" corresponds to 1 density.

When the value of the register is equal to 0, it represents 0 density, and when the value of the register is equal to 32, it represents 1 density. The values of the register from 33 to 63 are not used. The initial value of each register is set to 4 for the register of index 0; 8 for the register of index 1; 14 for the register of index 2; 18 for the register of index 3; 24 for the register of index 4; 25 for the register of index 5; 28 for the register of index 6; and 32 for the register of index 7.

Accordingly, in the initial state, the input/output characteristic of the engine 4 is linear. In accordance with the input/output characteristic of the engine 4, the controller 3 sets the pulse width of the density which corresponds to the register of each index. The characteristic correction means 17 replaces the eight kinds of density information (1/9, 1/4, 4/9, 5/9, 3/4, 7/9, 8/9, 1) calculated by the density calculation means 15 with the set values of the registers of the respective indexes. As a result, such a correction as shown in (b) of FIG. 67 is performed. Therefore, the smoothing processing in accordance with the engine can be performed by merely storing the above characteristic of the engine in the registers.

Figure 68A:
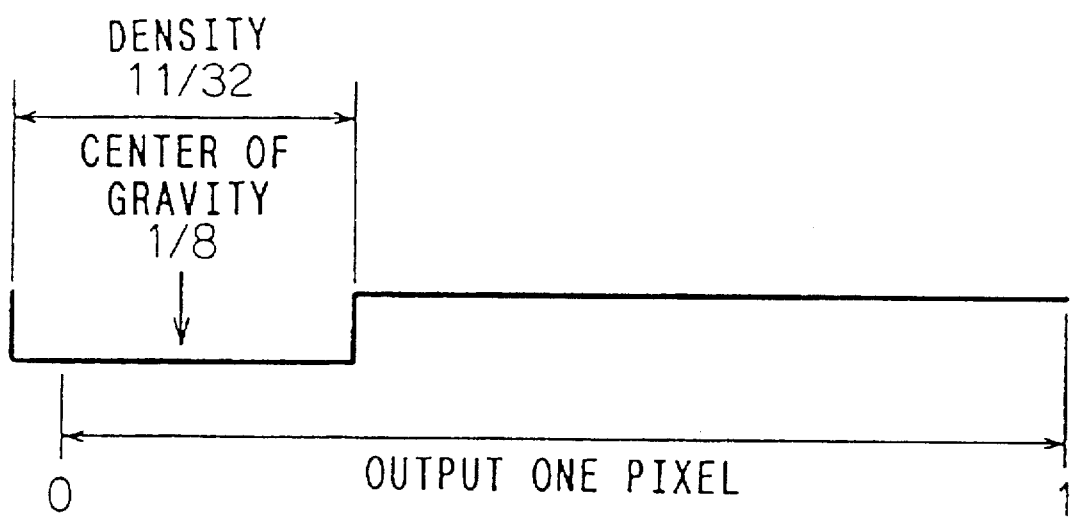
FIG. 68 is a diagram showing a correction example of the input/output characteristic when a video signal ON time period exceeds the range corresponding to output one pixel, in which 68(a) shows a case when the ON time period of the video signal exceeds the range of output one pixel, and 68(b) shows a case where the start point of the ON time period of the video signal is set to be coincident with the left end of the output one pixel to calculate a new center of gravity.
Figure 68B:
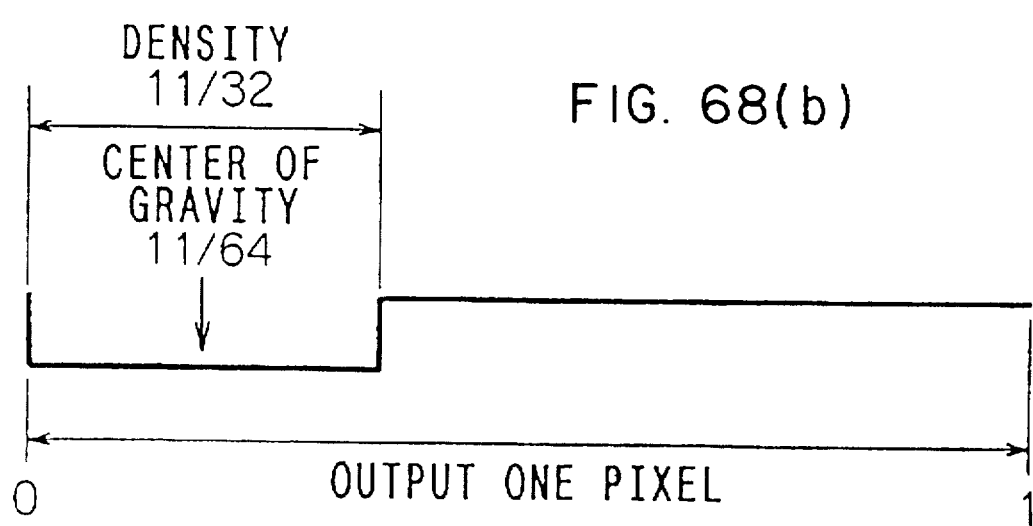

As shown in (a) of FIG. 68, when the ON period of the video signal 1000 exceeds the range of the output one pixel by replacing the density with the set values of the registers, the center of gravity is shifted so that the ON period of the video signal 1000 enters the range of the output one pixel as shown in (b) of FIG. 68. In this case, when the center of gravity before the shift is smaller than ½, the start point of the ON-period of the video signal 1000 is made coincident with the left end of the output one pixel. When the center of gravity before the shift is larger than ½, the end point of the video signal 1000 is made coincident with the right end of the output one pixel. On the basis of this result, a new center of gravity is calculated. Precedence is given to the pulse width as described above because the density of a pixel is more important than the center of gravity of the pixel from the viewpoint of the actual image quality.

[Variation point calculation means 18]

The density information and the center-of-gravity information which are corrected by the characteristic correction means 17 are supplied to the variation point calculation means 18. On the basis of the corrected density and center of gravity, the variation point calculation means 18 calculates the variation point from OFF to ON and the variation point from ON to OFF when a selected area is output as a video signal, that is, the variation point from a white pixel to a black pixel and the variation point from a black pixel to a white pixel. In the following description, the variation point from a white pixel to a black pixel is referred to as "black edge", and the variation point from a black pixel to a white pixel is referred to as "white edge". This edge information is a value which is corrected in accordance with the engine characteristic.

A calculation method of the variation point is as follows. The output one pixel is divided into equal 64 parts in the main scanning direction to be graduated with indexes of 0 to 64. The value of the density is set as the value of ON-period of the video signal 1000, and the value of the center of gravity is set as the center of the ON period of the video signal 1000. Here, there is no possibility that the black edge is located at the index 64, and thus the position of the black edge is represented with 6 bits from 0 to 63. Further, there is no possibility that the white edge is located at the index 0, and the index 64 is regarded as an index 0 of a next pixel, whereby the position of the white edge is represented with 6 bits of indexes of 0 t 63 and an index of 0. As a result, 12-bit edge data comprising the black edge position information of 6 bits and the white edge position information of 6 bits are generated.

FIG. 69 shows s edge data for each selected area in the case of (b) of FIG. 67, and 17 kinds of edge data are generated from the selected areas S1 to S20 and the selected areas T1 to T18.

[First Embodiment]

Figure 70:
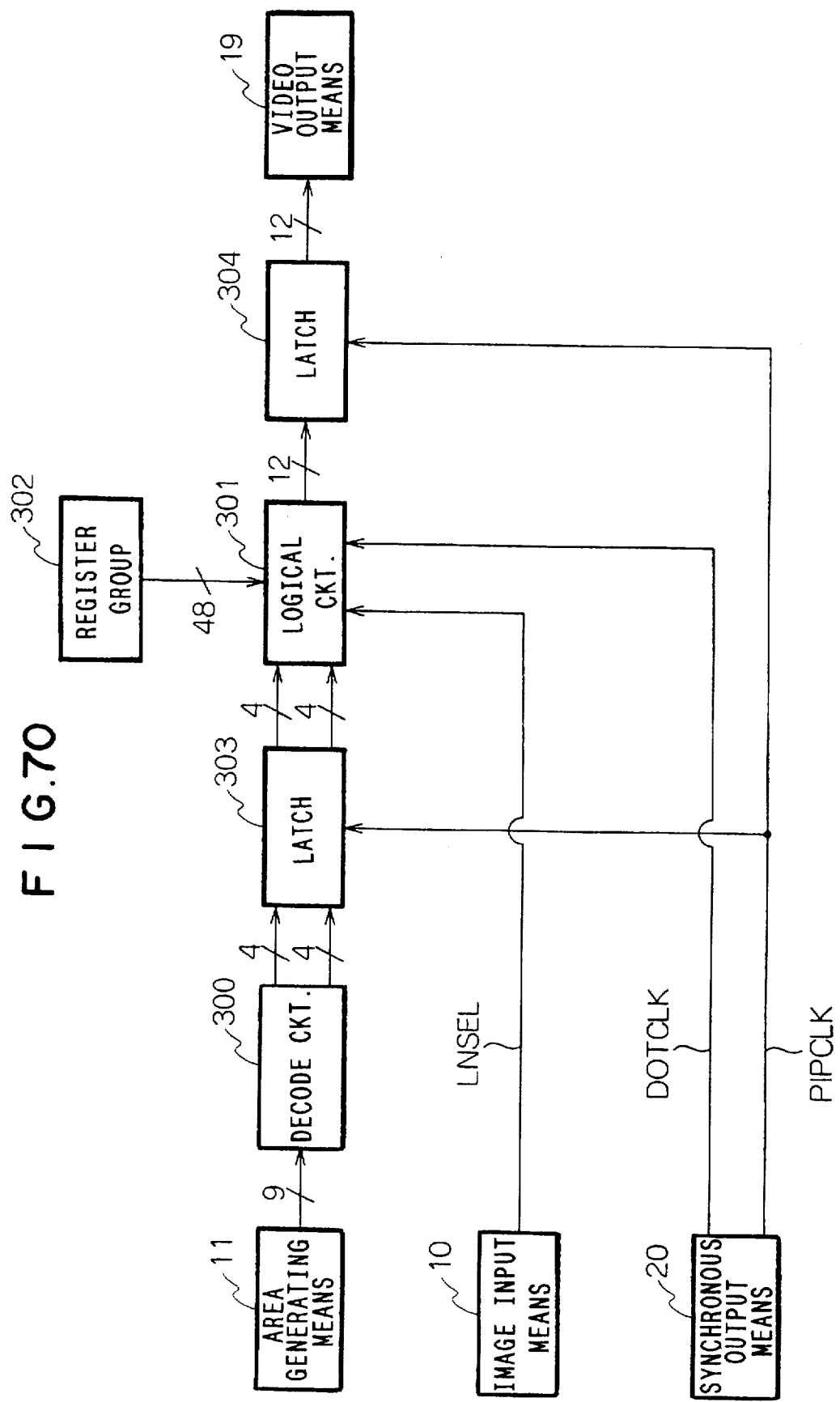
FIG. 70 is a block diagram showing a fist embodiment of a circuit from the feature extraction means to the variation point calculation means shown in FIG. 1.
Figure 71:
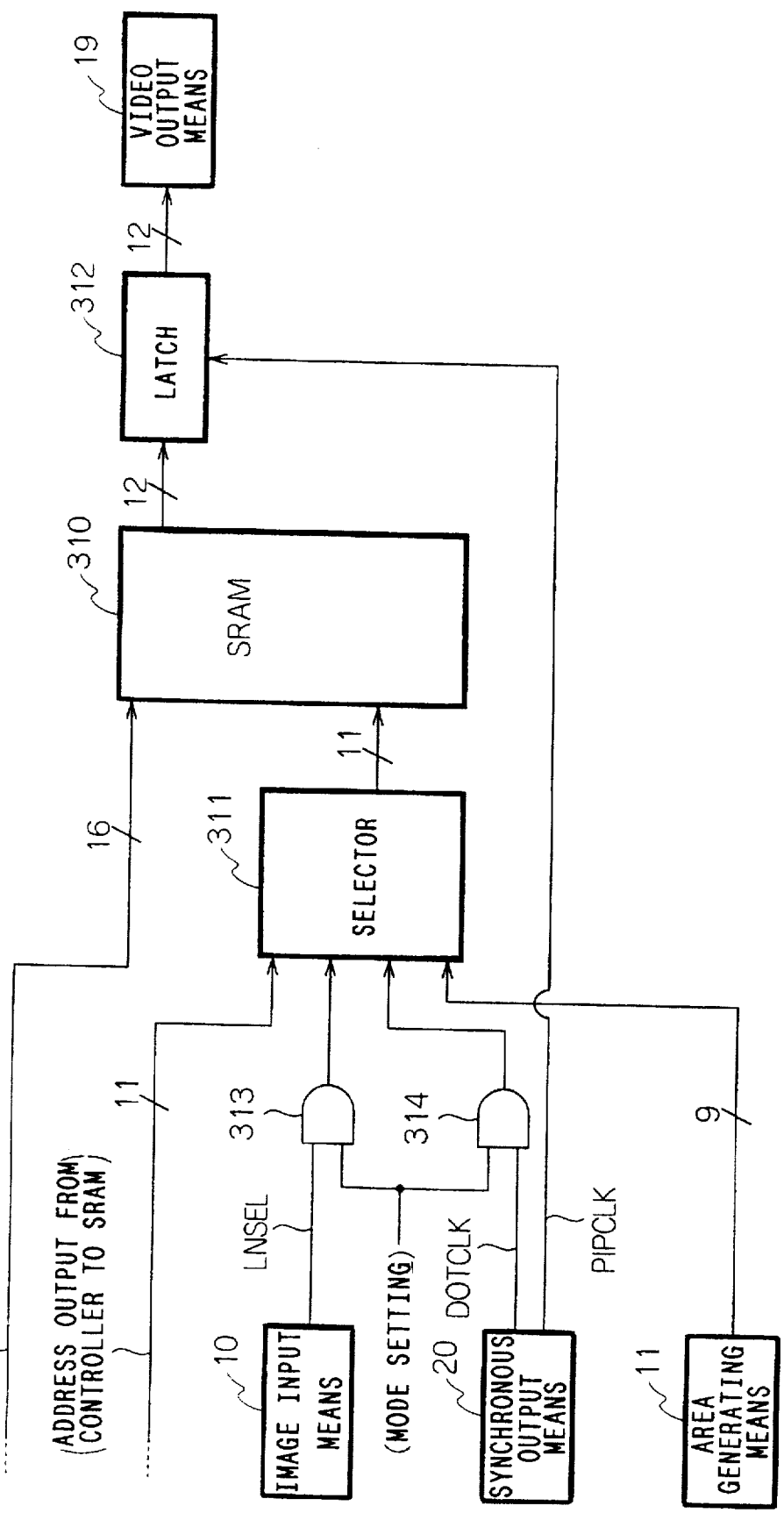
FIG. 71 is a block diagram showing a second embodiment of the circuit from the feature extraction means to the variation point calculation means shown in FIG. 1.

FIGS. 70 and 71 are block diagrams showing means for implementing a circuit from the feature extraction means 12 to the variation point calculation means 18. FIG. 70 is a circuit diagram showing a first embodiment. A decode circuit 300 generates 4-bit density information specifying one of nine kinds of density and 4-bit center-of-gravity information specifying one of thirteen kinds of center of gravity from the pixel data of a 9-bit reference area output from the area generating means 11.

As described on a series of means from the feature extraction means 12 to the center-of-gravity calculation means 16, in the case where the resolution ratio of the controller 3 and the engine 4 is equal to 1:1, if the pixel data of the reference area is determined, the density information and the center-of-gravity information are uniquely determined. Further, in the case where the resolution ratio of the controller 3 and the engine 4 is equal to 1:2, if the pixel data of the reference area and the values of the LNSEL signal and the DOTCLK signal are determined, the density information and the center-of-gravity information are uniquely determined. The density information and the center-of-gravity information are held by a latch 303 on the basis of the PIPCLK signal to avoid the transmission delay effect in a decode circuit 300, and then supplied to a logical circuit 301.

A register group 302 comprises eight 6-bit registers which are used for the setting of the input/output characteristic of the engine 4 by the controller 3. The logical circuit 301 generates 12-bit edge data on the basis of the density information and the center-of-gravity information and the set value of the register group 302. After the edge data are held in the latch 304 on the basis of the PIPCLK signal, the edge data are supplied to the video output means 19. The logical circuit 301 describes the algorithm described on the characteristic correction means 17 and the variation point calculation means 18 in a hardware describing language, and it is a circuit which is formed by logical synthesization.

[Second Embodiment]

FIG. 71 is a circuit diagram showing a second embodiment which implements the circuit shown in FIG. 70 by using a memory (SRAM). SRAM 310 has a capacity of 2K words×12 bits. When the resolution ratio of the controller 3 and the engine 2 is equal to 1:1, the most significant 2 bits of the address of the SRAM 310 is fixed to "0" by the mode setting and AND circuits 313 and 314, and the 9-bit pixel data of the reference area output from the area generating means 11 are allocated to the residual 9-bit address. When the print is performed at the resolution ratio of 1:2 (of the controller 3 and the engine 4), the LNSEL signal and the DOTCLK signal are allocated to the most significant 2 bits of the address of the SRAM 310, and the pixel data of the 9-bit reference area output from the area generating means 11 are allocated to the residual 9-bit address. Prior to the printing operation, the controller 3 writes the edge data into the SRAM 310. On the basis of the algorithm described on a series of means from the feature extraction means 12 to the variation point calculation means 18, the edge data are beforehand calculated in accordance with each address of the SRAM 310 after the input/output characteristic of the engine 4 is corrected.

The change of the address to the SRAM 310 is performed through a selector by the controller 3. During the print operation, the SRAM 310 outputs the pixel data of the reference area and 12-bit edge data based on the LNSEL signal and the DOTCLK signal. The edge data are held by the latch 312 on the basis of the PIPCLK signal, and then supplied to the video output means 19.

[Video output means 19]

Figure 72:
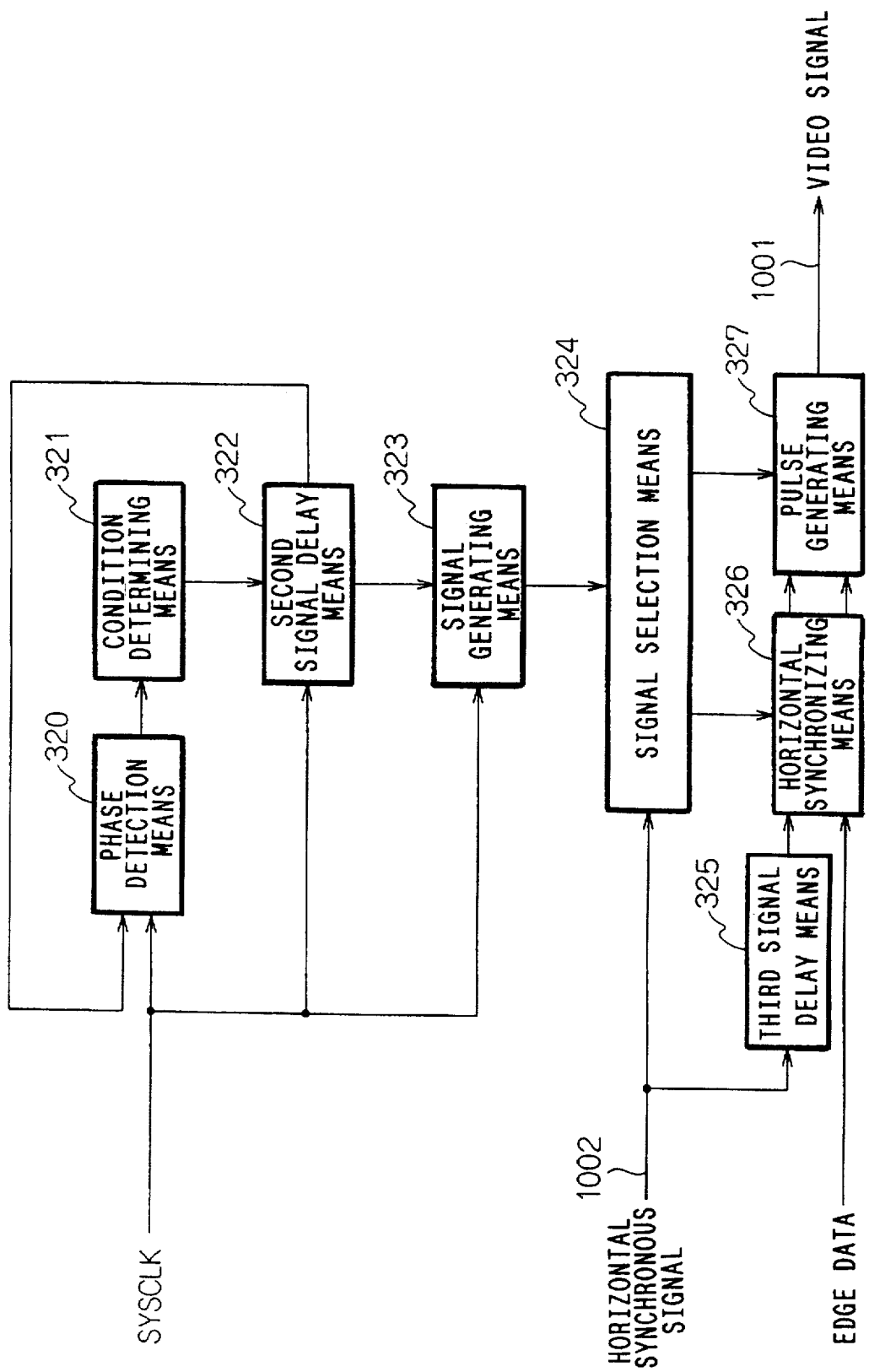
FIG. 72 is a functional block diagram showing the construction of video output means 19 shown in FIG. 1.

FIG. 72 is a functional block diagram showing the video output means 19. Phase detection means 320 performs a phase comparison between SYSCLK signal and a delay clock signal. The SYSCLK signal serves as a base signal which is output from the synchronous output means 20 and whose frequency is n times as high as the video frequency of the engine 4, and the delay clock signal serves as a reference signal which is output from second signal delay means 322 at the final stage, and detects an advance or delay in phase of the reference signal from the base signal.

Condition determining means 321 determines a delay condition in the second signal delay means 322 on the basis of the phase advance or delay result which is detected by the phase detection means 320. That is, when the phase advance is detected, the delay time in the second signal delay means 322 is increased. On the other hand, when the phase delay is detected, the delay time in the second signal delay means 322 is reduced.

Figure 73:
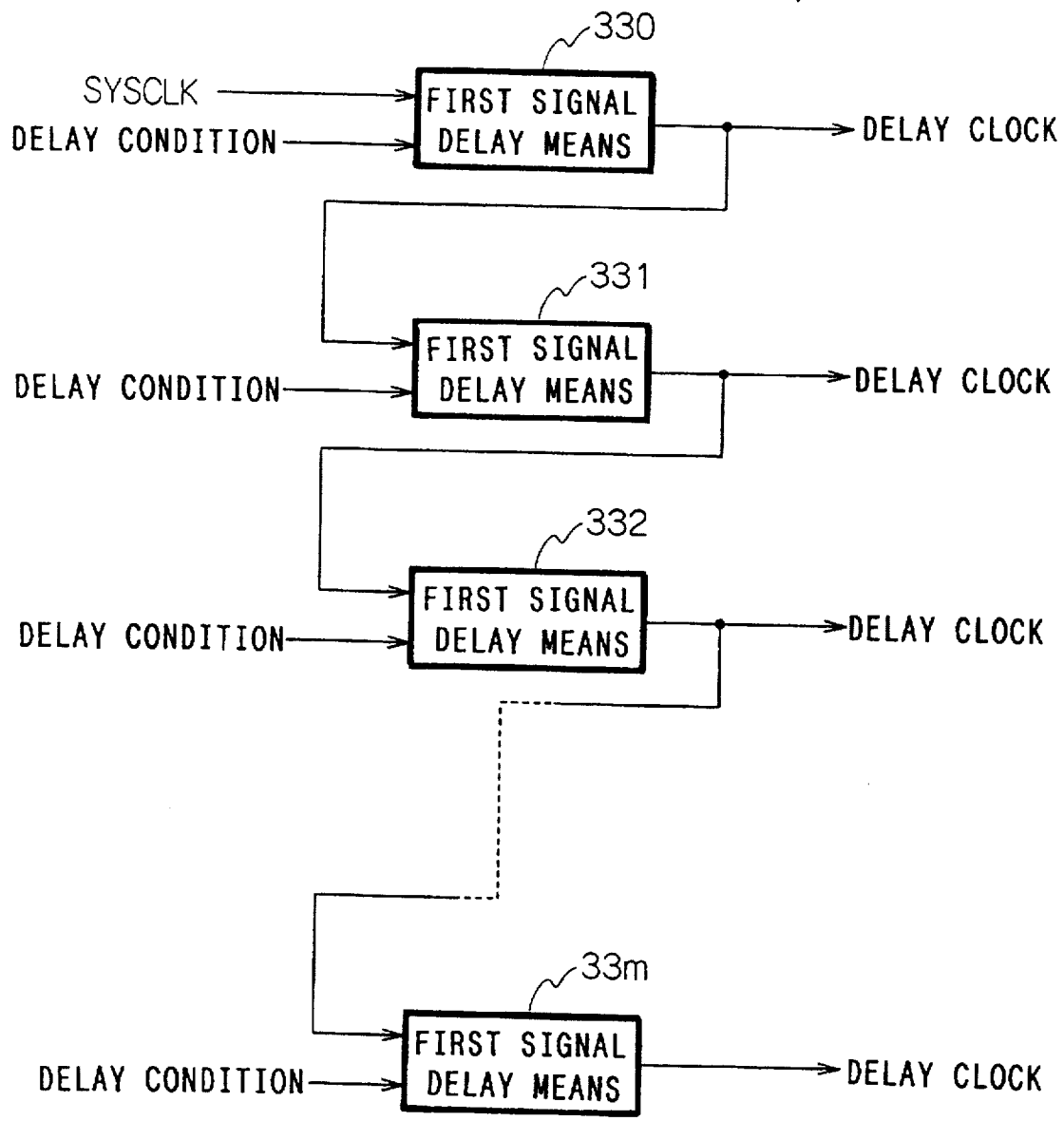
FIG. 73 is a functional block diagram showing the construction of second signal delay means 322 shown in FIG. 72.

As shown in FIG. 73, the second signal delay means 322 comprises first signal delay means 330 to 33m whose number is equal to m and which are connected to one another in series. The first signal delay means 330 to 33m delays input signals thereto on the basis of the delay condition which is instructed by the condition determining means 321, and outputs the delayed signals. Accordingly, the second signal delay means 322 outputs delay clock signals of m which are delayed at m stages. Further, the delay clock signal at the last stage is input as a reference signal to the phase detection means 320. Consequently, the phase detection means 320, the condition determining means 321 and the second signal delay means 322 constitute a phase lock loop.

On the basis of the SYSCLK signal and the m delay clock signals output from the second signal delay means 322, the signal generating means 323 generates delay clock signals of n×m which are obtained by delaying at n×m stages the clock signal whose frequency is divided into 1/n, that is, the clock signal having the same frequency as the video frequency of the engine 4. Representing the video frequency of the engine 4 by f, the delay interval between the delay clock signals of n×m output from the signal generating means 323 is equal to 1/(64×f).

From the delay clock signals of n×m output from the signal generating means 323, the signal selection means 324 selects the signal which is most synchronized with the horizontal synchronous signal 1002 output from the engine 4. Further, the signal selection means 324 rearranges the delay clock signals of n×m output from the signal generating means 323 so that the signal which is delayed from the signal of the phase 0 by s/(n×m×f) is coincident with the signal of the phase s, and outputs the delay clock signals of the phase 0 to the phase s.

Third signal delay means 325 delays the horizontal synchronous signal 1002 by the time period from the time when the horizontal synchronous signal 1002 is input in the signal selection means 324 until the output of the delay clock signals of the phase 0 to the phase s is confirmed. The horizontal synchronous means 326 samples the horizontal synchronous signal delayed by the third signal delay means 325 on the basis of the delay clock signal of the phase 0 which is output from the signal selection means 324, thereby perform horizontal synchronization, and synchronizes the horizontal synchronous signal with the edge data output from the variation point calculation means 18 and then supplies the synchronized signal to pulse generating means 327.

On the basis of the delay clock signals of the phase 0 to phase s which are output from the signal selection means 32, the pulse generating means 327 outputs to the engine 4 the signal having the pulse width which is specified by the edge data supplied from the variation point calculating means 18.

Next, the circuit construction of the video output means 19 will be described on the condition: n=4, m=4 and f=10 MHz. In this case, n×m=16, that is, the output one pixel is divided into 16 parts. Therefore, the edge data output from the variation point calculation means 18 may be 8-bit data comprising 4-bit black edge position information and 4-bit white edge position information.

[Phase detection means 320]

Figure 74:
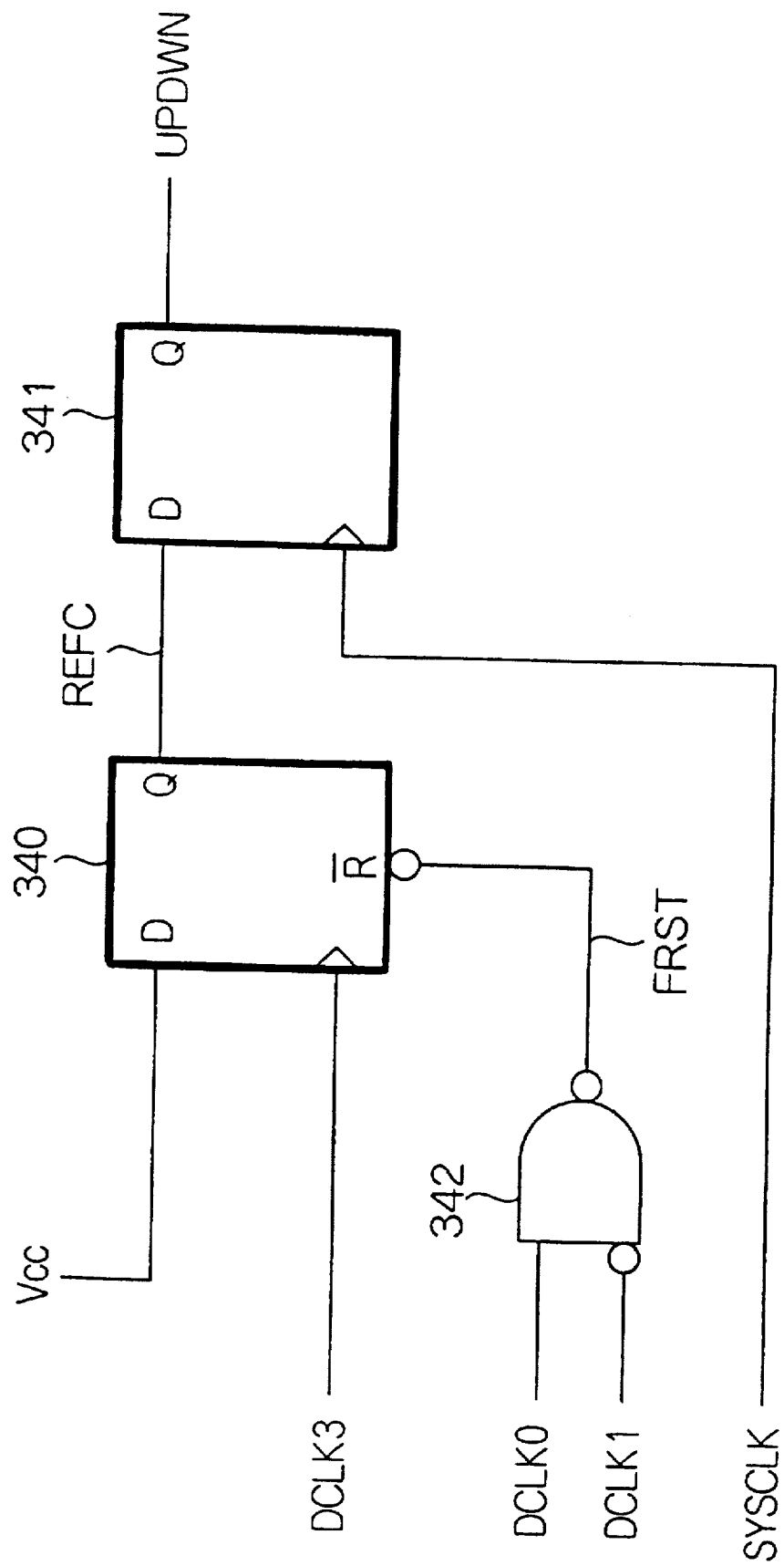
FIG. 74 is a circuit diagram showing the construction of phase detection means 320 shown in FIG. 72.

FIG. 74 is a circuit diagram showing the phase detection means 320. DCLK0 signal, DCLK1 signal, DCLK 2 signal and DCLK 3 signal are four delay clock signals which are output from the second signal delay means 322. As described later, the DCLK0 signal corresponds to a signal obtained by delaying the SYSCLK signal, the DCLK1 signal corresponds to a signal obtained by delaying the DCLK0 signal, the DCLK2 signal corresponds to a signal obtained by delaying the DCLK1 signal, and the DCLK 3 signal corresponds to a signal obtained by delaying the DCLK2 signal.

The phase detection means 320 compares the phase of the SYSCLK signal serving as a base signal and the phase of the DCLK3 signal serving as a reference signal, and outputs the detection result representing phase advance or phase delay as UPDWN signal to the conditioner determining means 321.

Figure 75:
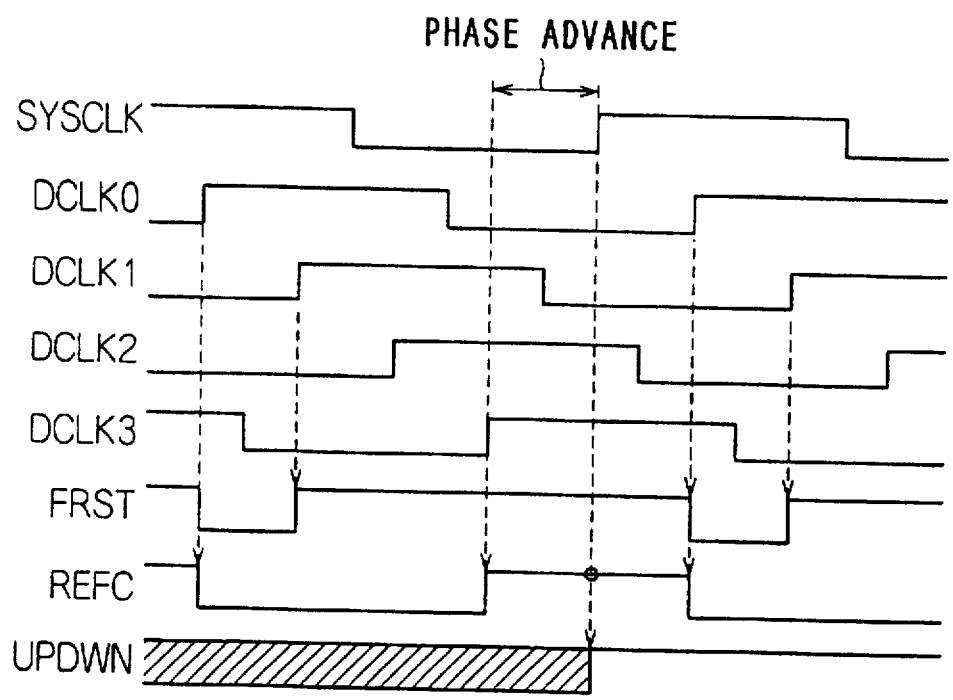
FIG. 75 is a signal waveform diagram when phase advance in each part of the circuit diagram of the phase detection means 320 shown in FIG. 74 is detected.

FIG. 75 is a waveform diagram showing the operation of each part of the phase detection means 320 when the phase advance is detected. First, a flip flop 340 is reset by a NAND circuit 342 for the time period from the rise-up of the DCLK0 signal until the rise-up of the DCLK1 signal. REFC signal is set to "0" in response to the output of the flip flop 340, and set to "1" when the rise-up edge of the DCLK3 signal is input.

The rise-up edge of the SYSCLK is input with a delay time from the rise-up edge of the DCLK3 signal. Therefore, in the flip flop 341, "1" of the REFC signal is sampled by the rise-up edge of the SYSCLK signal, and the UPDWN signal of the output of the flip flop 341 is set to "1". The output level of the UPDWN signal is held until the timing for the next phase comparison, that is, until the rise-up edge of the SYSCLK signal is input again.

Figure 76:
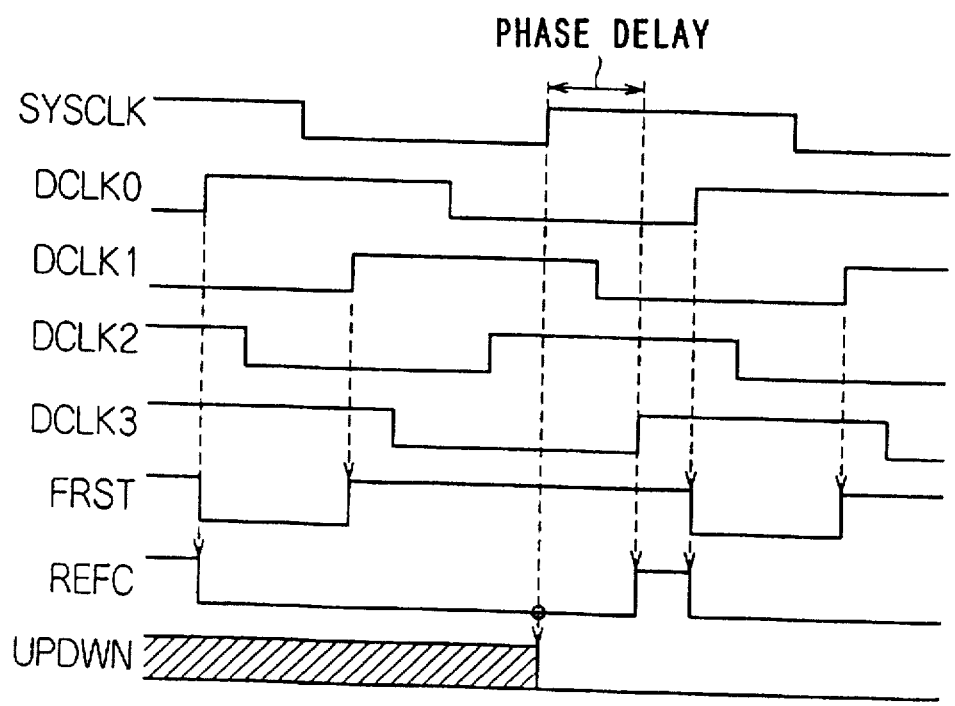
FIG. 76 is a signal waveform diagram when phase delay in each part of the circuit diagram of the phase detection means 320 shown in FIG. 74 is detected.

FIG. 76 is a waveform diagram showing the operation of each part of the phase detection means 320 when the phase delay is detected. First, the flip flop 340 is reset by the NAND circuit 342 for the time period from the rise-up of the DCLK0 signal until the rise-up of the DCLK1 signal, and the REFC signal which is the output of the flip flop 340 is set to "0". Upon input of the rise-up edge of the DCLK3 signal, the REFC signal is set to "1".

However, the rise-up edge of the SYSCLK signal is input prior to the input of the rise-up edge of the DCLK3 signal. Therefore, in the flip flop 341, "0" of the REFC signal is sampled by the rise-up edge of the SYSCLK signal, and the UPDWN signal which is the output of the flip flop 341 is set to "0". The output level of the UPDWN signal is held until the timing for the next phase comparison, that is, until the rise-up edge of the SYSCLK signal is input again.

[Condition determining means 321]

FIG. 77 is a circuit diagram showing the condition determining means 321. A counter circuit 360 comprises an up down counter having a 64-bit output. It performs a count operation at the rise-up edge of the SYSCLK signal, and it counts up when the UPDWN signal is set to "1" and counts down when the UPDWN signal is set to "0". The 64-bit output is classified into four 16-bit outputs of C[63:48] signal, C[47:32] signal, C[31:16] signal and C[15:0] signal.

The count value is varied as shown in FIG. 78. In a count-up operation from the state that all bits are set to "0", the least significant bit of the C[15:0] signal is set to "1" by the first count, and the least significant bit of the C[31:16] signal is set to "1" by the next count. When all the least significant bits of the C[15:0] signal to the C[63:48] signal are set to "1" as described above, the second least significant bit of the C[15:0] is set to "1" by the next count. Subsequently, the same count-up operation is repeated until all the bits are set to "1".

In a count-down operation from the state that all the bits are set to "1", the most significant bit of the C[63:48] signal is set to "0" by the first count, and the most significant bit of the C[47:32] signal is set to "0" by the next count. When all the most significant bits from the C[63:48] signal until the C[15:0] signal are set to "0" in the above manner, the second most significant bit of the C[63:48] signal is et to "0" by the next count operation. Subsequently, the same count-down operation is repeated until all the bits are set to "0".

As shown in FIG. 77, the C[15:0] signal, the C[31:16] which is held in the latch 361 on the basis of the DCLK0 signal, the C[47:32] signal which is held in the latch 362 on the basis of the DCLK1 signal, and C[63:48] signal which is held in the latch 363 on the basis of the DCLK2 signal are directly output as DA[15:0] signal, DB[15:0] signal, DC[15:0] signal and DD[15:0] signal to the second signal delay means 322, respectively.

[Second signal delay means 322]

Figure 79:
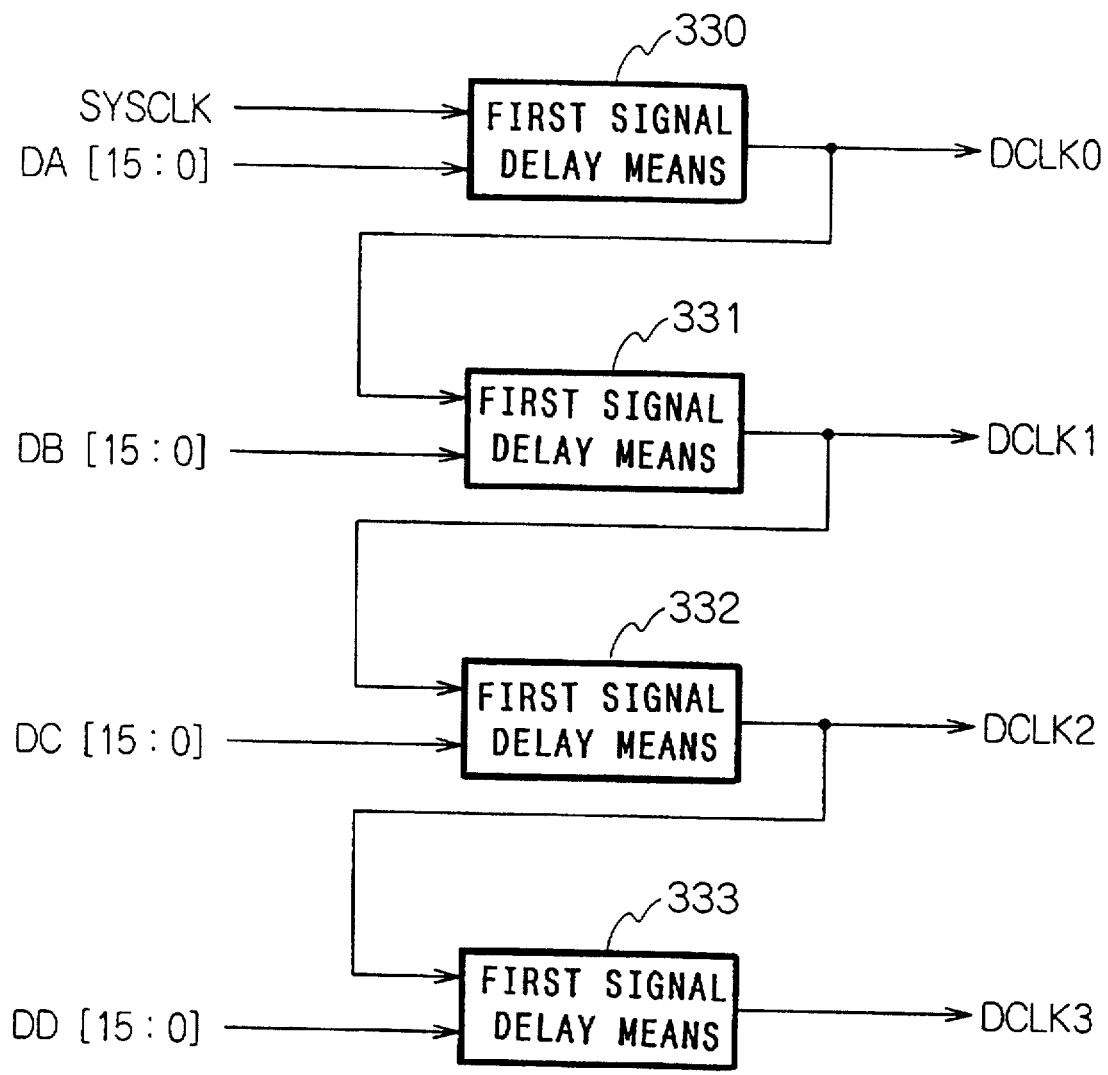
FIG. 79 is a circuit diagram showing the construction of the second signal delay means 322 shown in FIG. 72.

FIG. 79 is a circuit diagram showing the second signal delay means 322. The second signal delay means 322 comprises four first signal delay means 330 to 333 which are connected to one another in series. The first signal delay means 330 delays the SYSCLK signal in accordance with the value of the DA[15:0] signal and outputs it as DCLK0 signal. The first signal delay means 331 delays the DCLK0 signal in accordance with the value of the DB[15:0] signal and outputs it as DCLK1 signal. The first signal delay means 332 delays the DCLK1 signal in accordance with the DC[15:0] signal, and outputs it as DCLK2 signal. The first signal delay means 333 delays the DCLK2 signal in accordance with the DD[15:0] signal, and outputs it as DCLK3 signal. That is, the second signal delay means 32 outputs four delay clock signals of DCLK0 to DCLK3 which are obtained by delaying the SYSCL signal at four stages.

[First signal delay means]

Figure 80:
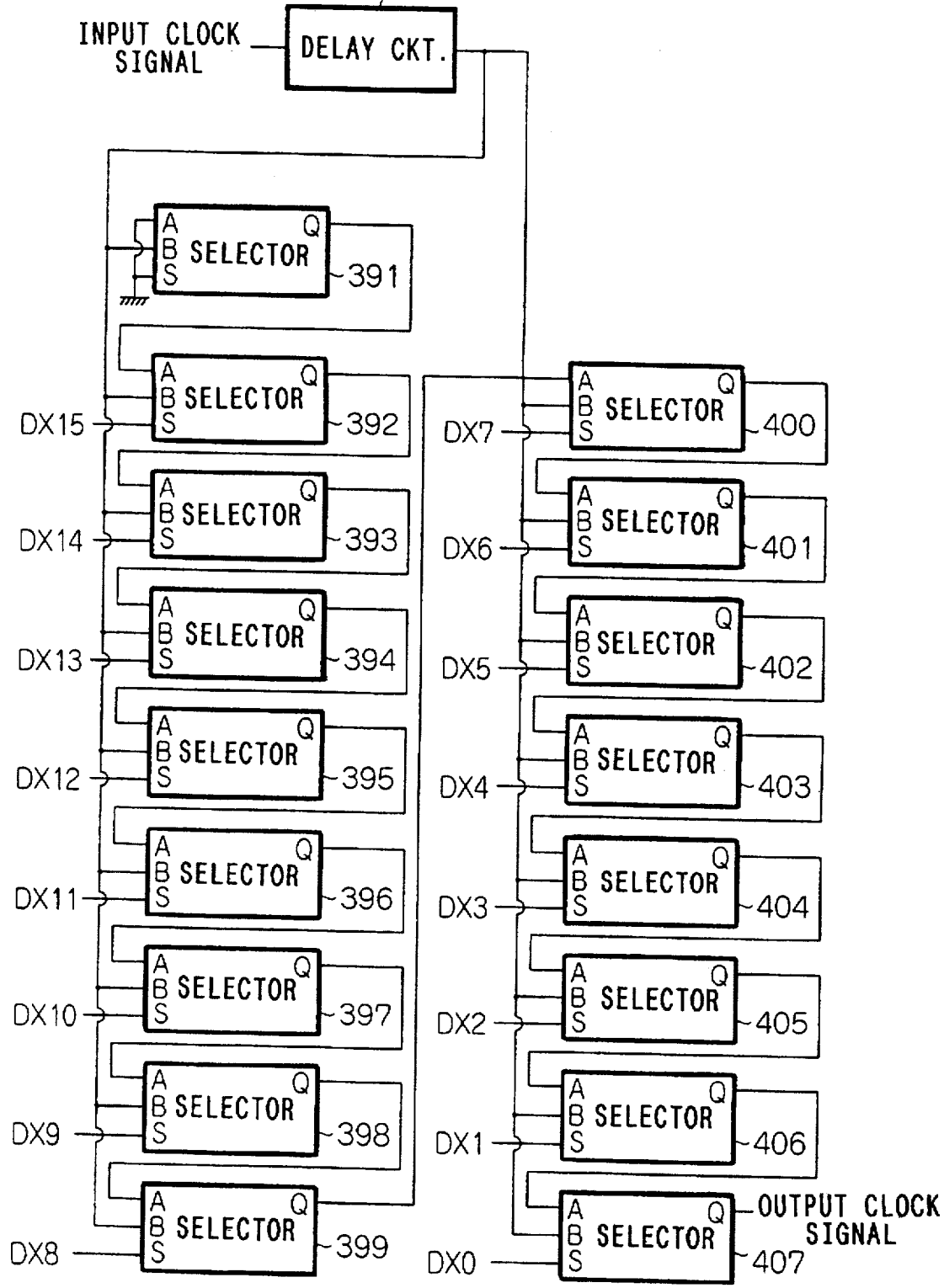
FIG. 80 is a circuit diagram showing the construction of first signal delay means 330 to 333 shown in FIG. 79.

The first signal delay means 330 to 333 are designed in the same circuit design, and the circuit diagram thereof is shown in FIG. 80. In FIG. 80, an input clock signal, DX [15:0] signal and an output clock signal correspond to the SYSCLK signal, the DA[15:0] signal and the DCLK0 signal in the case of the first signal delay means 330, correspond to the DCLK0 signal, the DB[15:0] signal and the DCLK1 signal in the case of the first signal delay means 331, correspond to DCLK1 signal, the DC[15:0] signal and the DCLK2 signal in the case of the first signal delay means 332, and correspond to the DCLK2 signal, the DD[15:0] signal and the DCLK3 signal in the case of the first signal delay means 333. A delay circuit 390 gives an initial delay to the input clock signal.

Selectors 391 to 407 select an input A as an output Q for S="1", and select an input B as an output Q for S="0". First, when all the DX[15:0] are set to "0", the input clock signal suffers propagation delay due to the delay circuit 390 and the selector 407 to be an output clock signal. When the phase delay is detected in the phase detection means 320 and the value of the DX[15:0] signal is counted up in the condition determining means 321, the input clock signal suffers propagation delay due to the delay circuit 390, the selector 406 and the selector 407 to be an output clock signal. Subsequently, the delay of the output clock signal to the input clock signal is increased by the propagation delay corresponding to the number of the selectors.

On the other hand, when the phase advance is detected in the phase detection means 320 and the value of the DX[15:0] signal is counted down in the condition determining means 321, the delay of the output clock signal to the input clock signal is reduced by the propagation delay corresponding to the number of the selectors. The propagation delay of each of the delay circuit 390 and the selectors 391 to 407 is varied due to not only the dispersion of an element itself, but also variation of temperature and voltage. Here, in consideration of the dispersion of the element itself and the variation of the temperature and voltage, it is assumed that the minimum value and the maximum value of the delay circuit 390, containing the wire delay, are equal to 1.0 ns and 3.0 ns respectively, and the minimum value and the maximum value of the selectors 391 to 407, containing the wire delay, are equal to 1.0 ns and 3.0 ns respectively. In this case, the circuit shown in FIG. 80 have a characteristic shown in FIG. 81.

Figure 81:
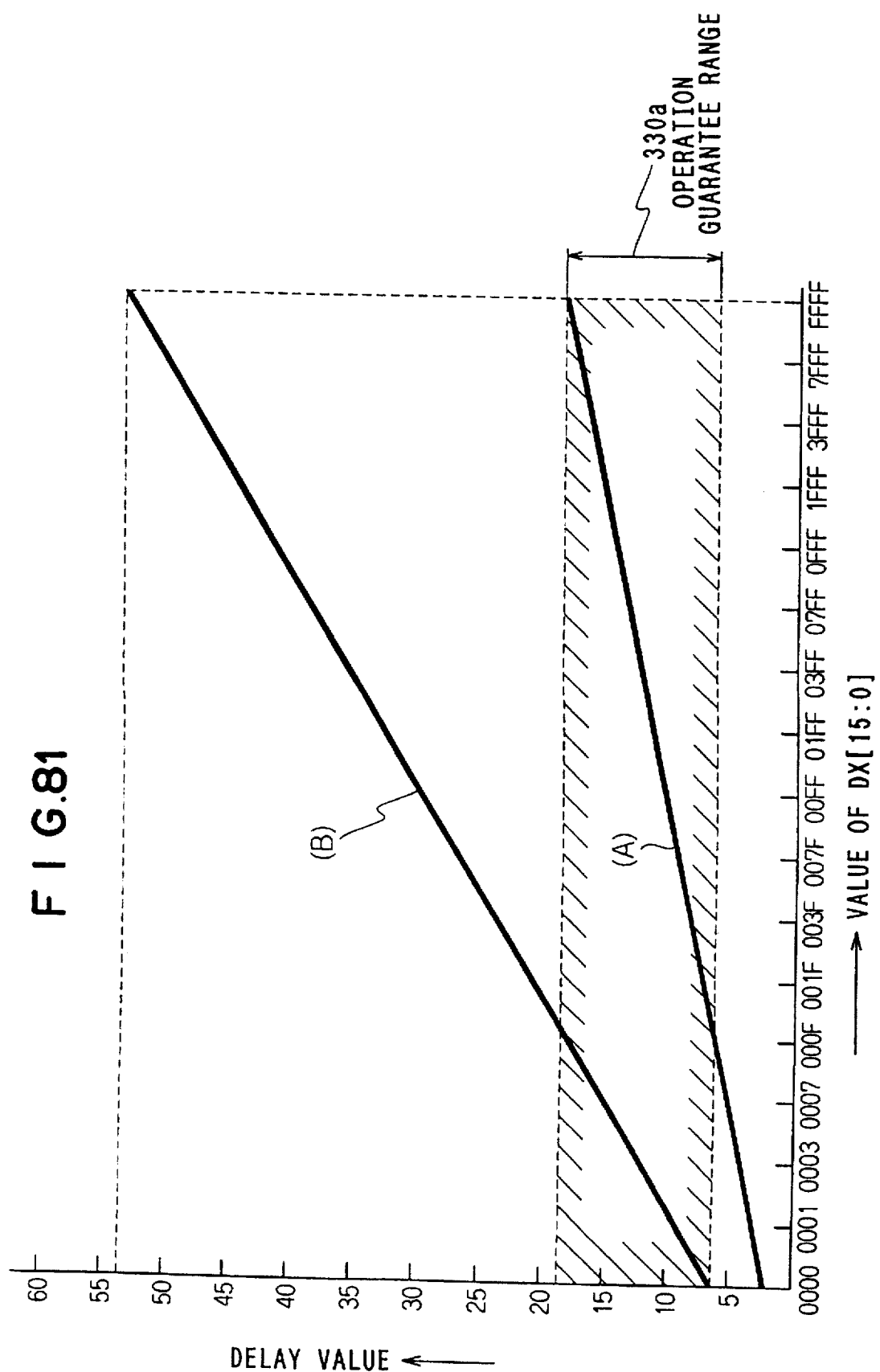
FIG. 81 is a diagram showing the delay characteristic of the first signal delay means 330 to 333 shown in FIG. 80.

In FIG. 81, the abscissa represents the value of the DX[15:0] signal, and the ordinate represents a delay value of the output clock signal to the input clock signal. A line (A) shows the variation of the delay value when all of the delay circuit 390 and the selectors 391 to 407 have the minimum propagation delay, and a line (B) shows the variation of the delay value when all of the delay circuit 390 and the selectors 391 to 407 have the maximum propagation delay. In FIG. 81, an operation guarantee range is defined as a delay-value range which can be located by both the lines (A) and (B), and the operation guarantee range is from 6.0 ns to 18.0 ns. As described above, the DCLK3 signal output from the first signal delay means 333 is input to the phase detection means 320 so that the phase thereof is compared with the phase of the SYSCLK signal.

As a result, the phase detection means 320, the condition determining means 321 and the signal delay means 322 constitute a phase lock loop, and when the phase lock loop is stabilized, the relationship between the SYSCLK signal and the DCLK0 signal to the DCLK3 signal as shown in FIG. 82 is established. Further, the clock period of the SYSCLK signal for which the phase matching can be performed is in the range from 24.0 ns to 72.0 ns which is four times as broad as the operation guarantee range shown in FIG. 81, and the frequency of the SYSCLK signal is in the range from 13.9 MHz to 41.7 MHz. The jitter when the phase lock loop is stable, that is, the maximum value of the phase shift of the SYSCLK signal and the DCLK3 signal is substantially equal to 3.0 ns which is the maximum propagation delay value of the selectors 391 to 407.

The initial delay value in the first signal delay means 330 to 333, that is, the delay value of the delay circuit 390 is set to a small value to increase the stage number of the selectors 391 to 407, and the number of count bits of the counter circuit 360 of the condition determining means 321 is increased in accordance with the increase of the stage number of the selectors 391 to 407, whereby the frequency band of the phase-matchable SYSCLK signal can be broadened. Conversely, in the first signal delay means 330 to 333, the stage number of the selectors 391 to 407 is reduced, and an appropriate delay circuit is inserted between the selectors, whereby the number of the count bits of the counter circuit 360 can be reduced although the jitter becomes larger, and thus the circuit scale can be reduced.

[Signal generating means 323]

FIG. 83 is a circuit diagram showing the signal generating means 323. A frequency divider 420 quarters the frequency of the SYSCLK signal to generate a clock signal WCLK0 whose frequency is equal to the video frequency of the engine 4. The WCLK0 signal is sampled on the basis of the SYSCLK signal in a flip flop 421 to generate WCLK1 signal which is delayed from the WCLK0 signal by one period of the SYSCLK signal. The WCLK1 signal is sampled on the basis of the SYSCLK signal in a flip flop 422 to generate WCLK2 signal which is delayed from the WCLK0 signal by two periods of the SYSCLK signal.

Figure 84:
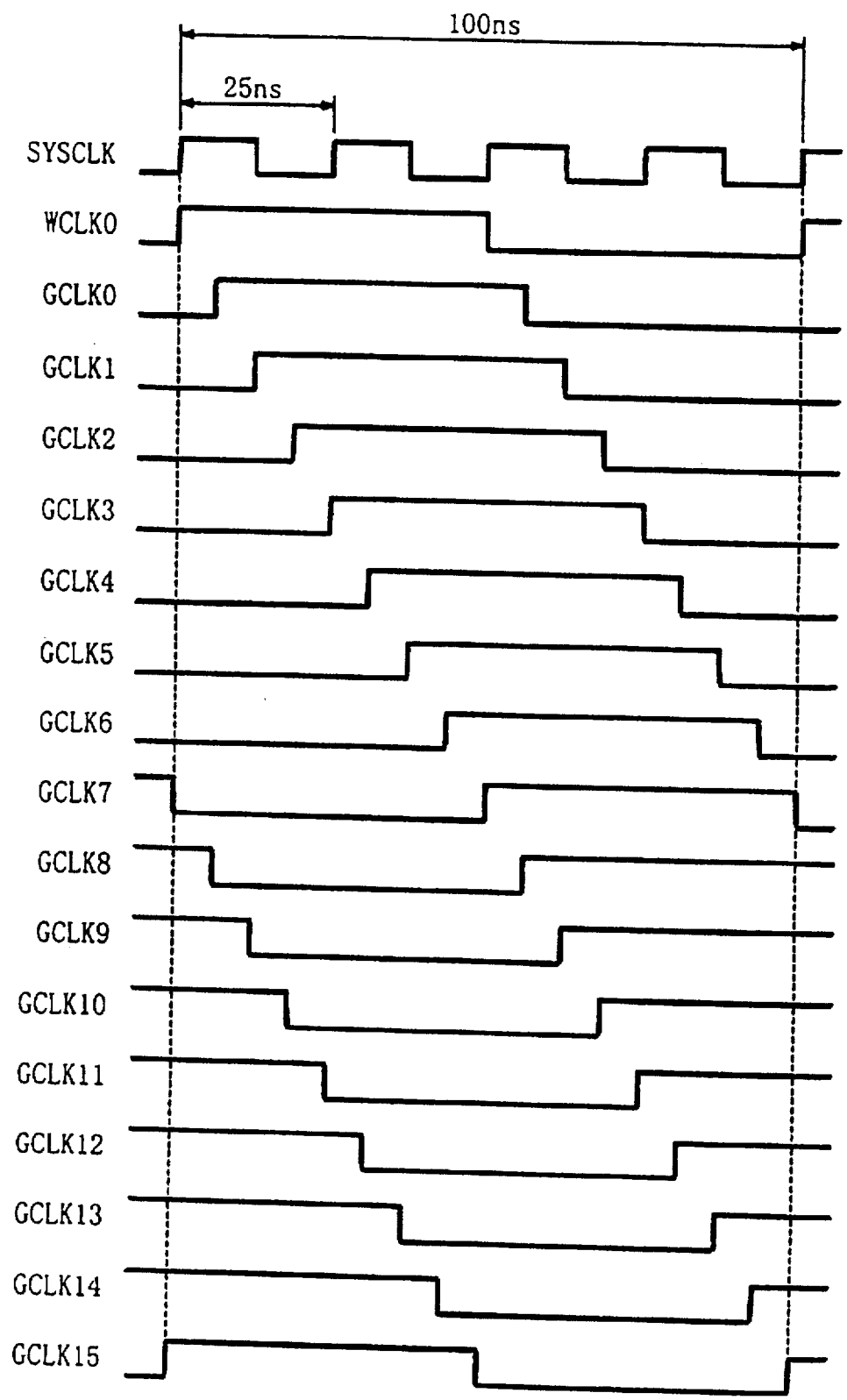
FIG. 84 is a signal waveform diagram showing the output of each part of the signal generating means 323 shown in FIG. 83.

The WCLK2 signal is sampled on the basis of the SYSCLK signal in a flip flop 423 to generate WCLK3 signal which is delayed from the WCLK0 signal by three periods of the SYSCLK signal. As shown in FIG. 83, the WCLK0 signal to the WCLK3 signal are successively sampled on the basis of the DCLK0 signal to the DCLK3 signal in flip flops 424 to 439. Consequently, there are generated GCLK[15:0] signals obtained by successively delaying the WCLK0 signal at 16 stages within one period thereof as shown in FIG. 84. The delay between the GCLk[15:0] signals is kept to be substantially equal to (100/16) ns by the phase lock loop.

[Signal selection means 324]

Figure 85:
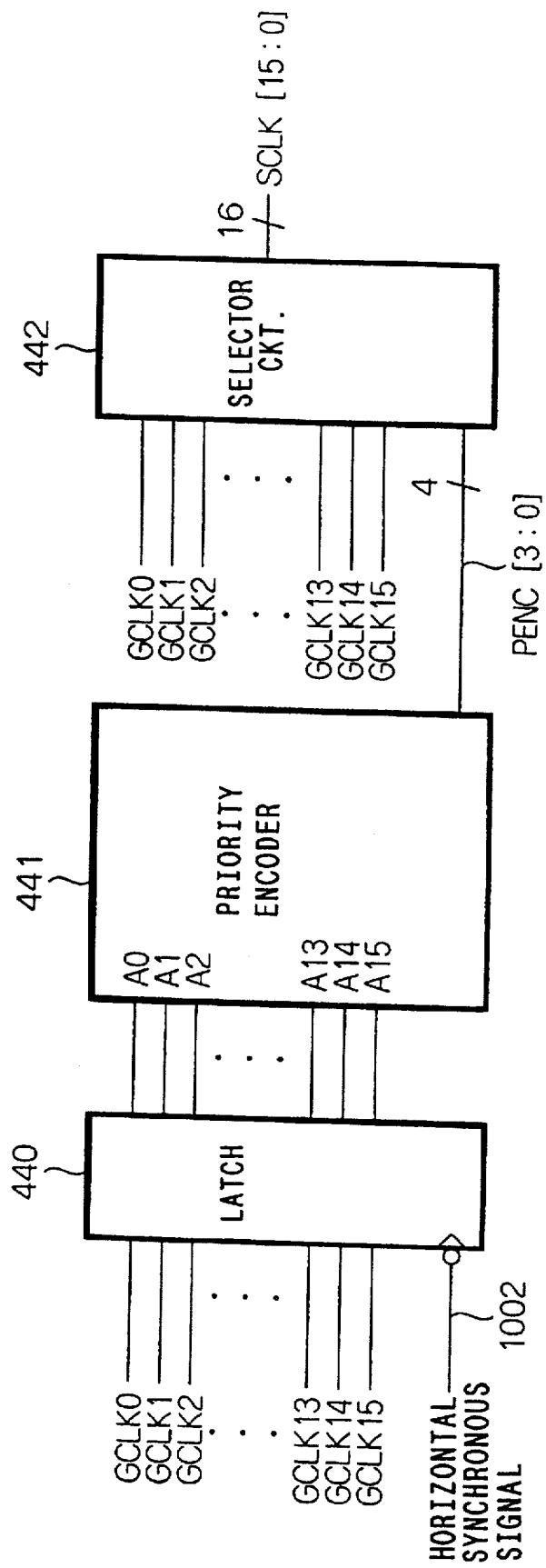
FIG. 85 is a circuit diagram showing the construction of the signal selection means 324 shown in FIG. 72.

FIG. 85 is a circuit diagram showing the signal selection means 324. The GCLK[15:0] signals are sampled on the basis of the horizontal synchronous signal 1002 output from the engine 4 in a latch 440, and the sampling result is input to a priority encoder 441. The priority encoder 441 detects the position of the top bit which is equal to "0" in the arrangement of input A0 to input A15, and outputs the detection result as 4-bit OENC[3:0] signal. That is, it detects the top bit whose falling edge appears in the GCLK[15:0] signals after the falling edge of the horizontal synchronous signal 1002 is input.

FIG. 86 shows the corresponding table between the input data A0 to A15 and the detection result PEN[3:0] in the priority encoder 441. The GCLK [15:0] signals are rearranged on the basis of the PENC[3:0] signal in the selector circuit 442, and output as SCLK[15:0] signals.

[Selector circuit 442]

Figure 87:
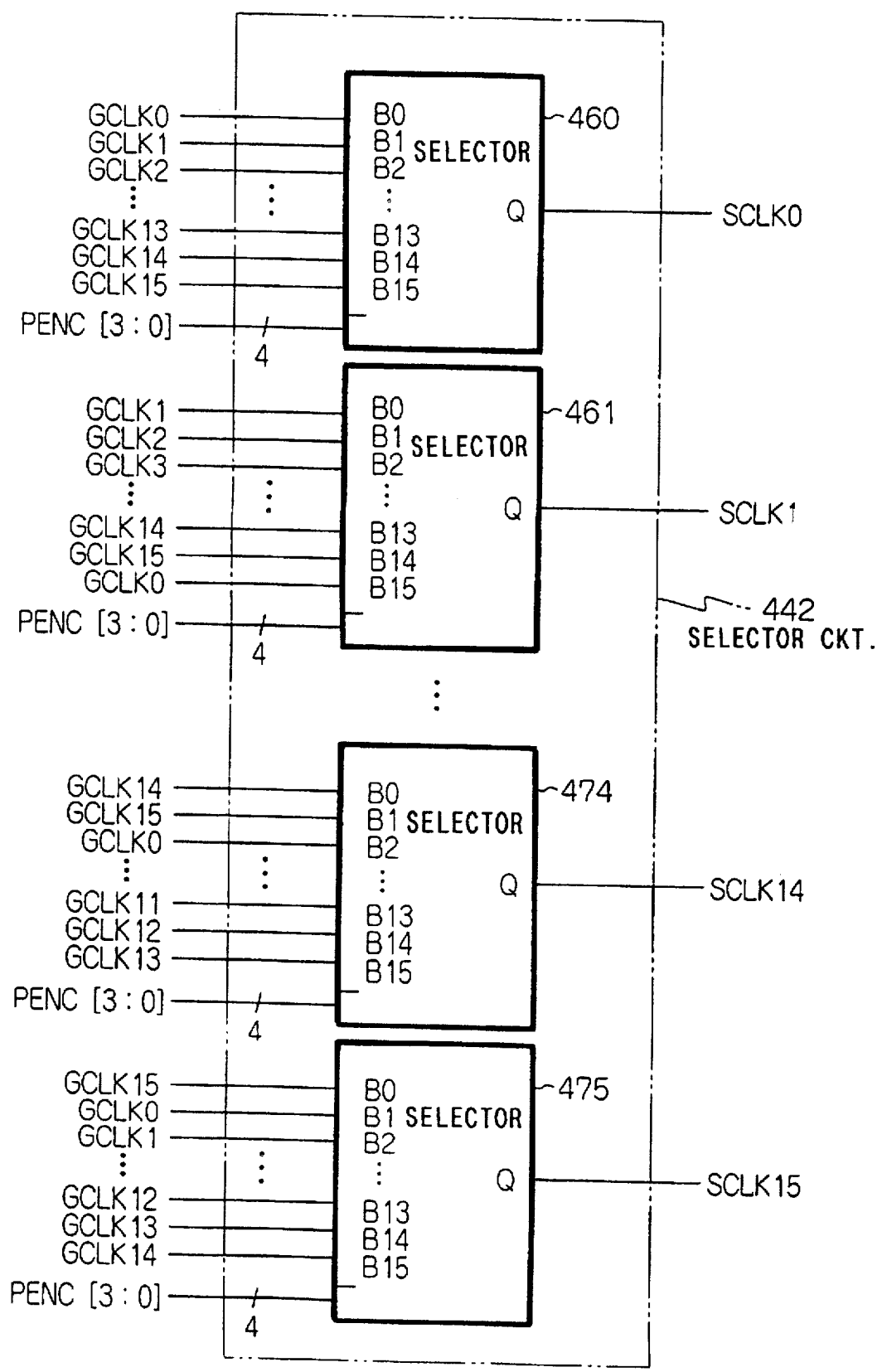
FIG. 87 is a circuit diagram showing the construction of a selector circuit 442 shown in FIG. 85.
Figure 88:
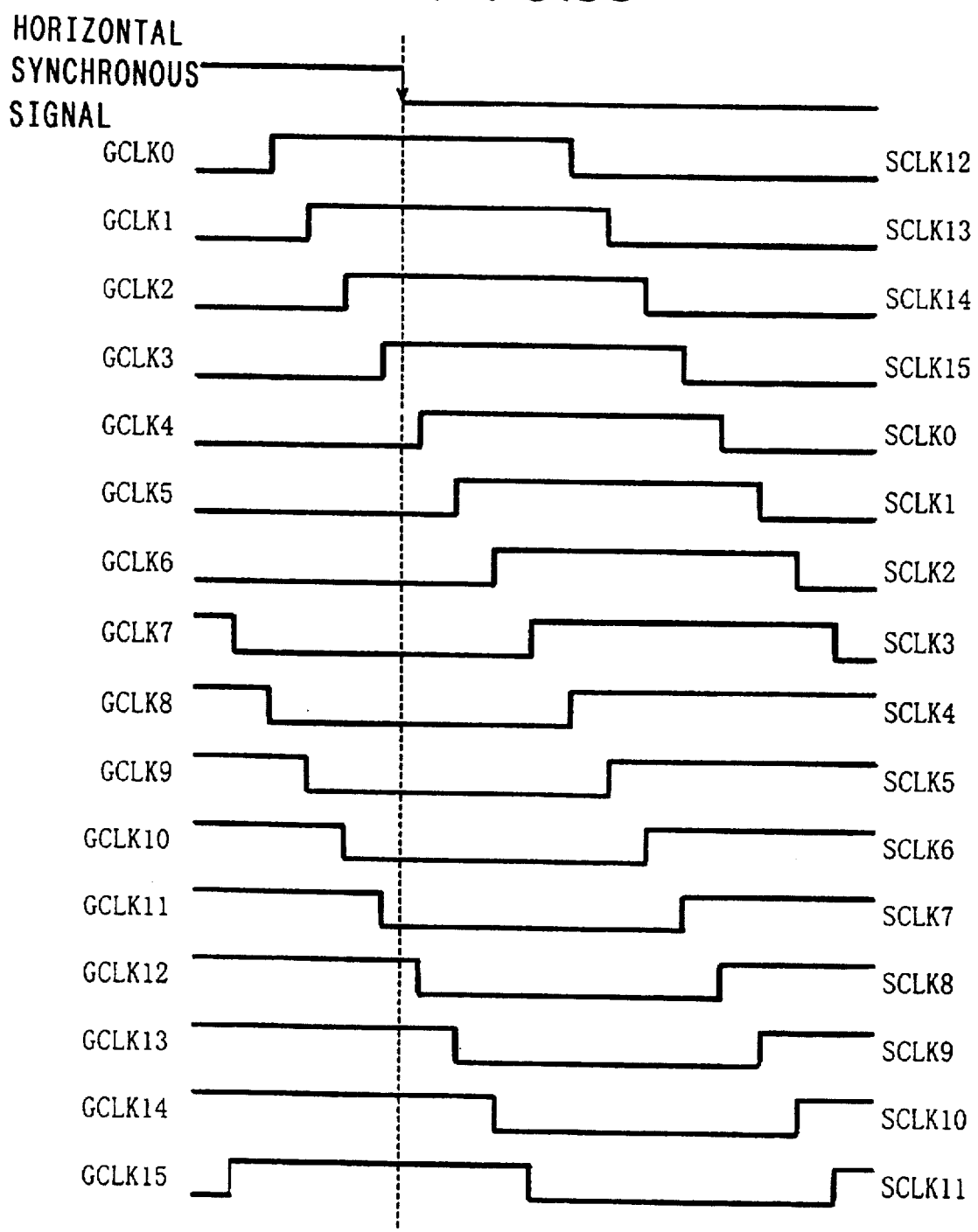
FIG. 88 is a signal waveform diagram showing the output of each part of the signal selection means 324 shown in FIG. 85.

FIG. 87 is a detailed circuit diagram showing the selector circuit 442. Each of selectors 460 to 475 selects an input BX as an output Q when the value of the PENC[3:0] signal is equal to "X". The GCLK[15:0] signals are input to the selectors 460 to 475 one by one, so that the SCLK[15:0] signals are generated on the basis of the falling edge of the horizontal synchronous signal 1002 as shown in FIG. 88. Subsequently, the SCLK0 signal is referred to as "phase 0 signal", and the SCLKs signal is referred to as "phase s signal".

[Third signal delay means 325]

Figure 89:
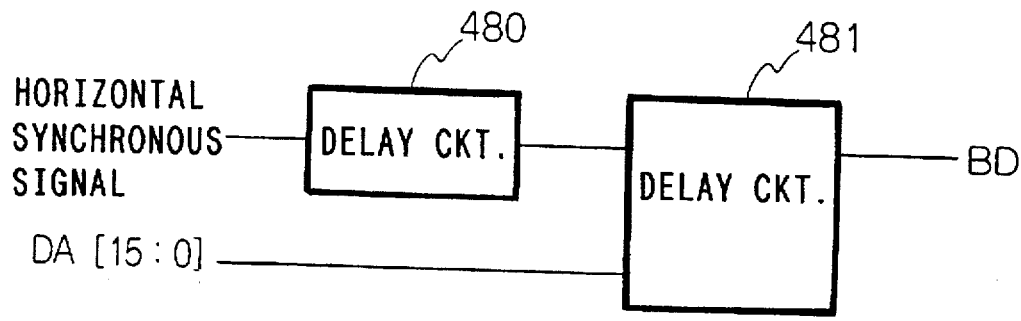
FIG. 89 is a circuit diagram showing the construction of third signal delay means 325 shown in FIG. 72.
Figure 90:
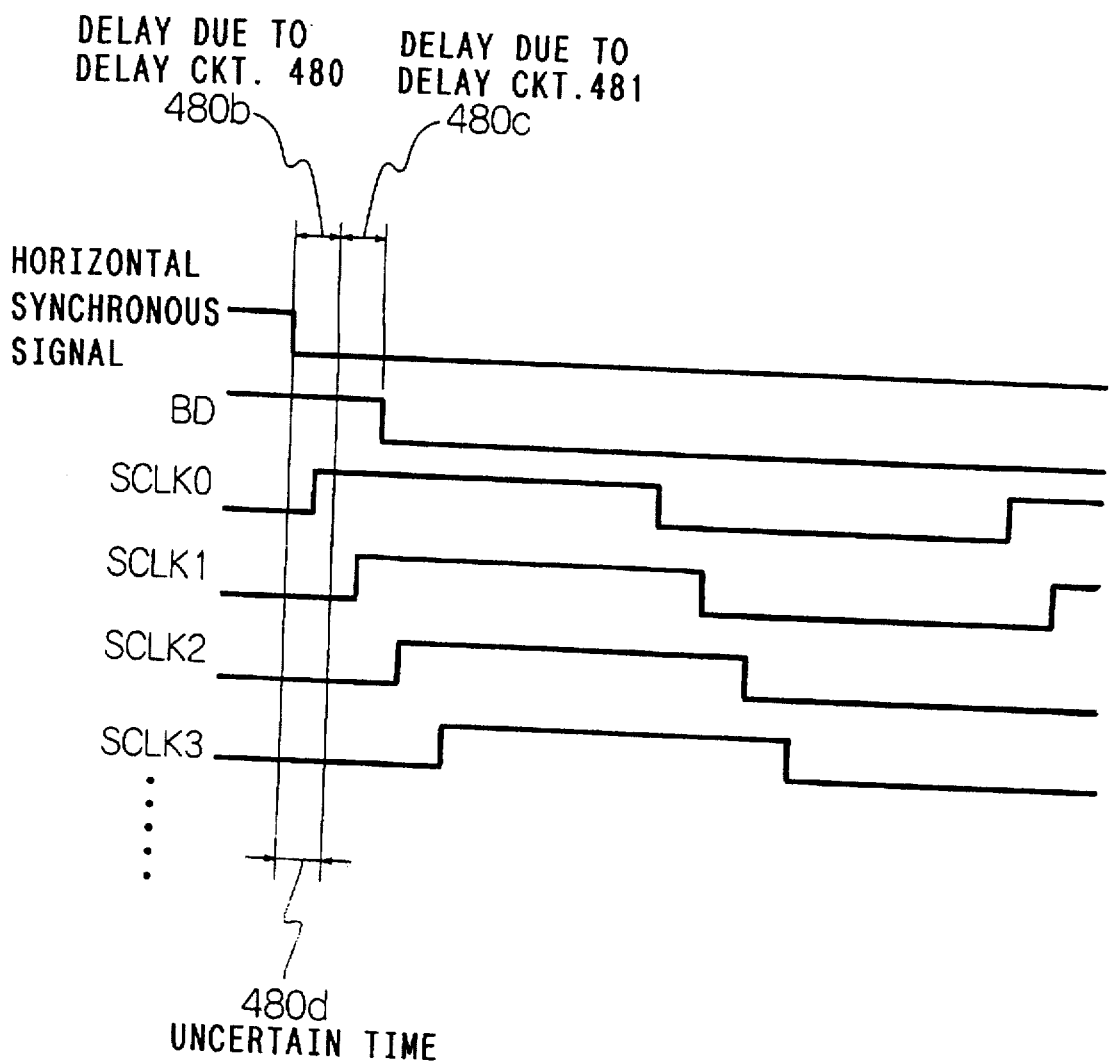
FIG. 90 is a signal waveform diagram showing the output of each part of the third signal delay means 325 shown in FIG. 89.

FIG. 89 is a circuit diagram showing the third signal delay means 325. In FIG. 89, a delay circuit 480 delays the synchronous signal 1002 by the time period from the input of the falling edge of the horizontal synchronous signal 1002 to the latch 440 in the signal selection means 324 until the acknowledgement of the SCLK[15:0] signals in the selector circuit 442. A delay circuit 481 is a circuit which is equivalent to the circuit of the first signal delay means 330 to 333, that is, the circuit shown in FIG. 80, and it further delays the horizontal synchronous signal 1002 delayed in the delay circuit 480 by the delay time corresponding to the 1/16 of the period of the SCLK0 signal, and outputs the signal thus delayed as BD signal. Accordingly, as shown in FIG. 90, the falling edge of the BD signal appears after the acknowledgement of the SCLK[15:0] signal until the rise-up of the first SCLK0 signal.

[Horizontal synchronous means 326]

Figure 91:
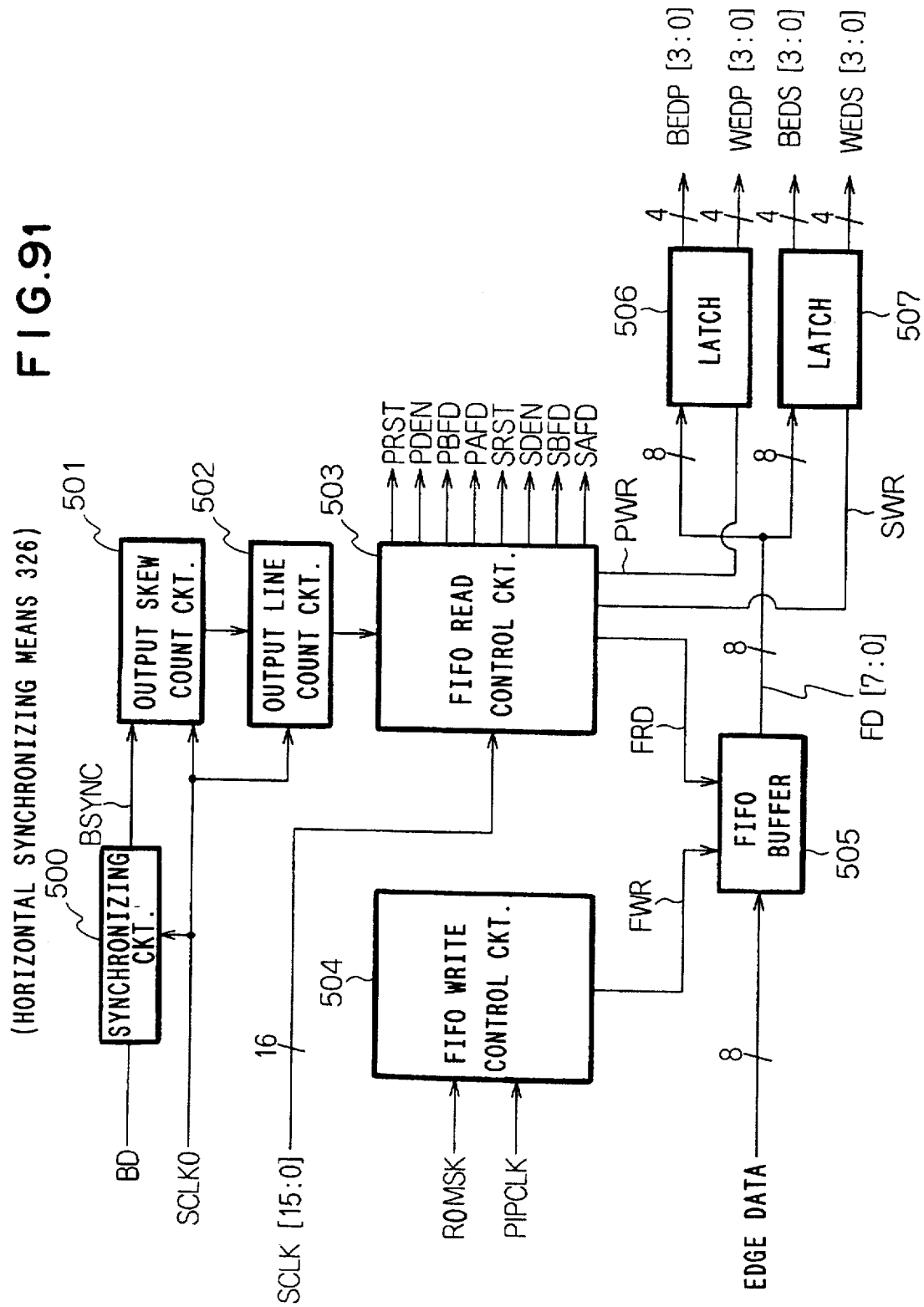
FIG. 91 is a circuit diagram showing horizontal synchronizing means 326 shown in FIG. 72.
Figure 92:
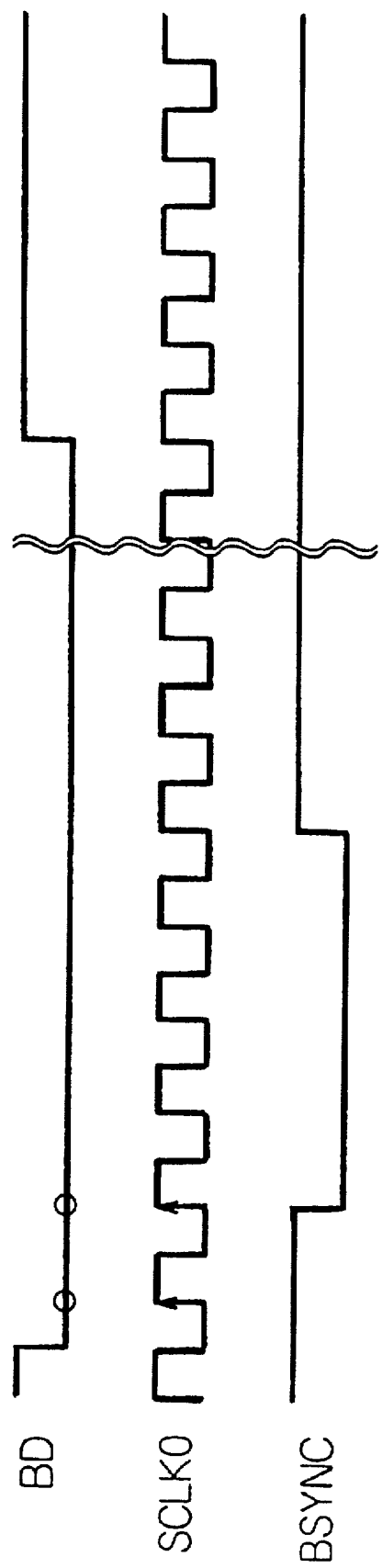
FIG. 92 is a signal waveform diagram showing the output of synchronizing circuit 500 shown in FIG. 91.

FIG. 91 is a circuit diagram showing the horizontal synchronous means 326. An FIFO write control circuit 504 generates an FWR signal for writing the edge data output from the variation point calculation means 18 into the FIFO buffer 505 on the basis of ROMSK signal output from the image input means 10 and PIPCLK signal output from the synchronous output means 20. As shown in FIG. 92, a synchronizing circuit 500 samples the BD signal output from the horizontal synchronous means 326 on the basis of the SLK0 signal at least twice to generates a horizontal synchronous signal HBYNC having a predetermined pulse width.

A output skew count circuit 501 counts a skew value preset by the controller 3 with the SCLK0 signal every time the BSYNC signal is input. An output line count circuit 502 counts the read-out effective period on the basis of the SCLK0 signal when the FIFO read control circuit 503 reads out the edge data stored in the FIFO buffer 505 after the counting operation of the skew value by the output skew count circuit 501 is completed. Thereafter, the frequency of the write-in operation into the FIFO buffer 505 by an FIFO write control circuit 504 is made coincident with the frequency of the read-out operation from the FIFO buffer by the FIFO read control circuit 503.

Figure 93:
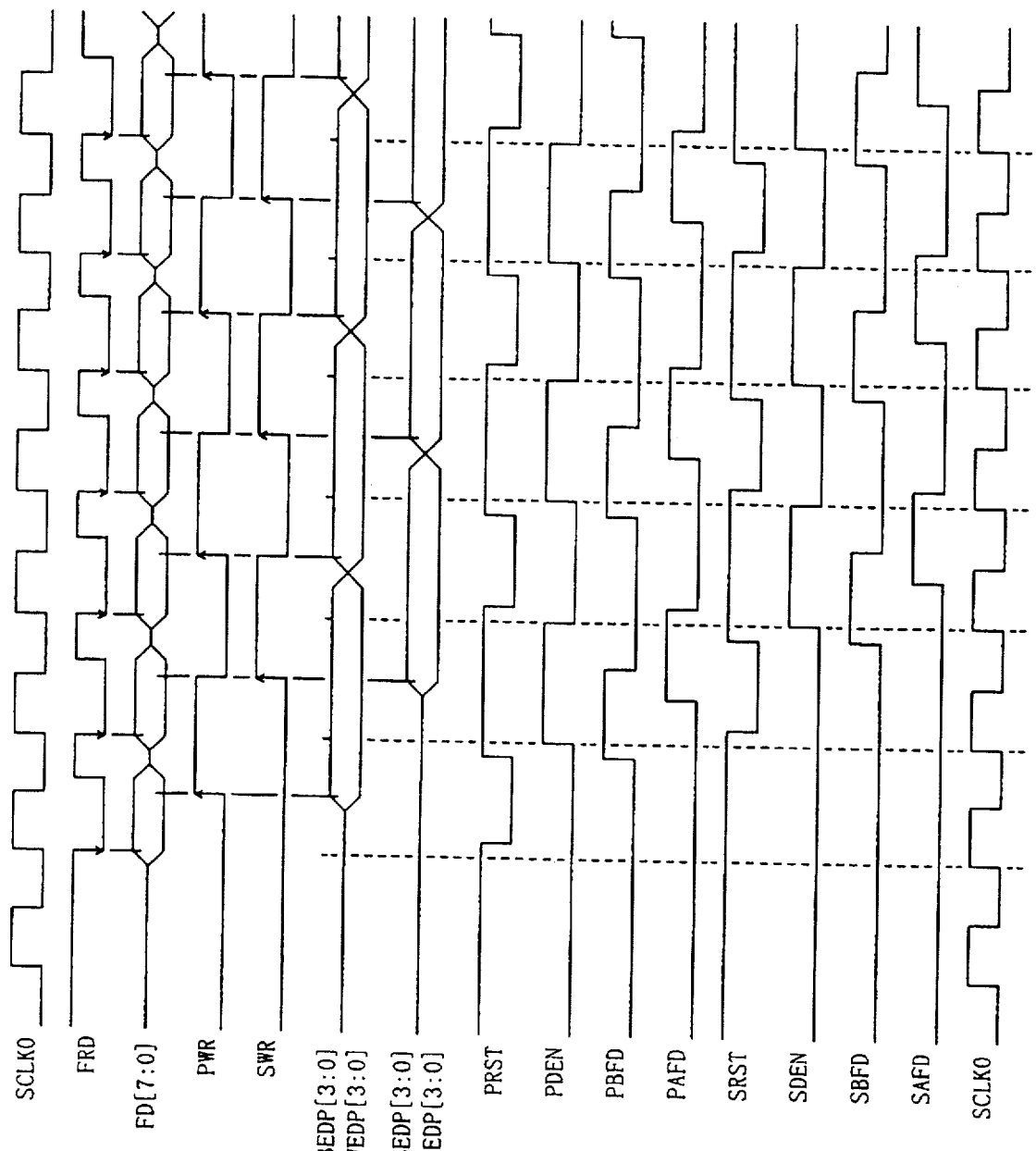
FIG. 93 is a signal waveform diagram showing the output of each part in a read-out operation of an FIFO buffer 505 shown in FIG. 91.

As shown in FIG. 93, on the basis of the SCLK[15:0] signal, the FIFO read control circuit 503 generates FRD signal for reading out the edge data stored in the FIFO buffer 505, PWR signal for alternately writing the read-out edge data FD[7:0] signal into a latch 506 and a latch 507, and PRST signal, PDEN signal, PBFD signal, PAFD signal, SRT signal, SDEN signal, SBFD signal and SAFD signal which are required to control the pulse generating means 327.

The FD[7:0] signal which corresponds to an odd-numbered output pixel is held in the latch 506 at the rise-up of the PWR signal, and the FD[7:0] signal which corresponds to an even-numbered output pixel is held in the latch 507 at the rise-up edge of the PWR signal as BEDP[3:0] signal representing the position of a black edge and WEDP [3:0] representing a white edge, and then output as BEDP [3:0] signal representing the position of a black edge and WEDP[3:0] signal representing the position of a white edge. Further, the FIFO buffer 505 comprises a several-staged buffer for absorbing the deviation of the horizontal synchronization which occurs due to asynchronization between the PIPLCK signal and the SCLK0 signal.

[Pulse generating means 327]

Figure 94:
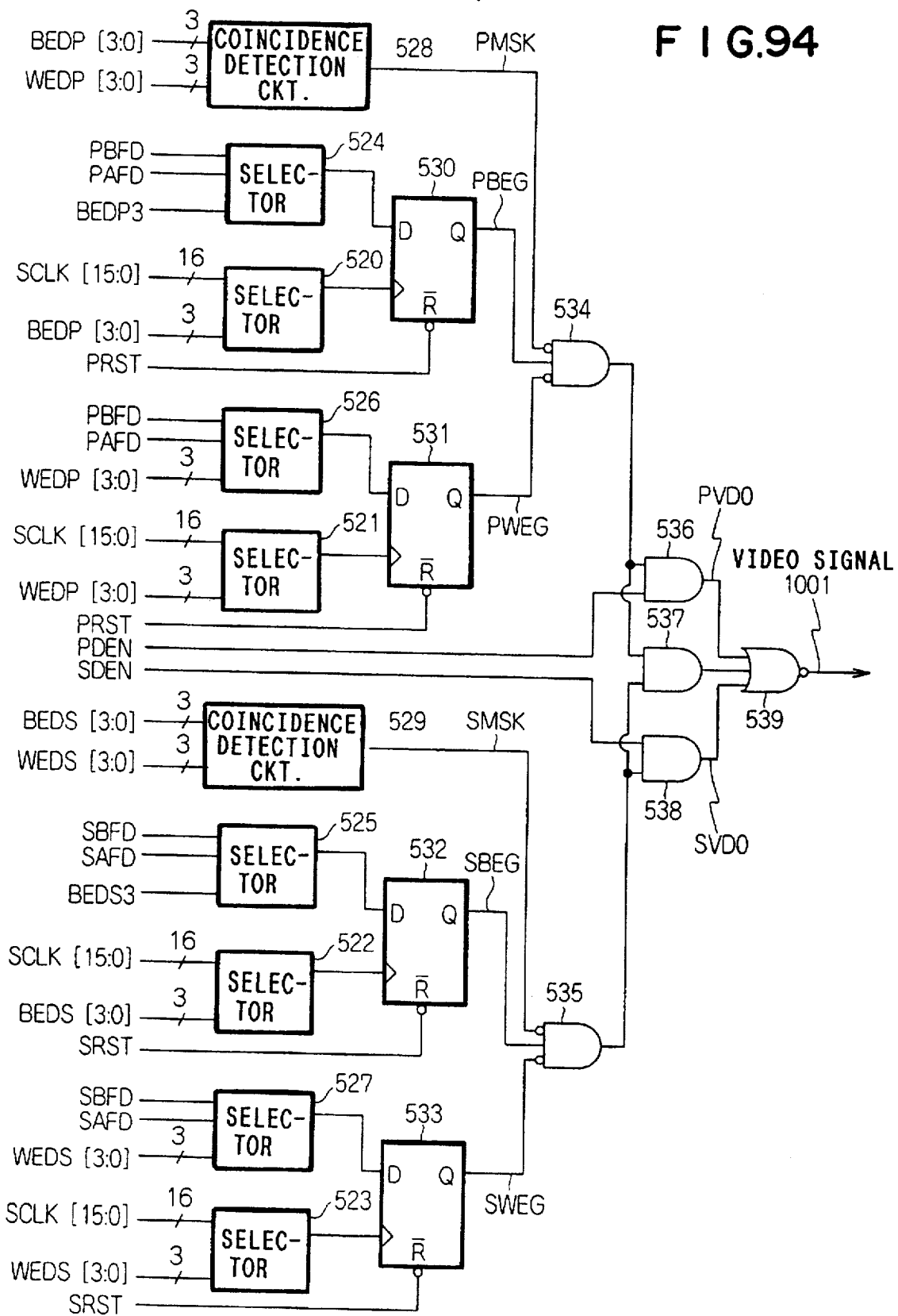
FIG. 94 is a circuit diagram showing the construction of pulse generating means 327 shown in FIG. 72.

FIG. 94 is a circuit diagram showing the pulse generating means 327. On the basis of the BEDP[3:0] signal, a selector 520 selects from the SCLK[15:0] signals a signal serving as a clock input to the flip flop 530. On the basis of the BEDP3 signal, a selector 524 selects a signal serving as a data input to the flip flop 530 from the PBFD signal and the PAFD signal which are output from the FIFO read control circuit 503 shown in (B) of FIG. 1. When any one of the SCLK[7:1] signals is selected in the selector 520, the selector 524 selects the PBFD signal, and when any one of the SCLK [15:8] signals is selected in the selector 520, the selector 524 selects the PAFD signal.

The reset terminal of the flip flop 530 is input with PRST signal which is output from the FIFO read control circuit 503 shown in FIG. 93. Accordingly, the flip flop 530 outputs the PBEG signal representing the black edge at an odd-numbered output pixel, and it is temporarily reset at an even-numbered output pixel. On the basis of the WEDP[3:0] signal, the selector 521 selects from the SCLK[15:0] signals a signal serving as a clock input to the flip flop 531.

On the basis of the WEDP[3:0] signal, a selector 526 selects a signal serving as a data input to the flip flop 531 from the PBFD signal and the PAFD signal which are output from the FIFO read control circuit 503 shown in FIG. 93. When any one of the SCLK[7:1] signals is selected in the selector 521, the selector 526 selects the PBFD signal, and when any one of the SCLK[15:8] signals and the SCLK0 signal is selected, the selector 526 selects the PAFD signal.

The reset terminal of the flip flop 531 is input with PRST signal output from the FIFO read control circuit 503 shown in FIG. 93. Therefore, the flip flop 531 outputs the PWEG signal representing the white edge at an odd-numbered output pixel, and it is temporarily reset at an even-numbered output pixel.

Figure 95:
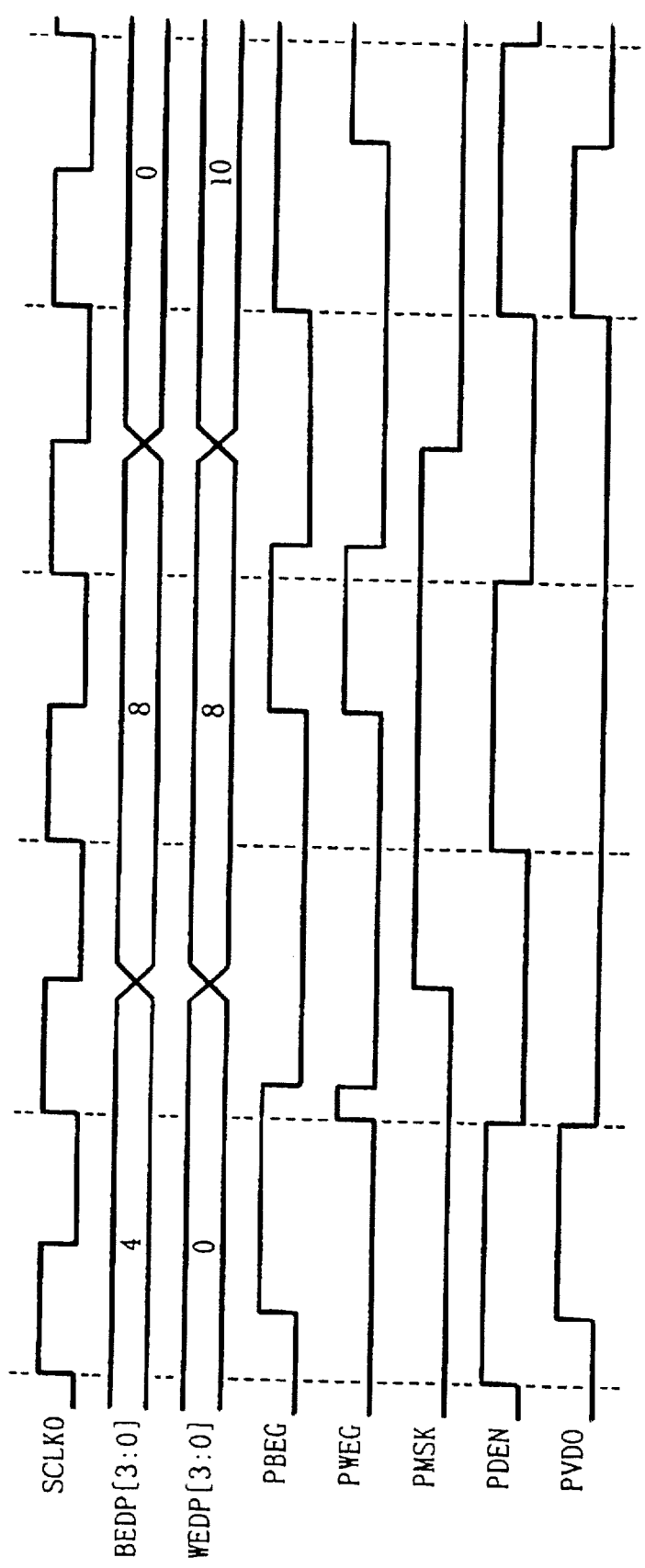
FIG. 95 is a signal waveform diagram showing the generation of an odd-numbered output pixel in each part of the circuit block of the pulse generating means 327 shown in FIG. 94.

A coincidence detection circuit 528 outputs PMSK signal which is set to "1" when the value of the BEDP[3:0] signal and the value of the WEDP[3:0] signal are coincident with each other, that is, the output pixel is a white pixel. The logical product of the PBEG signal, the inverted PWEG signal and the inverted PMSK signal is taken in the AND circuit 534. Subsequently, the logical product of the output of the AND circuit 534 and the PDEN signal output from the FIFO read control circuit 503 is taken in the AND circuit 536. As a result, PVDO signal to be an odd-numbered output pixel is determined as shown in FIG. 95.

As in the case of the generation of the odd-numbered output pixel as described above, a selector 522 selects a signal serving as a clock input to the flip flop 532 from the SCLK[15:0] signals on the basis of the BEDS[3:0] signal. On the basis of the BEDS3 signal, a selector 525 selects a signal serving as a data input to the flip flop 532 from the SBFD signal and the SAFD signal output from the FIFO red control circuit 503 shown in FIG. 93. When any one of the SCLK[7:0] signals is selected in the selector 522, a selector 525 selects SBFD signal, and when any one of the SCLK [15:8] signals is selected in the selector 522, the selector 525 selects SAFD signal.

The reset terminal of the flip flop 532 is input with the SRST signal output from the FIFO read control circuit 503 shown in FIG. 93. Accordingly, the flip flop 532 outputs the SBEG signal 10 representing the black edge at an even-numbered output pixel, and it is temporarily reset at an add-numbered output pixel. A selector 523 selects a signal serving as a clock input to the flip flop 533 from the SCLK[15:0] signals on the basis of the WEDS[3:0] signal. On the basis of the WEDS3 signal, a selector 527 selects a signal serving as a data input to the flip flop 532 from the SBFD signal and the SAFD signal which are output from the FIFO read control circuit 503 shown in FIG. 93. When any one of the SCLK[7:0] signals is selected in the selector 522, the selector 525 selects SBFD signal, and when any one of the SCLK[15:8] signals is selected in the selector 522, the selector 525 selects SAFD signal.

The reset terminal of the flip flop 532 is input with the SRST signal output from the FIFO read control circuit 503 shown in FIG. 93. Accordingly, the flip flop 532 outputs the SBEG signal representing the black edge at an even-numbered output pixel, and it is temporarily reset at an add-numbered output pixel. A selector 523 selects a signal serving as a clock input to the flip flop 533 from the SCLK[15:0] signals on the basis of the WEDS[3:0] signal. On the basis of the WEDS[3:0] signal, a selector 527 selects a signal serving as a data input to the flip flop 533 from the SBFD signal and the SAFD signal which are output from the FIFO read control circuit 503 shown in FIG. 93. When any one of the SCLK[7:0] signals is selected in the selector 527, the selector 525 selects SBFD signal, and when any one of the SCLK[15:8] signals is selected in the selector 522, the selector 525 selects SAFD signal.

Figure 96:
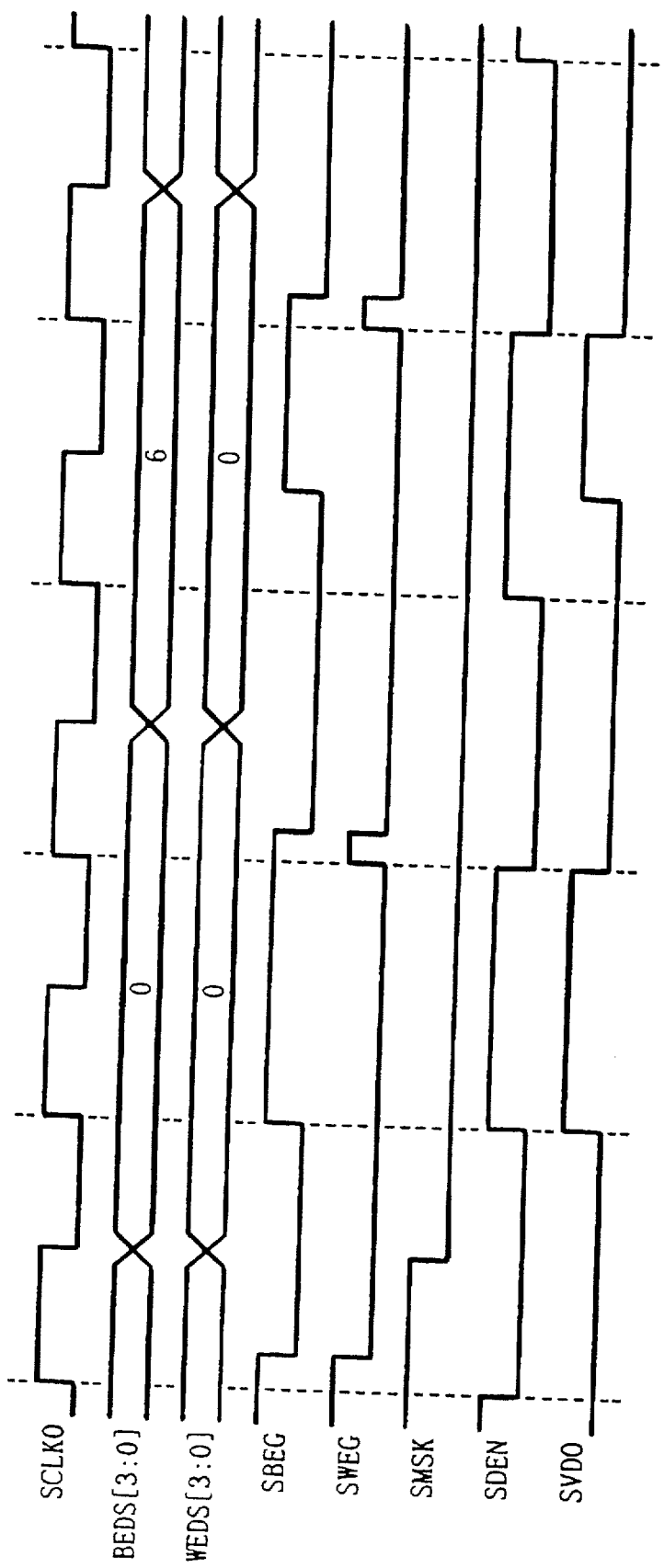
FIG. 96 is a signal waveform diagram showing the generation of an even-numbered output pixel in each part of the circuit block of the pulse generating means 327 shown in FIG. 94.
Figure 97:
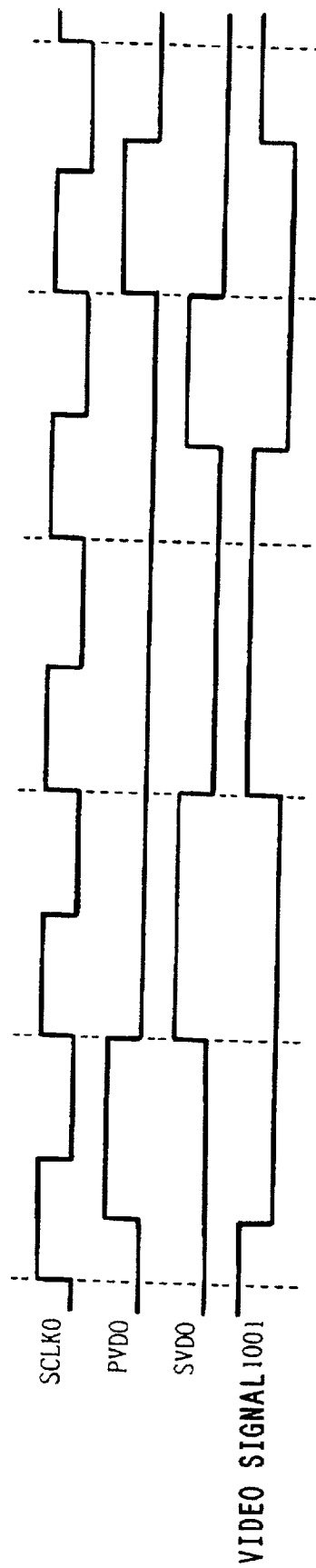
FIG. 97 is a signal waveform diagram showing an output of a video signal 1001 by the pulse generating means 327 shown in FIG. 94.
Figure 103:
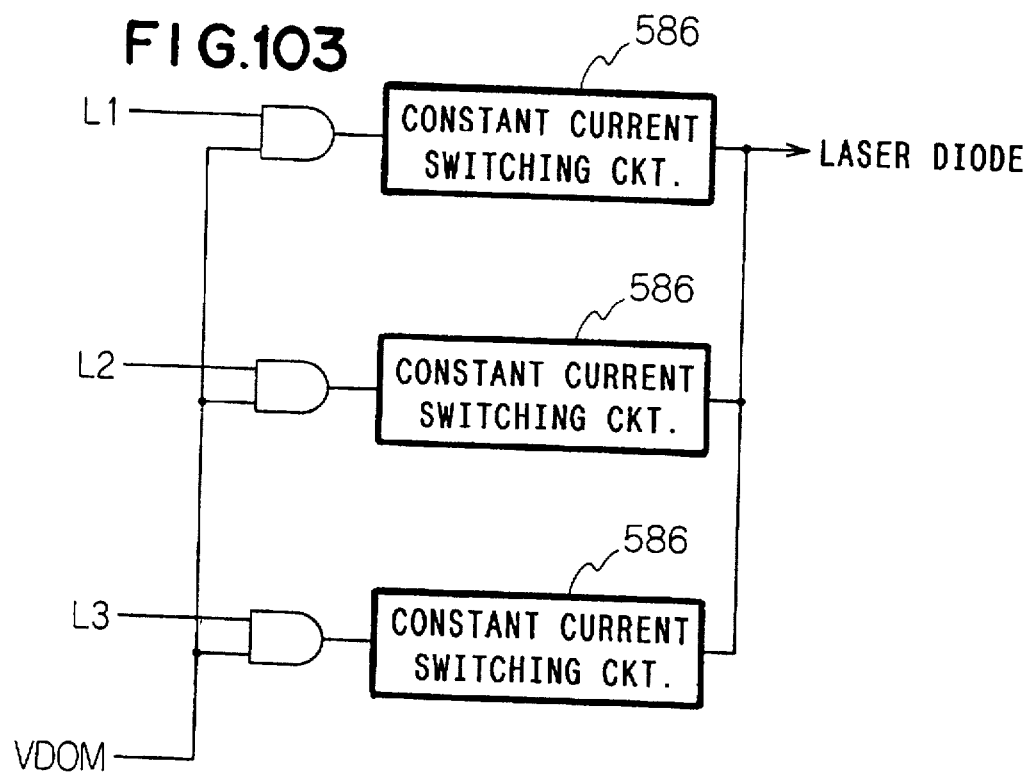
FIG. 103 is a diagram showing a driving example of a laser diode of the prior art described in the Japanese Laid-open Patent Application No. Hei-6-992.
Figure 104:
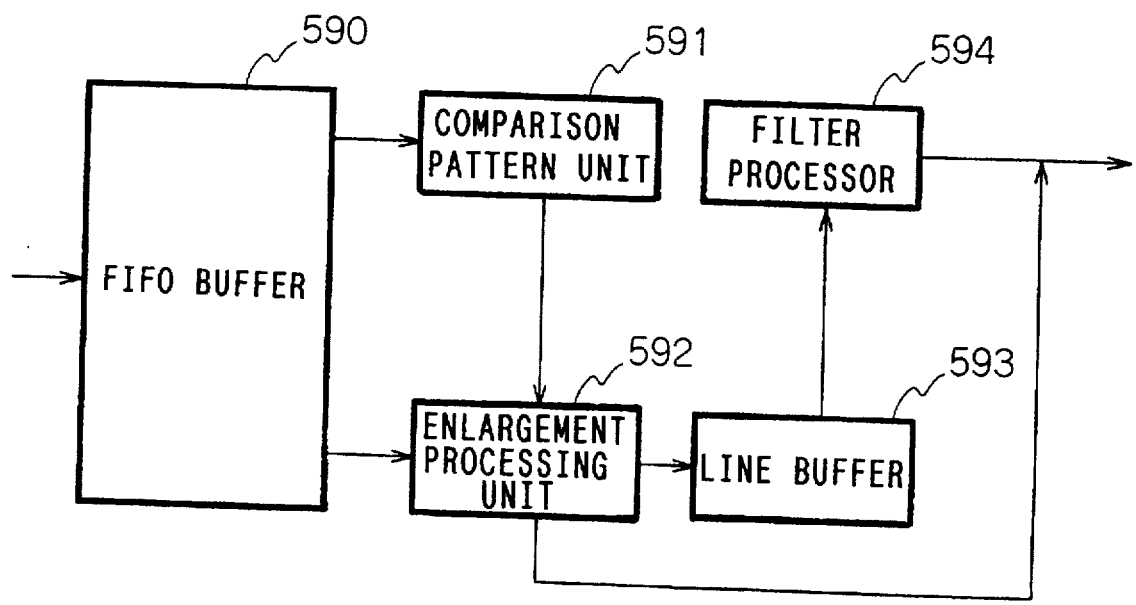
FIG. 104 is a block diagram showing the construction of a prior art described Japanese Laid-open Patent Application No. Hei-4-304070.
Figure 105:
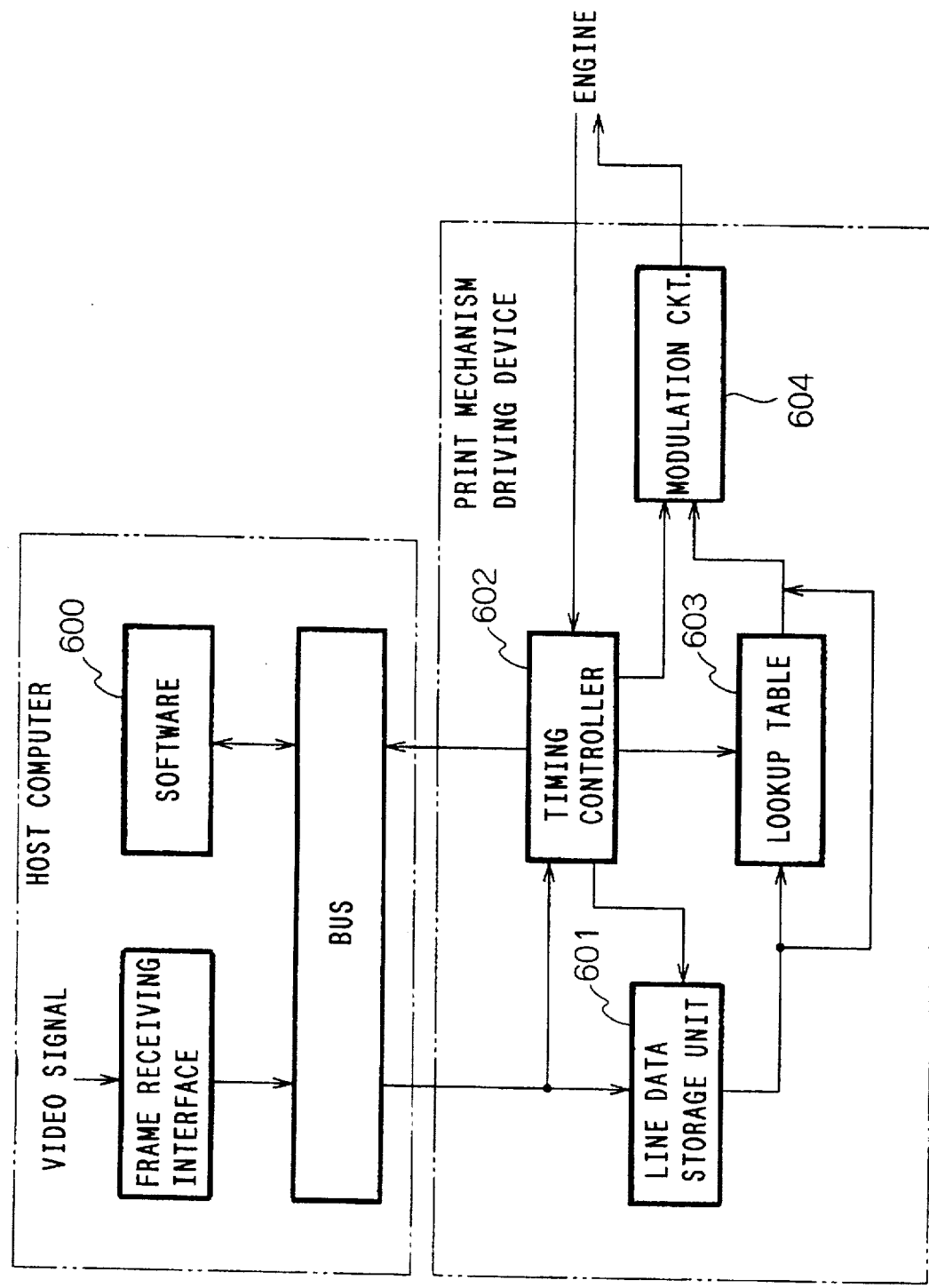
FIG. 105 is a block diagram showing the construction of a prior art described in Japanese Laid-open Patent Application NO. Hei-5-500443 and U.S. Pat. No. 5,109,283.
Figure 106:
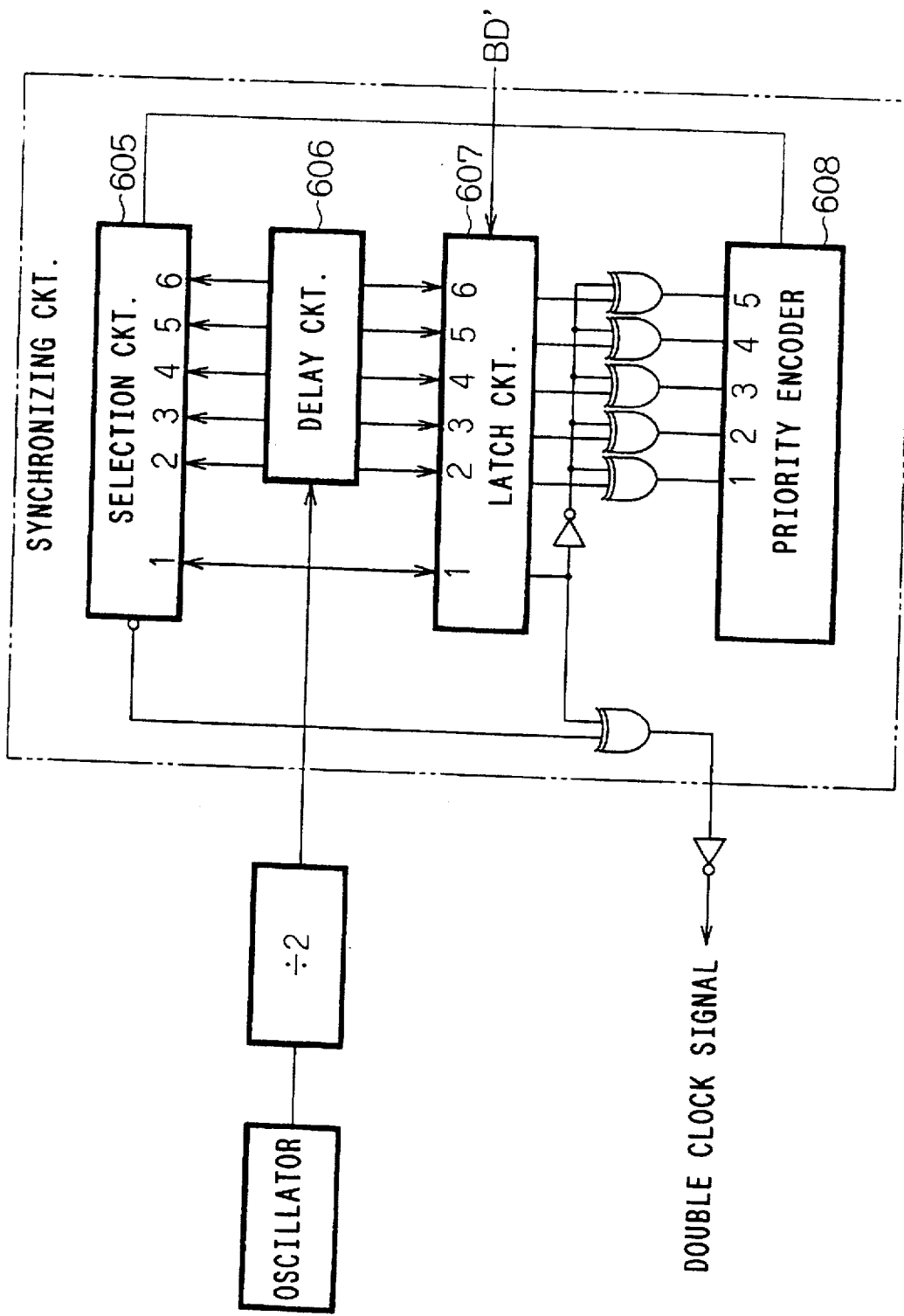
FIG. 106 is a circuit diagram showing the construction of a synchronizing circuit described in Japanese Laid-open Patent Application No. Hei-5-500443 and U.S. Pat. No. 5,109,283.

The reset terminal of the flip flop 533 is input with the SRST signal output from the FIFO read control circuit 503 shown in FIG. 93. Accordingly, the flip flop 533 outputs the SWEG signal representing the white edge at an even-numbered output pixel, and it is temporarily reset at an odd-numbered output pixel. A coincidence detection circuit 529 outputs SMSK signal which is set to "1" when the values of the BEDS[3:0] signal and the value of the WEDS [3:0] signal are coincident with each other, that is, the output pixel concerned is a white pixel. The logical product of the SBEG signal, the inverted SWEG signal and the inverted SMSK signal is taken in an AND circuit 535, and the logical product of the output of the AND circuit 535 and the SDEN signal output from the FIFO read control circuit 503 is taken in an AND circuit 538. As a result, SVDO signal which is to be an even-numbered output pixel is determined as shown in FIG. 96.

Finally, the product of the PVDO signal and the SVDO signal is taken in an NOR circuit 539, and a final video signal 1001 is output. The video signal 1001 is generated by switching the PVDOS signal and the SVDO signal on the basis of the PDEN signal and the SDEN signal, and the AND circuit 537 is used to prevent a switching noise which occurs in the above switching operation.

The circuit construction of the video output means 19 is described above for the case of n=4, m=4, however, when the edge data output from the variation point calculation means 18 comprises 12 bits, n×m must be set to be equal to 64. In order to satisfy n×m=64, the frequency of the SYSCLK signal may be increased, or the stage number of the first signal delay means 330 to 33m in the second signal delay means 322 may be increased. For example, the frequency of the SYSCLK signal is set to be eight times of the video frequency of the engine 4, and the stage number of the first signal delay means is set to 8. In addition, each part is expanded at desired number in accordance with this alteration, and the video signal 1001 is generated from the 64 delay clock signals SCLK[63:0].

Or, the frequency of the SYSCLK signal is kept to be four times as high as the video frequency of the engine 4, and the stage number of the first signal delay means 8 is set to 8. The expansion of each part which is needed in accordance with the above alteration is performed, and the video signal 1001 is generated from the 64 delay clock signals SCLK[63:0]. Or, the frequency of the SYSCLK signal is kept to be four times as high as the video frequency of the engine 4, and the stage number of the first signal delay means is set to 16. In accordance with this alteration, the expansion of each part of the circuit is performed, and the video signal 1001 is generated from the 64 delay clock signals SCLK[63:0].

As described above, according to the present invention, the process from the image feature extraction to the video signal generation in the smoothing circuit is implemented by the algorithm based on the systematical logic. Therefore, the present invention is readily applicable to all the engines by merely setting the input/output characteristic of each engine, and further the variation point of the video signal can be finely and accurately controlled. Therefore, best image quality can be obtained. In addition, a line buffer for storing an image needs only a capacity corresponding to three lines, so that the cost of the smoothing circuit itself can be reduced. These effects may be obtained even when the controller generates an image at low resolution. Therefore, there can be provided an electrophotographic printer such an effect as has not been achieved by the prior art, that is, the cost can be reduced with keeping the image quality.

Although the present invention has been shown and described with respect to best mode embodiments thereof, it should be understood by those skilled in the art that the foregoing and various other changes, omissions, and addition in the form and detail thereof may be made therein without departing from the spirit and scope of the present invention.

What is claimed is:

1. An electrophotographic printer comprising:
    a controller for generating image data on the basis of print data received from a host computer;
    a smoothing circuit for outputting a video signal which is modulated to smooth edge portions in the image data generated by said controller; and
    an engine for recording the image data on a sheet in accordance with the video signal output from said smoothing circuit, wherein said smoothing circuit comprises:
        image input means through which the image data generated by said controller are input;
        area generating means for generating a reference area comprising a noted pixel located at the center position thereof and reference pixels surrounding the noted pixel on the basis of the image data input to said image input means;
        feature extracting means for judging whether the reference area generated by said area generating means is an image which should be subjected to smoothing processing by a pattern matching, and detecting the gradient of a contour portion of the image if the reference area is judged to be an image to be subjected to the smoothing processing; and
        resolution-enhancing means for subdividing into small areas each pixel in the reference area generated by said area generating means in accordance with the extraction result of said feature extraction means and then performing resolution-enhancing correction processing,
    wherein said smoothing circuit further comprises: in juxtaposition with said resolution enhancing means,
        density calculation means for calculating the density of an overall selected area of the corrected pixels generated by the resolution-enhancing means on the basis of respective pixel values of the selected area;
        center-of-gravity calculation means for calculating the center of gravity of an overall selected area of the corrected pixels generated by the resolution-enhancing means on the basis of the respective pixel values of the selected area;
        characteristic correction means for correcting the density calculated in said density calculation means and the center of gravity calculated in said center-of-gravity calculation means in accordance with preset input/output characteristic information of said engine;
        variation point calculating means for calculating the variation point of the video signal on the basis of the density and the center of gravity which are corrected by said characteristic correction means; and
        video output means for outputting the video signal in accordance with the variation point information which is obtained by said variation point calculation means.

2. The electrophotographic printer as claimed in claim 1, further including, in juxtaposition with said resolution enhancing means, area selection means for dividing corrected pixels generated by said resolution enhancing means in accordance with the resolution ratio of said controller and said engine, and selecting from the divided areas an area to be supplied to said density calculation means and said center-of-gravity calculation means, wherein each of said density calculation means and said center-of-gravity calculation means has an individual selected area calculating function of calculating the density or the center of gravity on the basis of the respective pixel values of the area selected by said area selection means.

3. The electrophotographic printer as claimed in claim 1, wherein said video output means includes:
    first signal delay means for connecting in series at least one kind of delay elements whose number is equal to a to generate delay signals of a from one input signal, and selecting and outputting one of the delay signals of a;
    second signal delay means for connecting in series said first signal delay means whose number is equal to m, and receiving a criterion signal having the frequency of n-times of a video signal transmission frequency f which is originally defined by said engine, thereby generating delay signals of m;
    phase detection means for detecting a phase shift from the criterion signal by using the most delayed delay signal of said second signal delay means as a reference signal; and
    condition determining means for determining an output selection condition of said second signal delay means on the basis of the detection result of said phase detection means, and in juxtaposition with said condition determining means, said video output means includes:
        signal generating means for generating n×m signals of frequency f which are delayed by $1/(n \times m \times f)$ from the criterion signal and the m delay signals of said second signal delaying means;
        signal selection means for selecting from the n×m signals of said signal generating means a signal which is most synchronized with a horizontal synchronous signal output from said engine and setting the selected signal as a zero-phase signal, and setting as a s-phase signal a signal which is delayed from the zero-phase signal by $s/(n \times m \times f)$;
        third signal delay means for delaying the horizontal synchronous signal of said engine to avoid the horizontal synchronization during a selection condition transition period of said signal selection means;
        horizontal synchronizing means for receiving the horizontal synchronous signal delayed by said third signal delay means and performing the horizontal synchronization on the basis of the zero-phase signal selected by said signal selection means; and
        pulse generating means for generating a video signal specified by the variation point information which is output by said variation point calculating means.

4. The electrophotographic printer as claimed in claim 1, wherein said controller comprises:
    a CPU for fetching a command stored in a code ROM for storing a program to control the operation of said engine, and executing the fetched command to thereby perform the overall management of said electrophotographic printer and the control required for a series of print operations;

an engine interface control circuit for performing a handshake of a signal required for communications with said engine, said engine interface control circuit being interposed between said CPU and said engine, and receiving a status of said engine to issue a command to said engine;

a host interface control circuit for performing a handshake of a signal required for communications with a host computer, said host interface control circuit being interposed between said CPU and said host computer, and receiving data from said host computer, said host interface control circuit receiving the data from said host computer every predetermined data unit, and said CPU analyzing the received data to generate two-dimensional bit map image signals on the basis of the analysis result;

a RAM for storing the bit map image signals;

a font ROM for outputting drawing information of a character when the received data contain the drawing data of the character concerned; and an image transmission control circuit for performing synchronization between an auxiliary scanning direction and a main scanning direction of said engine on the basis of a vertical synchronous signal from said engine interface control circuit and a horizontal synchronous signal from said smoothing circuit, and outputting the bit map image stored in said RAM as video signals to said smoothing circuit in accordance with a video clock signal of said smoothing circuit.

5. The electrophotographic printer as claimed in claim 1, wherein said engine includes an electrophotographic process unit comprising a photosensitive drum serving as a central part of said electrophotographic printer, a main charger for charging said photosensitive drum with a fixed amount of charge, a laser scan unit for exposing said photosensitive drum to light, a developing roller for supplying and pressing toner, a transfer roller for feeding a toner-transfer sheet, a discharging probe for discharging the charge on the toner-transfer sheet, a cleaning unit for removing toner other than the transferred toner from said photosensitive drum, an erase unit for erasing the residual charge on said photosensitive drum, and a fixing unit for applying heat and pressure to the toner transferred onto the toner-transfer sheet.

6. The electrophotographic printer as claimed in claim 5, wherein an electrostatic latent image is formed on said photosensitive drum by light irradiation which is modulated in accordance with an image input signal of said laser scan unit, and said electrophotographic process unit further includes means for electrostatically attaching toner comprising colored charged fine particles to the electrostatic latent image to form a visible image.

7. The electrophotographic printer as claimed in claim 5, wherein in said electrophotographic process unit, attachment and non-attachment of the toner onto said photosensitive drum are clearly separated in accordance with a light exposure amount on said photosensitive drum by said laser scan unit on a threshold value representing the attachment or non-attachment of the toner as a border.

8. The electrophotographic printer as claimed in claim 1, wherein said smoothing circuit includes concave detection means for detecting concave portions of the contour of the input signal, convex detection means for detecting convex portions of the contour of the input signal, and accumulation means for combining with and accumulating a detected signal of the concave portions and a detected signal of the convex portions.

9. The electrophotographic printer as claimed in claim 1, wherein the gradient of the input image obtained by said feature extraction means is classified into six values of ±1, ±2, ±(½) as detection operators in accordance with the noted pixel.

10. The electrophotographic printer as claimed in claim 1, wherein said density calculation means calculates the rate of the occupation area of black pixels to the whole area of the noted pixel.

11. The electrophotographic printer as claimed in claim 1, wherein in order to calculate the center of gravity of black pixels in the main scanning direction in a selected area to which the smoothing processing is performed, said density calculation means sets the center axis of each column of the noted pixel as an action point, sets the weighting coefficients of a black pixel and a white pixel to 1 and 0 respectively, sets the left end axis and the right end axis of the selected area t 0 and 1 respectively, and sets the position in the auxiliary scanning direction from the left end axis to the center of gravity.

12. The electrophotographic printer as claimed in claim 1, wherein said characteristic correction means corrects the density calculated by said density calculation means in accordance with the input/output characteristic of said engine which is defined by said controller, increases/reduces the pulse width corresponding to the input image to be supplied to said engine in accordance with the corrected density, and corrects the delay time of the pulse width in accordance with the position of the center of gravity calculated by said center-of-gravity calculation means.

13. The electrophotographic printer as claimed in claim 2, wherein said video output means includes:

first signal delay means for connecting in series at least one kind of delay elements whose number is equal to a to generate delay signals of a from one input signal, and selecting and outputting one of the delay signals of a;

second signal delay means for connecting in series said first signal delay means whose number is equal to m, and receiving a criterion signal having the frequency of n-times of a video signal transmission frequency f which is originally defined by said engine, thereby generating delay signals of m;

phase detection means for detecting a phase shift from the criterion signal by using the most delayed delay signal of said second signal delay means as a reference signal; and condition determining means for determining an output selection condition of said second signal delay means on the basis of the detection result of said phase detection means, and in juxtaposition with said condition determining means, said video output means includes:

signal generating means for generating n×m signals of frequency f which are delayed by 1/(n×m×f) from the criterion signal and the m delay signals of said second signal delaying means;

signal selection means for selecting from the n×m signals of said signal generating means a signal which is most synchronized with a horizontal synchronous signal output from said engine and setting the selected signal as a zero-phase signal, and setting as a s-phase signal a signal which is delayed from the zero-phase signal by s/(n×m×f);

third signal delay means for delaying the horizontal synchronous signal of said engine to avoid the horizontal synchronization during a selection condition transition period of said signal selection means;

horizontal synchronizing means for receiving the horizontal synchronous signal delayed by said third signal delay means and performing the horizontal synchronization on the basis of the zero-phase signal selected by said signal selection means; and pulse generating means for generating a video signal specified by the variation point information which is output by said variation point calculating means.

14. The electrophotographic printer as claimed in claim 2, wherein said controller comprises:

a CPU for fetching a command stored in a code ROM for storing a program to control the operation of said engine, and executing the fetched command to thereby perform the overall management of said electrophotographic printer and the control required for a series of print operations;

an engine interface control circuit for performing a handshake of a signal required for communications with said engine, said engine interface control circuit being interposed between said CPU and said engine, and receiving a status of said engine to issue a command to said engine;

a host interface control circuit for performing a handshake of a signal required for communications with a host computer, said host interface control circuit being interposed between said CPU and said host computer, and receiving data from said host computer, said host interface control circuit receiving the data from said host computer every predetermined data unit, and said CPU analyzing the received data to generate two-dimensional bit map image signals on the basis of the analysis result;

a RAM for storing the bit map image signals;

a font ROM for outputting drawing information of a character when the received data contain the drawing data of the character concerned; and an image transmission control circuit for performing synchronization between an auxiliary scanning direction and a main scanning direction of said engine on the basis of a vertical synchronous signal from said engine interface control circuit and a horizontal synchronous signal from said smoothing circuit, and outputting the bit map image stored in said RAM as video signals to said smoothing circuit in accordance with a video clock signal of said smoothing circuit.

15. The electrophotographic printer as claimed in claim 2, wherein said engine includes an electrophotographic process unit comprising a photosensitive drum serving as a central part of said electrophotographic printer, a main charger for charging said photosensitive drum with a fixed amount of charge, a laser scan unit for exposing said photosensitive drum to light, a developing roller for supplying and pressing toner, a transfer roller for feeding a toner-transfer sheet, a discharging probe for discharging the charge on the toner-transfer sheet, a cleaning unit for removing toner other than the transferred toner from said photosensitive drum, an erase unit for erasing the residual charge on said photosensitive drum, and a fixing unit for applying heat and pressure to the toner transferred onto the toner-transfer sheet.

16. The electrophotographic printer as claimed in claim 15, wherein an electrostatic latent image is formed on said photosensitive drum by light irradiation which is modulated in accordance with an image input signal of said laser scan unit, and said electrophotographic process unit further includes means for electrostatically attaching toner comprising colored charged fine particles to the electrostatic latent image to form a visible image.

17. The electrophotographic printer as claimed in claim 15, wherein in said electrophotographic process unit, attachment and non-attachment of the toner onto said photosensitive drum are clearly separated in accordance with a light exposure amount on said photosensitive drum by said laser scan unit on a threshold value representing the attachment or non-attachment of the toner as a border.

18. The electrophotographic printer as claimed in claim 2, wherein said smoothing circuit includes concave detection means for detecting concave portions of the contour of the input signal, convex detection means for detecting convex portions of the contour of the input signal, and accumulation means for accumulating the concave portions and the convex portions.

19. The electrophotographic printer as claimed in claim 2, wherein the gradient of the input image obtained by said feature extraction means is classified into six values of $\pm 1$, $\pm 2$, $\pm(\frac{1}{2})$ as detection operators in accordance with the noted pixel.

20. The electrophotographic printer as claimed in claim 2, wherein said density calculation means calculates the rate of the occupation area of black pixels to the whole area of the noted pixel.

21. The electrophotographic printer as claimed in claim 2, wherein in order to calculate the center of gravity of black pixels in the main scanning direction in a selected area to which the smoothing processing is performed, said density calculation means sets the center axis of each column of the noted pixel as an action point, sets the weighting coefficients of a black pixel and a white pixel to 1 and 0 respectively, sets the left end axis and the right end axis of the selected area t 0 and 1 respectively, and sets the position in the auxiliary scanning direction from the left end axis to the center of gravity.

22. The electrophotographic printer as claimed in claim 2, wherein said characteristic correction means corrects the density calculated by said density calculation means in accordance with the input/output characteristic of said engine which is defined by said controller, increases/reduces the pulse width corresponding to the input image to be supplied to said engine in accordance with the corrected density, and corrects the delay time of the pulse width in accordance with the position of the center of gravity calculated by said center-of-gravity calculation means.

23. The electrophotographic printer as claimed in claim 1, wherein said resolution enhancing means subdivides each pixel of a reference area into K rows×L columns which are determined on the basis of the gradient detected by said feature extraction means, and then smooths the contour position.

24. The electrophotographic printer as claimed in claim 1, wherein said variation point calculation means calculates the final variation point of the video signal on the basis of the density and the center of gravity which are corrected by the characteristic correction means.

25. The electrophotographic printer as claimed in claim 1, wherein said video output means outputs to said engine the video signal having the pulse width which meets the variation point information obtained by the variation point calculation means.

\* \* \* \* \*